United States Patent
Monteith

(10) Patent No.: US 12,182,014 B2
(45) Date of Patent: Dec. 31, 2024

(54) COST EFFECTIVE STORAGE MANAGEMENT

(71) Applicant: PURE STORAGE, INC., Mountain View, CA (US)

(72) Inventor: Chad Monteith, Parker, CO (US)

(73) Assignee: PURE STORAGE, INC., Santa Clara, CA (US)

( * ) Notice: Subject to any disclaimer, the term of this patent is extended or adjusted under 35 U.S.C. 154(b) by 35 days.

(21) Appl. No.: 17/732,223

(22) Filed: Apr. 28, 2022

(65) Prior Publication Data

US 2022/0269601 A1 Aug. 25, 2022

Related U.S. Application Data

(63) Continuation-in-part of application No. 16/725,857, filed on Dec. 23, 2019, now abandoned, which is a
(Continued)

(51) Int. Cl.
| | | |
|---|---|---|
| G06F 12/02 | (2006.01) | |
| G06F 9/30 | (2018.01) | |

(Continued)

(52) U.S. Cl.
CPC ...... G06F 12/0253 (2013.01); G06F 9/30079 (2013.01); G06F 12/084 (2013.01); G06F 16/182 (2019.01)

(58) Field of Classification Search
CPC ............. G06F 12/0253; G06F 9/30079; G06F 12/084; G06F 16/182; G06F 2212/154;
(Continued)

(56) References Cited

U.S. PATENT DOCUMENTS

| | | |
|---|---|---|
| 5,706,210 A | 1/1998 | Kumano et al. |
| 5,799,200 A | 8/1998 | Brant et al. |

(Continued)

FOREIGN PATENT DOCUMENTS

| | | |
|---|---|---|
| CN | 110226153 A | 9/2019 |
| EP | 0725324 A2 | 8/1996 |

(Continued)

OTHER PUBLICATIONS

Amsaleg et al., "Garbage Collection for a Client-Server Persistent Object Store", ACM Transactions on Computer Systems, vol. 17, Issue 3, Aug. 1999, pp. 153-201, ACM New York.
(Continued)

*Primary Examiner* — Mark D Featherstone
*Assistant Examiner* — Kweku William Halm

(57) ABSTRACT

Cost-effective storage management including identifying, by a remote storage consumer, one or more of portions of one or more source objects stored at a remote storage resources; issuing, by the remote storage consumer, a command to the remote storage resources configured to cause the remote storage resources to create a new object comprising the one or more of portions of the one or more source objects; and updating, at the remote storage consumer, a mapping data structure to reference the new object.

18 Claims, 38 Drawing Sheets

Related U.S. Application Data continuation-in-part of application No. 15/825,073, filed on Nov. 28, 2017, now abandoned, which is a continuation-in-part of application No. 15/673,998, filed on Aug. 10, 2017, now abandoned, which is a continuation-in-part of application No. 15/600,641, filed on May 19, 2017, now abandoned, which is a continuation-in-part of application No. 15/298,897, filed on Oct. 20, 2016, now abandoned.

(60) Provisional application No. 62/591,197, filed on Nov. 28, 2017, provisional application No. 62/427,353, filed on Nov. 29, 2016, provisional application No. 62/373,328, filed on Aug. 10, 2016, provisional application No. 62/339,090, filed on May 20, 2016, provisional application No. 62/249,885, filed on Nov. 2, 2015.

(51) Int. Cl.
*G06F 12/084* (2016.01)
*G06F 16/182* (2019.01)

(58) Field of Classification Search
CPC ........... G06F 2212/7205; G06F 3/0608; G06F 3/0652; G06F 3/067; G06F 16/1748; G06F 16/188; G06F 3/0643
See application file for complete search history.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 6,889,248 B1 | 5/2005 | Scheer |
| 7,085,789 B1 | 8/2006 | Tarditi |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,386,662 B1 * | 6/2008 | Kekre ................... G06F 3/067 711/113 |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,224,875 B1 | 7/2012 | Christiaens et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,666,939 B2 | 3/2014 | O'Krafka et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,930,648 B1 | 1/2015 | Storer et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,075,851 B2 | 7/2015 | Kilian et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,495,421 B1 * | 11/2016 | DeHaan ................ G06F 16/219 |
| 9,507,532 B1 | 11/2016 | Colgrove et al. |
| 9,632,870 B2 | 4/2017 | Bennett |
| 9,679,040 B1 | 6/2017 | Davis et al. |
| 9,697,224 B1 * | 7/2017 | Factor ................. G06F 16/1748 |
| 10,228,959 B1 | 3/2019 | Anderson et al. |
| 2001/0013117 A1 | 8/2001 | Ungar |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0173939 A1 | 8/2006 | Mn et al. |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294470 A1 * | 12/2007 | Van Dyke ............. G06F 13/161 711/104 |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0109590 A1 | 5/2008 | Jung et al. |
| 2008/0162674 A1 | 7/2008 | Dahiya |
| 2008/0195833 A1 | 8/2008 | Park |
| 2008/0270436 A1 | 10/2008 | Fineberg et al. |
| 2008/0270678 A1 | 10/2008 | Cornwell et al. |
| 2008/0281908 A1 * | 11/2008 | McCanne ............. G06F 16/172 709/201 |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2009/0319720 A1 | 12/2009 | Stefanus et al. |
| 2010/0052625 A1 | 3/2010 | Cagno et al. |
| 2010/0211723 A1 | 8/2010 | Mukaida |
| 2010/0217612 A1 | 8/2010 | Apacible et al. |
| 2010/0223429 A1 | 9/2010 | Cher et al. |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0107103 A1 | 5/2011 | DeHaan et al. |
| 2011/0125955 A1 | 5/2011 | Chen |
| 2011/0131231 A1 | 6/2011 | Haas et al. |
| 2011/0167221 A1 | 7/2011 | Pangal et al. |

(56) References Cited

U.S. PATENT DOCUMENTS

| | | |
|---|---|---|
| 2011/0307530 A1 | 12/2011 | Patterson |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0124284 A1 | 5/2012 | Fuju |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0086131 A1 | 4/2013 | Hunt et al. |
| 2013/0145447 A1 | 6/2013 | Maron |
| 2013/0185457 A1* | 7/2013 | Campbell .............. G06F 3/0635 710/5 |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0227236 A1 | 8/2013 | Flynn et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0032507 A1 | 1/2014 | Voigt et al. |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0297776 A1 | 10/2014 | Volvovski et al. |
| 2014/0325262 A1 | 10/2014 | Cooper et al. |
| 2014/0351627 A1 | 11/2014 | Best et al. |
| 2014/0359201 A1 | 12/2014 | Chakrabarti |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134708 A1* | 5/2015 | Cutforth .............. G06F 3/0647 707/809 |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0220561 A1* | 8/2015 | Goetz .............. G06F 16/00 707/827 |
| 2015/0378888 A1 | 12/2015 | Zhang et al. |
| 2016/0019232 A1 | 1/2016 | Lambright |
| 2016/0098323 A1 | 4/2016 | Mutha et al. |
| 2016/0170987 A1 | 6/2016 | Kesselman |
| 2016/0217016 A1* | 7/2016 | Raman .............. G06F 9/52 |
| 2016/0292178 A1 | 10/2016 | Manville et al. |
| 2016/0335288 A1 | 11/2016 | Qiu et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0060976 A1 | 3/2017 | Harnik et al. |
| 2017/0124107 A1 | 5/2017 | Emberson |
| 2017/0300550 A1 | 10/2017 | Emberson et al. |
| 2018/0060348 A1 | 3/2018 | Power et al. |
| 2018/0081562 A1 | 3/2018 | Vasudevan |
| 2018/0107404 A1 | 4/2018 | Cox et al. |
| 2019/0004943 A1 | 1/2019 | Mainali et al. |
| 2020/0236172 A1* | 7/2020 | Frank .............. H04L 67/1097 |

FOREIGN PATENT DOCUMENTS

| | | |
|---|---|---|
| WO | 2012087648 A2 | 6/2012 |
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2018102392 A1 | 6/2018 |

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

ETSI, "Network Function Virtualisation (NFV); Resiliency Requirements", ETSI GS NFCV-REK 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, Apr. 29, 2016, 12 pages.

International Search Report and Written Opinion, PCT/US2016/015008, May 4, 2016, 12 pages.

International Search Report and Written Opinion, PCT/US2016/016333, Jun. 8, 2016, 12 pages.

International Search Report and Written Opinion, PCT/US2016/020410, Jul. 8, 2016, 12 pages.

International Search Report and Written Opinion, PCT/US2016/032052, Aug. 30, 2016, 17 pages.

International Search Report and Written Opinion, PCT/US2016/032084, Jul. 18, 2016, 12 pages.

International Search Report and Written Opinion, PCT/US2016/035492, Aug. 17, 2016, 10 pages.

International Search Report and Written Opinion, PCT/US2016/036693, Aug. 29, 2016, 10 pages.

International Search Report and Written Opinion, PCT/US2016/038758, Oct. 7, 2016, 10 pages.

International Search Report and Written Opinion, PCT/US2016/040393, Sep. 22, 2016, 10 pages.

International Search Report and Written Opinion, PCT/US2016/044020, Sep. 30, 2016, 11 pages.

International Search Report and Written Opinion, PCT/US2016/044874, Oct. 7, 2016, 11 pages.

(56) References Cited

OTHER PUBLICATIONS

International Search Report and Written Opinion, PCT/US2016/044875, Oct. 5, 2016, 13 pages.
International Search Report and Written Opinion, PCT/US2016/044876, Oct. 21, 2016, 12 pages.
International Search Report and Written Opinion, PCT/US2016/044877, Sep. 29, 2016, 13 pages.
International Search Report and Written Opinion, PCT/US2017/063673, Feb. 16, 2018, 12 pages.
Kong, "Using PCI Express As The Primary System Interconnect In Multiroot Compute, Storage, Communications And Embedded Systems", White Paper, IDT.com (online), Aug. 28, 2008, 12 pages, URL: www.idt.com/document/whp/idt-pcie-multi-root-white-paper.
Li et al., "Access Control for the Services Oriented Architecture", Proceedings of the 2007 ACM Workshop on Secure Web Services (SWS '07), Nov. 2007, pp. 9-17, ACM New York, NY.
Microsoft, "Hybrid for SharePoint Server 2013—Security Reference Architecture", Microsoft (online), Oct. 2014, 53 pages, URL: hybrid.office.com/img/Security_Reference_Architecture.pdf.
Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.
Microsoft, "Hybrid Identity", Microsoft (online), Apr. 2014, 36 pages, URL: www.aka.ms/HybridIdentityWp.
Pcmag, "Storage Array Definition", Published May 10, 2013, URL: http://web.archive.org/web/20130510121646/http://www.pcmag.com/encyclopedia/term/52091/storage-array, 2 pages.
Stefanovic et al. "Age-Based Garbage Collection", Publication: OOPSLA '99: Proceedings of the 14th ACM SIGPLAN Conference on Object-Oriented Programming, Systems, Languages, and Applications, Denver, Co, USA, pp. 370-381 (Year: 1999 [Month Unknown]).
Storer et al., "Secure Data Deduplication", Proceedings of the 4th ACM International Workshop on Storage Security And Survivability (StorageSS'08), Oct. 2008, 10 pages, ACM New York, NY. USA, DOI: 10.1145/1456469.1456471.
Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.
Techopedia, "What is a disk array", techopedia.com (online), Jan. 13, 2012, 1 page, URL: web.archive.org/web/20120113053358/http://www.techopedia.com/definition/1009/disk-array.
Vardhan et al., "Using Passive Object Garbage Collection Algorithms for Garbage Collection of Active Objects", Proceedings of the 3rd International Symposium on Memory Management (ISMM '02), Jun. 2002, pp. 106-113, URL: https://doi org/10.1145/512429.512443, ACM New York, USA.
Webopedia, "What is a disk array", webopedia.com (online), May 26, 2011, 2 pages, URL: web.archive.org/web/20110526081214/http://www.webopedia.com/TERM/D/disk_array.html.
Wikipedia, "Convergent Encryption", Wikipedia.org (online), accessed Sep. 8, 2015, 2 pages, URL: en.wikipedia.org/wiki/Convergent_encryption.

* cited by examiner

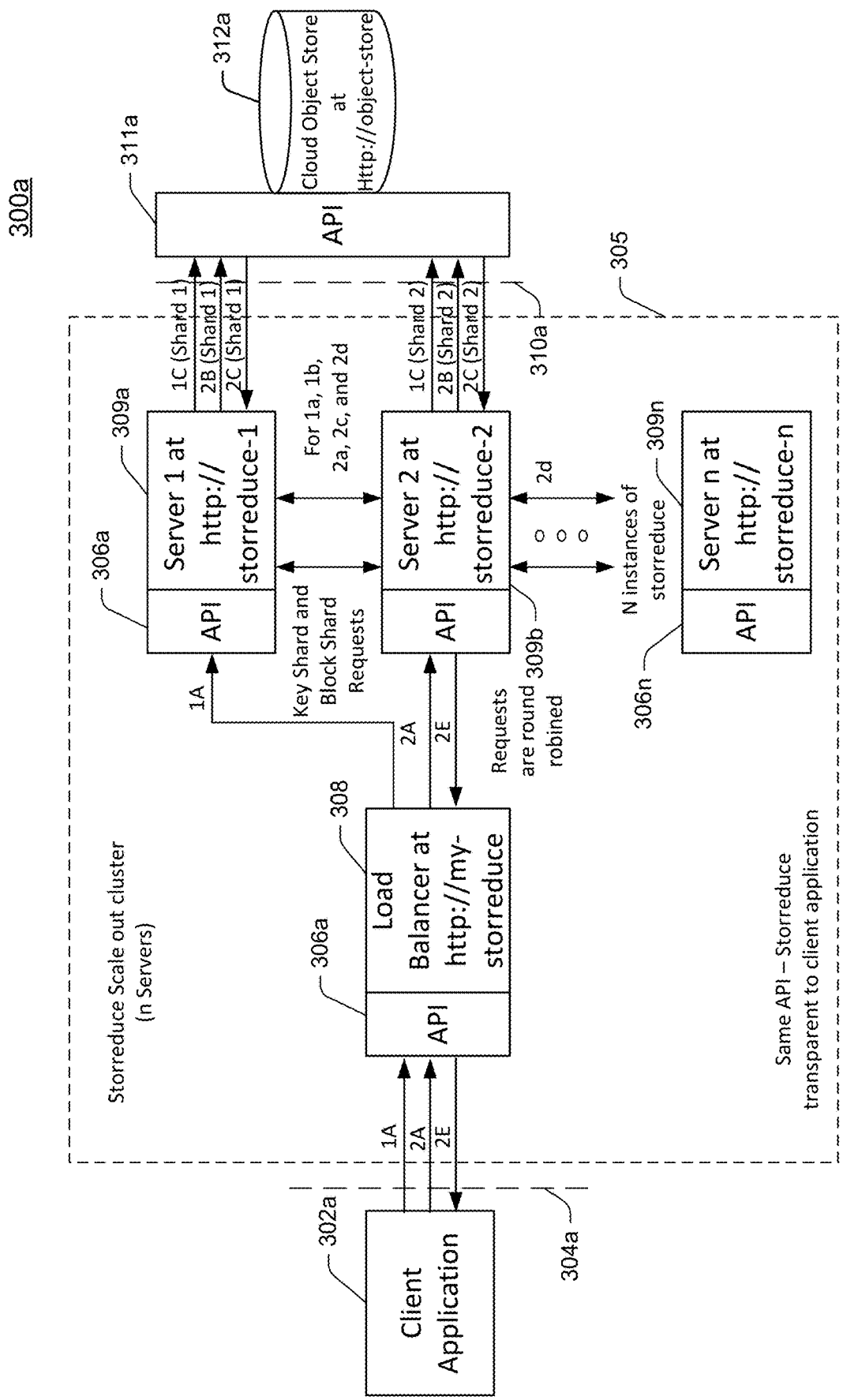

| File or object name | Location Addresses |
|---|---|
| Filename 1 | 1<br>2<br>3<br>4<br>5 |
| Filename 2 | 6<br>7<br>3<br>4<br>8<br>0 |
| ... | ... |
| Filename N | M<br>M+1<br>7<br>3<br>9 |

} The data objects stored at location addresses 3 & 4 are shared with 'Filename 1'

} 'Filename N' shares data objects with 'Filename 1' and 'Filename 2'

Compact Data Process (for Block Shard 1414)

ably large amounts of data by compacting data in data blocks in an object store. Compacting data in the object store includes storing backend objects in the object store and examining data in a reference map of the object store to determine which of the locations within a back-end object in the object store are referenced in the map, and which locations are no longer referenced. The back-end object in the object store are altered to remove block data from locations which are no longer referenced, and a hash-to-location table is updated to remove the entries for block data that have been removed.

COST EFFECTIVE STORAGE MANAGEMENT

CROSS-REFERENCE TO RELATED APPLICATIONS

This is a continuation in-part application for patent entitled to a filing date and claiming the benefit of earlier-filed U.S. patent application Ser. No. 16/725,857, filed Dec. 23, 2019, herein incorporated by reference in its entirety, which is a continuation in-part of U.S. patent application Ser. No. 15/825,073, filed Nov. 28, 2017, which claims priority from U.S. Provisional Applications 62/591,197, filed Nov. 28, 2017, and 62/427,353, filed Nov. 29, 2016, and is a continuation in-part of U.S. patent application Ser. No. 15/673,998, filed Aug. 10, 2017, which is a continuation in-part of U.S. patent application Ser. No. 15/600,641, filed May 19, 2017, which is a continuation in-part of U.S. patent application Ser. No. 15/298,897, filed Oct. 20, 2016, which claims priority from U.S. Provisional Applications 62/373,328, filed Aug. 10, 2016, 62/339,090, filed May 20, 2016, and 62/249,885, filed Nov. 2, 2015.

DESCRIPTION OF EMBODIMENTS

A garbage collection system using an intermediary networked device to store data objects on a remotely located object storage device(s) is disclosed.

Deduplication is a specialized data compression technique for eliminating duplicate copies of data. Deduplication of data is typically done to decrease the cost of storage of the data using a specially configured storage device having a deduplication engine internally connected directly to a storage drive.

The deduplication engine within the storage device receives data from an external device. The deduplication engine creates a hash from the received data which is stored in a table. The table is scanned to determine if an identical hash was previously stored in the table. If it was not, the received data is stored in the Cloud Object Store, and a location pointer for the received data is stored in an entry within the table along with hash of the received data. When a duplicate of the received data is detected, an entry is stored in the table containing the hash and an index pointing to the location within the Cloud Object Store where the duplicated data is stored.

This system has the deduplication engine directly coupled to an internal storage drive to maintain low latency and fast storage of the hash table. However, the data is stored in a Cloud Object Store.

When an object managed by a deduplication engine is deleted by a client, the storage space used in the Cloud Object Store is not reclaimed immediately. Some blocks of information may be referenced by multiple objects, so only the blocks that are no longer referenced can be physically deleted and have their storage space feed up. The process of discovering blocks that are no longer referenced and freeing up the corresponding storage space is known as garbage collection.

Performing garbage collection in a way that scales up to large amounts of data is one of the most difficult problems for a deduplication engine. This difficulty is compounded by the complexity of spreading the data across a cluster of servers.

In one implementation, a method is disclosed to perform garbage collection that works effectively across a system spread over multiple servers (a scale-out cluster) and across very large amounts of data by compacting data in data blocks in an object store. Compacting data in the object store includes storing backend objects in the object store and examining data in a reference map of the object store to determine which of the locations within a back-end object in the object store are referenced in the map, and which locations are no longer referenced. The back-end object in the object store are altered to remove block data from locations which are no longer referenced, and a hash-to-location table is updated to remove the entries for block data that have been removed.

The method describes a series of messages, data structures and data stores that can be used to perform garbage collection for a deduplication system spread across multiple servers in a scale-out cluster.

The method may be a two-phase process—a trace process followed by a compaction process. The trace process determines which locations contain data that is still active or referenced. The compaction process removes data from locations that are no longer referenced.

In another implementation, a system is provided to perform garbage collection to compact data. The system includes an object store storing a backend object and one or more multiple network capable servers including an object store. The system includes circuitry to create a reference map in the object store to indicate which locations within a back-end object stored in the object store are currently referenced, and which locations within the back-end object stored in the object store are no longer referenced. The system includes circuitry to alter the back-end object stored in the object store to remove block data from the locations within the back-end object stored in the object store which are no longer referenced, and circuitry to remove entries within a hash-to-location table identifying locations of block data within the back-end object that have been removed.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 3A is a simplified schematic diagram and flow diagram of an alternate deduplication storage system in which a client application communicates via a network to a scale out cluster that include an application program interface (API) at multiple intermediary computing devices which perform deduplication, and then transmit data via a network to be stored in a cloud object store. FIG. 3A also shows how the intermediary computing devices can initiate a garbage collection by exchanging messages.

FIG. 11 is a data diagram illustrating the file or object table which maps file or object names to the location addresses where the files are stored.

DETAILED DESCRIPTION

Figure 1:
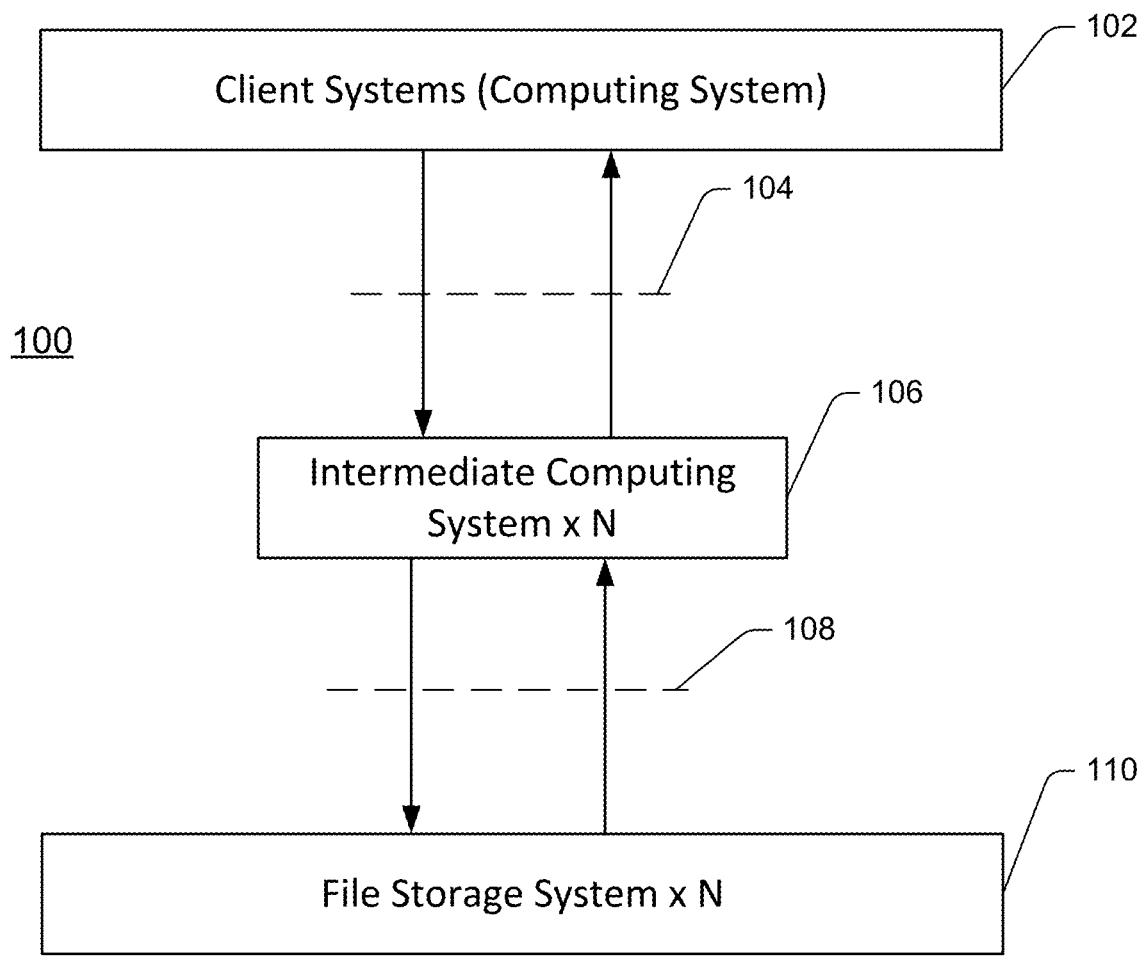
FIG. 1 is a simplified schematic diagram of a deduplication storage system using an intermediary networked device to perform deduplication.

Referring to FIG. 1, there is shown a deduplication storage system 100. Storage system 100 includes a client system 102, coupled via network 104 to Intermediate Computing system 106. Intermediate computing system 106 is coupled via network 108 to remotely located File Storage system 110.

Storage system 100 transmits data objects to intermediate computing system 106 via network 104. Intermediate computing system 106 includes a process for storing the received data objects on file storage system 100 to reduce duplication of the data objects when stored on file system 100.

Storage system 100 transmits requests via network 104 to intermediate computing system 106 for data store on file storage system 110. Intermediate computing system 106 responds to the requests by obtaining the deduplicated data on file system 110, and transmits the obtained data to client system 100.

Figure 2:
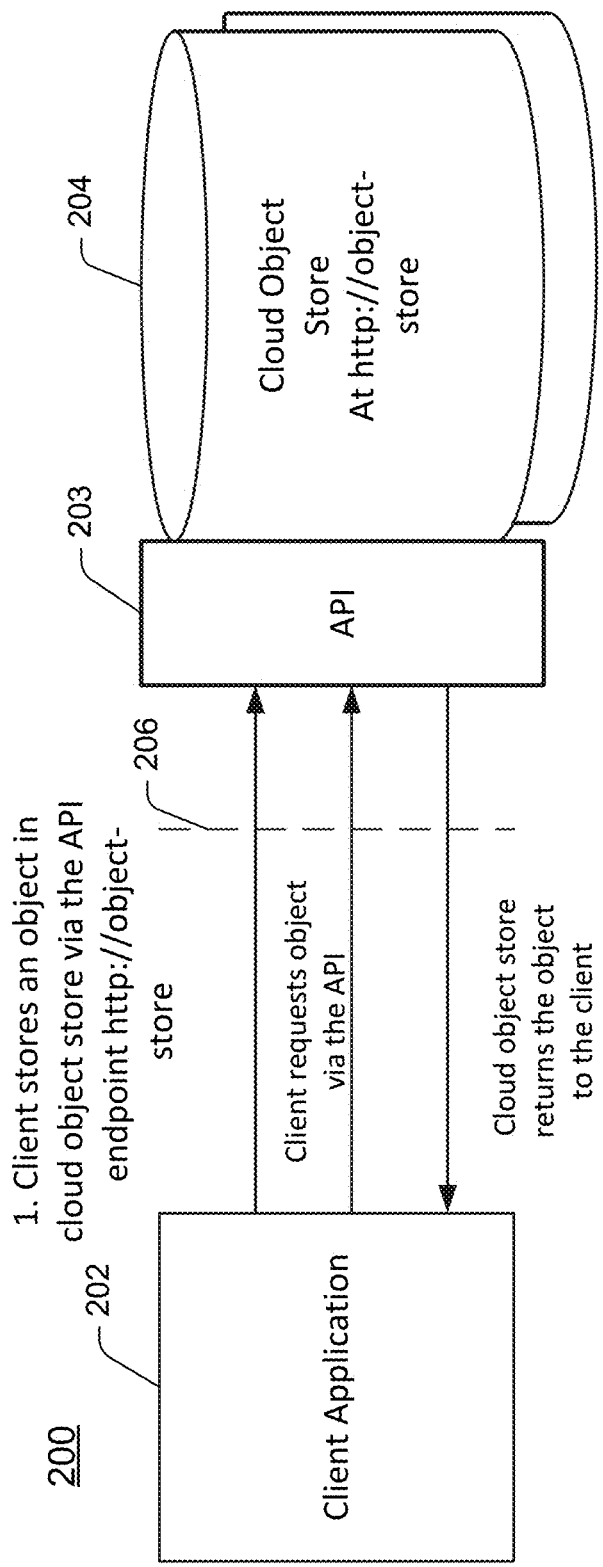
FIG. 2 is a simplified schematic and flow diagram of a storage system in which a client application on a client device communicates through an application program interface (API) directly connected to a cloud object store.

Referring to FIG. 2, a storage system 200 that includes a client application 202 on a client device 204 that communicates via a network 206 through an application program interface (API) 203 directly connected to a cloud object store 204. In one implementation the cloud object store may be a non-transitory memory storage device coupled with a server.

Figure 3:
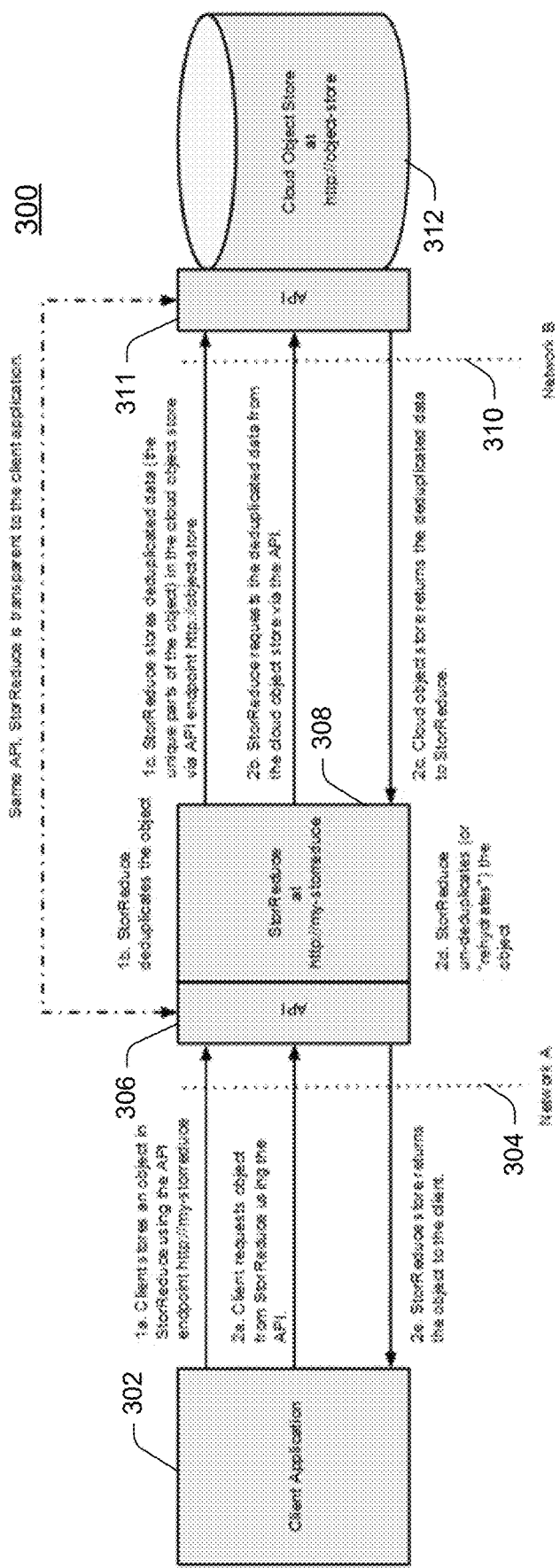
FIG. 3 is a simplified schematic diagram and flow diagram of a deduplication storage system in which a client application communicates via a network to an application program interface (API) at an intermediary computing device which performs deduplication, and then stores data via a network to a cloud object store.

Referring to FIG. 3, there is shown a deduplication storage system 300 including a client application 302 communicates data via a network 304 to an application program interface (API) 311 at an intermediary computing device 308. The data is deduplicated on intermediary computing device 308 and then the unique data is stored via a network 310 and API 311 (API 203 in FIG. 2) on a remotely disposed computing device 312 such as a cloud object store system that may typically be administered by an object store service.

Exemplary Networks 304 and 310 include, but are not limited to, an Ethernet Local Area Network, a Wide Area Network, an Internet Wireless Local Area Network, an 802.11g standard network, a WiFi network, a Wireless Wide Area Network running protocols such as GSM, WiMAX, or LTE.

Examples of the intermediary computing device 308, includes, but is not limited to, a Physical Server, a personal computing device, a Virtual Server, a Virtual Private Server, a Network Appliance, and a Router/Firewall.

Exemplary remotely disposed computing device 312 may include, but is not limited to, a Network Fileserver, an Object Store, an Object Store Service, a Network Attached device, a Web server with or without WebDAV.

Examples of the cloud object store include, but are not limited to, OpenStack Swift, IBM Cloud Object Storage and Cloudian HyperStore. Examples of the object store service include, but are not limited to, Amazon® S3, Microsoft® Azure Blob Service and Google® Cloud Storage.

During operation Client application 302 transmits a file via network 304 for storage by providing an API endpoint (such as http://my-storereduce.com) 306 corresponding to a network address of the intermediary device 308. The intermediary device 308 then deduplicates the file as described herein. The intermediary device 308 then stores the deduplicated data on the remotely disposed computing device 312 via API endpoint 311. In one exemplary implementation, the API endpoint 306 on the intermediary device is virtually identical to the API endpoint 311 on the remotely disposed computing device 312.

If client application need to retrieve a stored data file, client application 302 transmits a request for the file to the API endpoint 306. The intermediary device 308 responds to the request by requesting the deduplicated data from remotely disposed computing device 312 via API endpoint 311. The cloud object store 312 and API endpoint 311 accommodate the request by returning the deduplicated data to the intermediate device 308, that is then un-deduplicated by the intermediate device 308. The intermediate device 308 via API 306 returns the file to client application 302.

In one implementation, device 308 and a cloud object store is present on device 312 that present the same API to the network. In one implementation, the client application 302 uses the same set of operations for storing and retrieving objects. Preferably the intermediate device 307 is almost transparent to the client application. The client application 302 does not need to know that the intermediate API 311 and intermediate device 306 are present. When migrating from a system without the intermediate processing device 308 (as shown in FIG. 2) to a system with the intermediate processing device, the only change for the client application 302 is that location of the endpoint of where it stores data has changed in its configuration (e.g., from http://objectstore to http://mystorreduce). The location of the intermediate processing device can be physically close to the client application to reduce the amount of data crossing Network 310 which can be a low bandwidth Wide Area Network.

Referring to FIG. 3A, there is shown an alternate deduplication storage system 300a including a client application 302a that communicates data via a network 304a to a store reduce scale out cluster 305. Cluster 305 includes an application program interface (API) 306a and a load balancer 308 coupled to server 1 309a through server n 309n. Server 1 309a through server n 309n are coupled to cloud object store 312a via network 310a and API 311a. Computing device 308 may be a load balancer at exemplary network address http://my-storreduce. Servers 309a-309n may be located at exemplary network address http://storreduce-1 through http://storreduce-n.

The data is deduplicated using server 1 309a through server n 309n to determine unique data. The unique data determined from the deduplicating process is stored via a network 310a and API 311a (API 211 in FIG. 2) on a remotely disposed computing device 312a such as a public cloud object store system providing an object store service, or a private object store system.

Exemplary Networks 304a and 310a include, but are not limited to, an Ethernet Local Area Network, a Wide Area Network, an Internet Wireless Local Area Network, an 802.11g standard network, a WiFi network, a Wireless Wide Area Network running protocols such as GSM, WiMAX, or LTE.

Examples of the load balancer 308a and servers 309a-309n include, but are not limited to, a Physical Server, a personal computing device, a Virtual Server, a Virtual Private Server, a Network Appliance, and a Router/Firewall.

Exemplary remotely disposed computing device 312a may include, but is not limited to, a Network Fileserver, an Object Store, an Object Store Service, a Network Attached device, a Web server with or without WebDAV.

Examples of the cloud object store include, but are not limited to, OpenStack Swift, IBM Cloud Object Storage and Cloudian HyperStore. Examples of the object store service include, but are not limited to, Amazon® S3, Microsoft® Azure Blob Storage and Google® Cloud Storage.

During operation, the Client application 302a transmits a file (request 1A) via network 304a for storage by using an API endpoint (such as http://my-storreduce.com) 306a corresponding to a network address of the load balancer 308. The load balancer 308 chooses a server to send the request to and forwards the request (1A), in this case to Server 309a. This Coordinating Server (309a) will split the file into blocks of data and calculate the hash of each block. Each block will be assigned to a shard based on its hash, and each shard is assigned to one of servers 309a-309n. The Coordinating Server will send each block of data to the server (309a to 309n) responsible for that shard, shown as "Key Shard and Block Shard Requests" in the diagram.

Servers 309a-309n each perform deduplication for the blocks of data sent to them as described herein (step 1b), and store the deduplicated data on the remotely disposed computing device 312a via API endpoint 311a (requests "1C (shard 1)" through to "1C (shard n)" on FIG. 3A). In one exemplary implementation, the API endpoint 306a on the intermediary device is virtually identical to the API endpoint 311a on the remotely disposed computing device 312.

Servers 309a-309n each send location information for their Block data back to the Coordinating Server. The Coordinating Server then arranges for this location information to be stored.

If client application need to retrieve a stored data file, client application 302a transmits a request (2A) for the file to the API endpoint 306a. The load balancer 308 chooses a server to send the request to and forwards the request (2A), in this case to Server 309b. This Coordinating Server (309b) will fetch location information for each block in the file, including the shard to which each block of data was assigned.

In one implementation, the Coordinating server will send a request to fetch each block of data to the server (309a to 309n) responsible for that shard, shown as "Key Shard and Block Shard Requests" in the diagram.

Servers 309a-309n respond to the Block shard requests by requesting the deduplicated data from remotely disposed computing device 312a via API endpoint 311a (requests "2B (Shard 1)" through to "2B (Shard n)" on FIG. 3A). The cloud object store 312a and API endpoint 311a accommodate the requests by returning the deduplicated data to servers 309a-309n (responses "2C (shard 1)" through to "2C (shard n)" on FIG. 3A). Servers 309a-309n return the block data to the Coordinating Server (in this case Server 309b).

In an alternative implementation, the Coordinating server will directly fetch each block of data from remotely disposed computing device 312a via API endpoint 311a. The cloud object store 312a and API endpoint 311a accommodate the requests by returning the deduplicated data to the Coordinating server.

The data is then un-deduplicated by the Coordinating Server. The resulting file (2E) is returned to the load balancer (308) which then returns the file via API 306a to client application 302a.

In one implementation, device 309a and the cloud object store on device 312a present the same API to the network. In one implementation, the client application 302a uses the same set of operations for storing and retrieving objects. Preferable the intermediate scale-out cluster 300a is almost transparent to the client application. The client application 302a does not need to know that the intermediate API 306a and intermediate scale-out cluster 300a are present. When migrating from a system without the intermediate scale-out cluster 300a (as shown in FIG. 2) to a system with the intermediate processing device, the only change for the client application 302a is that location of the endpoint of where it stores data has changed in its configuration (e.g., from http://objectstore to http://mystorreduce). The location of the intermediate scale-out cluster 300a can be physically close to the client application to reduce the amount of data crossing Network 310 which can be a low bandwidth Wide Area Network.

The objects being managed by the system 300a each have an object key, and these keys are used to divide the of objects into sets known as key shards. Each key shard is assigned to a server within the cluster, which is then responsible for managing information for each object in that key shard. In particular, information about the set of blocks which make up the data for the object is managed by the key shard server for that object.

The unique blocks of data being managed by the system 300 are each identified by their hash, using a cryptographic hash algorithm. The hash namespace is divided into subsets known as block shards. Each block shard is assigned to a server within the cluster, which is then responsible for operations on blocks whose hashes fall within that subset of the hash namespace. In particular, the block shard server can answer the question "is this block with this hash new/unique, or do we already have it stored?". The block shard server is also responsible for storing and retrieving blocks whose hashes fall within its subset of the hash namespace. During garbage collection the block shard server collects and merges the reference maps from every key shard (as described in FIG. 14) and then runs the compaction process (as described in FIG. 15) to remove blocks that are no longer referenced.

Each block shard is responsible for storing blocks into the underlying object store (also known as the 'cloud object store'). Multiple blocks may be grouped together into an aggregate block in which case all blocks in the aggregate block are stored in a single 'file' (object) in the underlying object store.

When writing an object to the system, each block is hashed and sent to the appropriate block shard, which will look up the block hash, store the block data if it is unique, and return a reference to the block. After all blocks are stored, the references are collated from the various block shards. A key is assigned to the object and the corresponding key shard stores the list of references for the blocks making up the object.

When reading an object back from the system, the key is provided by the client and the corresponding key shard supplies the list of references for the blocks making up the object. For each reference the block data is retrieved from the cloud object store. The data for all blocks is then assembled and returned to the client.

When deleting an object, the key is provided by the client, and the corresponding key shard deletes the information held about this object, including the list of references for the blocks making up the object. No changes are made within the block shards for those blocks.

After deletion of an object each block may or may not still be referenced by other objects, so no blocks are deleted at this stage and no storage space is reclaimed—this is the purpose of the garbage collection process. Deleting an object simply removes that object's references to its data blocks from the key shard for the object.

Readers will appreciate that although some examples depicted herein have URL targets for Object Stores that are non-secure (i.e., "http" URL targets), in other embodiments the URL targets may support secure transmission methods (i.e., "https" URL targets or similar). In fact, other forms of secure or even unsecure transmission methods may be implemented in accordance with various embodiments of the present disclosure.

Example Computing Device Architecture

Figure 4:
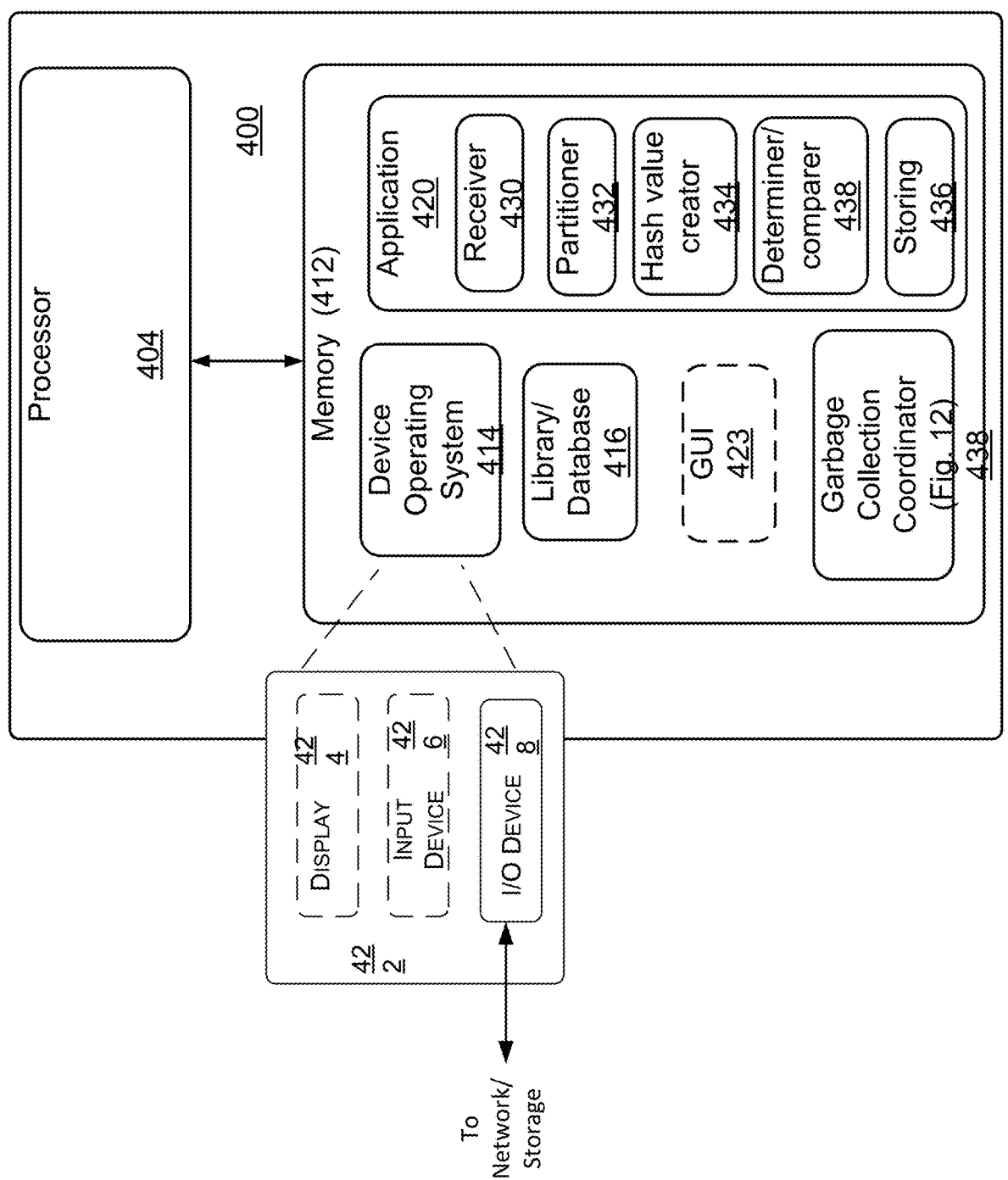
FIG. 4 is a simplified schematic diagram of an intermediary computing device shown in FIG. 3.
Figure 5:
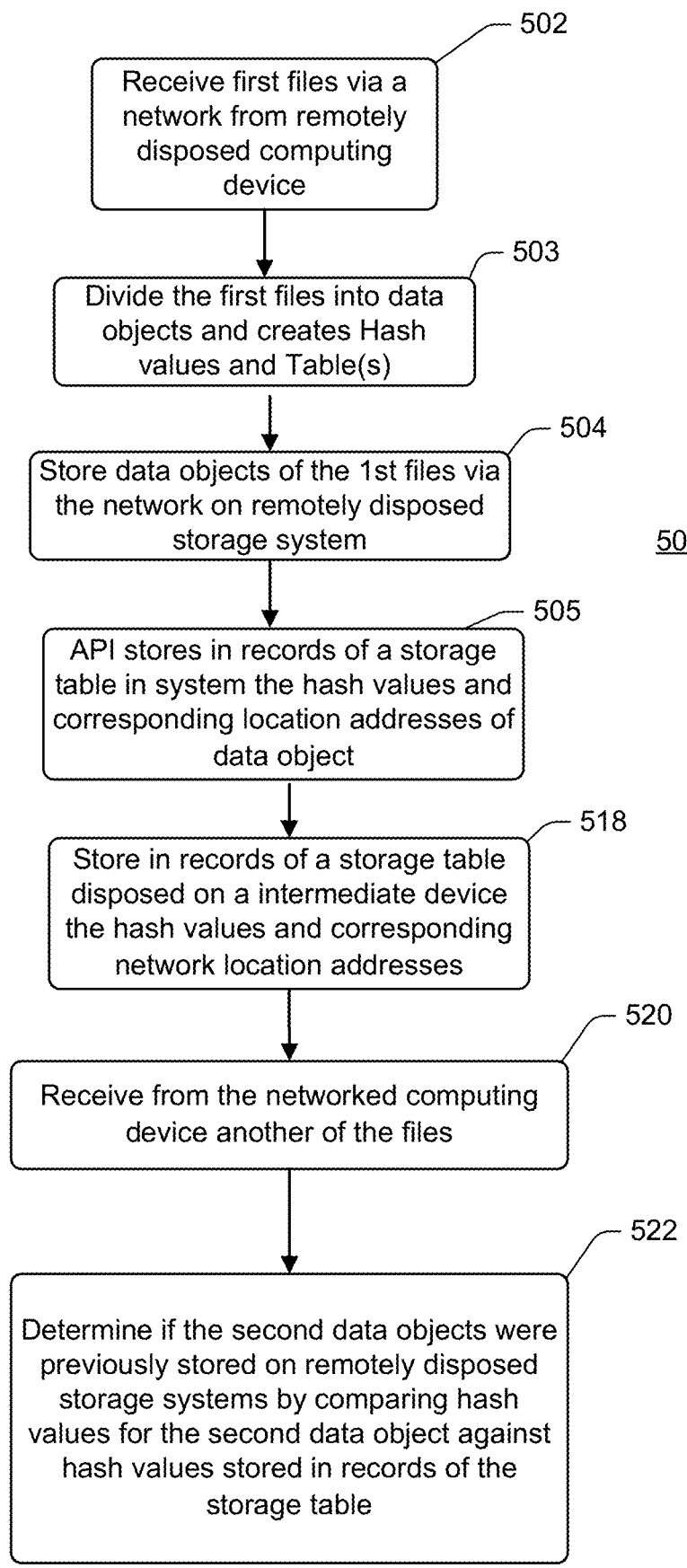
FIG. 5 is a flow chart of a process for storing and deduplicating data executed by the intermediary computing device shown in FIG. 3.
Figure 6:
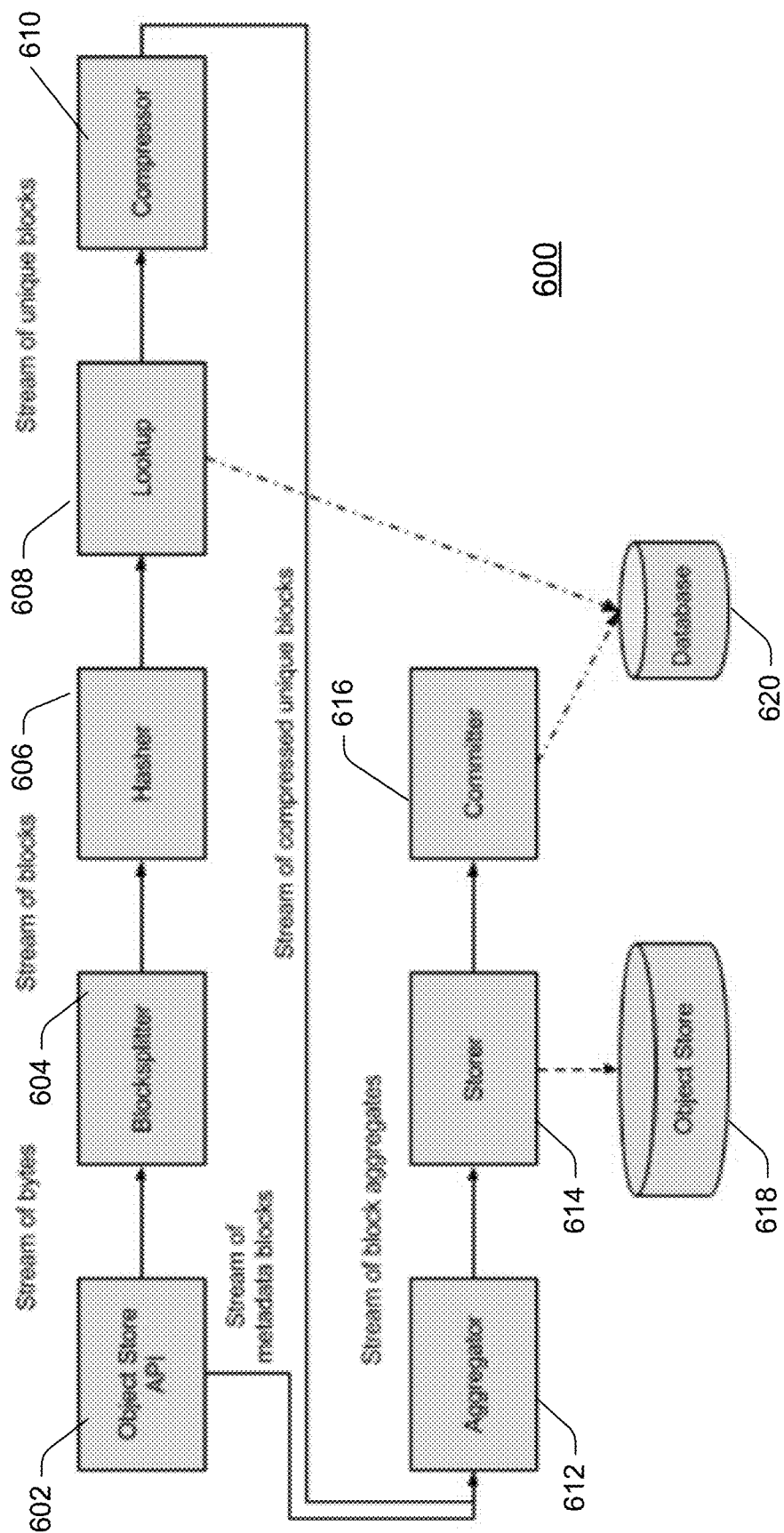
FIG. 6 is a flow diagram illustrating the process for storing and deduplicating data.

In FIG. 4 are illustrated selected modules in computing device 400 using processes 500 and 600 shown in FIGS. 5-6 respectively to store and retrieve deduplicated data objects. Computing device 400 (such as intermediary computing device 308 shown in FIG. 3 and the intermediary computing devices 309a-n shown in FIG. 3A) includes a processing device 404 and memory 412. Computing device 400 may include one or more microprocessors, microcontrollers or any such devices for accessing memory 412 (also referred to as a non-transitory media) and hardware 422. Computing device 400 has processing capabilities and memory suitable to store and execute computer-executable instructions.

Computing device 400 executes instruction stored in memory 412, and in response thereto, processes signals from hardware 422. Hardware 422 may include an optional display 424, an optional input device 426 and an I/O communications device 428. I/O communications device 428 may include a network and communication circuitry for communicating with network 304, 310 or an external memory storage device.

Optional Input device 426 receives inputs from a user of the computing device 400 and may include a keyboard, mouse, track pad, microphone, audio input device, video input device, or touch screen display. Optional display device 424 may include an LED, LCD, CRT or any type of display device to enable the user to preview information being stored or processed by computing device 404.

Memory 412 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computer system.

Stored in memory 412 of the computing device 400 may include an operating system 414, a deduplication system application 420 and a library of other applications or database 416. Operating system 414 may be used by application 420 to control hardware and various software components within computing device 400. The operating system 414 may include drivers for device 400 to communicate with I/O communications device 428. A database or library 418 may include preconfigured parameters (or set by the user before or after initial operation) such server operating parameters, server libraries, HTML libraries, API's and configurations. An optional graphic user interface or command line interface 423 may be provided to enable application 420 to communicate with display 424.

Application 420 includes a receiver module 430, a partitioner module 432, a hash value creator module 434, determiner/comparer module 438 and a storing module 436.

The receiver module 430 includes instructions to receive one or more files via the network 304 from the remotely disposed computing device 302. The partitioner module 432 includes instructions to partition the one or more received files into one or more data objects. The hash value creator module 434 includes instructions to create one or more hash values for the one or more data objects. Exemplary algorithms to create hash values include, but is not limited to, MD2, MD4, MD5, SHA1, SHA2, SHA3, RIPEMD, WHIRLPOOL, SKEIN, Buzhash, Cyclic Redundancy Checks (CRCs), CRC32, CRC64, and Adler-32.

The determiner/comparer module 438 includes instructions to determine, in response to a receipt from a networked computing device (e.g. device hosting application 302) of one of the one or more additional files that include one or more data objects, if the one or more data objects are identical to one or more data objects previously stored on the one or more remotely disposed storage systems (e.g. device 312) by comparing one or more hash values for the one or more data objects against one or more hash values stored in one or more records of the storage table.

The storing module 436 includes instructions to store the one or more data objects on one or more remotely disposed storage systems (such as remotely disposed computing device 312 using API 311) at one or more location addresses, and instructions to store in one or more records of a storage table, for each of the one or more data objects, the one or more hash values and a corresponding one or more location addresses. The storing module also includes instructions to store in one or more records of the storage table for each of the received one or more data objects if the one or more data objects are identical to one or more data objects previously stored on the one or more remotely disposed storage systems (e.g. device 312), the one or more hash values and a corresponding one or more location addresses of the received one or more data objects, without storing on the one or more remotely disposed storage systems (device 312) the received one or more data objects identical to the previously stored one or more data objects.

Illustrated in FIGS. 5 and 6, are exemplary processes 500 and 600 for deduplicating storage across a network. Such exemplary processes 500 and 600 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4, although it may be implemented in other system architectures.

Referring to FIG. 5, a flowchart of process 500 executed by a deduplication application 420 (See FIG. 4) (hereafter also referred to as "application 420") is shown. In one implementation, process 400 is executed in a computing device, such as intermediate computing device 308 (FIG. 3). Application 420, when executed by the processing devices, uses the processor 404 and modules 416-438 shown in FIG. 4.

In block 502, application 420 in computing device 308 receives one or more files via network 304 from a remotely disposed computing device (e.g. device hosting application 302).

In block 503, application 420 divides the received files into data objects, creates hash values for the data objects or portions thereof, and stores the hash values into a storage table in memory on intermediate computing device (e.g. an external computing device, or system 312).

In block 504, application 420 stores the one or more files via the network 310 onto a remotely disposed storage system 312 via API 311.

In block 505, optionally an API within system 312 stores within records of the storage table disposed on system 312 the hash values and corresponding location addresses identifying a network location within system 312 where the data object is stored.

In block 518, application 420 stores in one or more records of a storage table disposed on the intermediate device 308 or a secondary remote storage system (not shown) for each of the one or more data objects the one or more hash values and a corresponding one or more network location addresses. Application 420 also stores in a file table (FIG. 11) the names of the files received at in block 502 and the location addresses created at block 505.

In one implementation, the one or more records of a storage table are stored for each of the one or more data objects the one or more hash values and a corresponding one or more location addresses of the data object without storage of an identical data object on the one or more remotely disposed storage systems. In another implementation, the one or more hash values are transmitted to the remotely disposed storage systems for storage with the one or more data objects. The hash value and a corresponding one or more new location addresses may be stored in the one or more records of the storage table. Also the one or more data objects may be stored on one or more remotely disposed storage systems at one or more location addresses with the one or more hash values.

In block 520, application 420 receive from the networked computing device another of the one or more files.

In block 522, in response to the receipt from a networked computing device of another of the one or more files including one or more data objects, application 420 determine if the one or more data objects were previously stored on one or more remotely disposed storage systems 312 by comparing one or more hash values for the data object against one or more hash values stored in one or more records of the storage table.

In one implementation, the application 420 may deduplicate data objects previously stored on any storage system by including instructions that read one or more files a stored on the remotely disposed storage system, divide the one or more files into one or more data objects, and create one or more hash values for the one or more file data objects. Once the hash values are created, application 420 may store the one or more data objects on one or more remotely disposed storage systems at one or more location addresses, store in one or more records of the storage table, for each of the one or more data objects, the one or more hash values and a corresponding one or more location addresses, and in response to the receipt from the networked computing device of the another of the one or more files including the one or more data objects, determine if the one or more data objects were previously stored on one or more remotely disposed storage systems by comparing one or more hash values for the data object against one or more hash values stored in one or more records of the storage table. The filenames of the files are stored in the file table (FIG. 11) along with the location addresses of the duplicate data objects (from the first files) and the location addresses of the unique data objects from the files.

Referring to FIG. 6, there is shown an alternate embodiment of system architecture diagram illustrating a process 600 for storing data objects with deduplication. Process 600 may be implemented using an application 420 in intermediate computing device 308 shown in FIG. 3.

In block 602, the process includes an application (such as application 420) that receives a request to store an object (e.g., a file) from a client (e.g., the "Client System" in FIG. 1). The request typically consists of an object key (e.g., like a filename), the object data (a stream of bytes) and some metadata.

In block 604, the application splits that the stream of data into blocks, using a block splitting algorithm. In one implementation, the block splitting algorithm could generate variable length blocks like the algorithm described in U.S. Pat. No. 5,990,810 (which is hereby incorporated by reference) or, could generate fixed length blocks of a predetermined size, or could use some other algorithm that produces blocks that have a high probability of matching already stored blocks. When a block boundary is found in the data stream, a block is emitted to the next stage. The block could be almost any size.

In block 606, each block is hashed using a cryptographic hash algorithm like MD5, SHA1 or SHA2 (or one of the other algorithms previously mentioned). Preferably, the constraint is that there must be a very low probability that the hashes of different blocks are the same.

In block 608, each data block hash is looked up in a table mapping block hashes that have already been encountered to data block locations in the cloud object store (e.g. a hash-to-location table). If the hash is found, then that block location is recorded, the data block is discarded and block 616 is run. If the hash is not found in the table, then the data block is compressed in block 610 using a lossless text compression algorithm (e.g., algorithms described in Deflate U.S. Pat. No. 5,051,745, or LZW U.S. Pat. No. 4,558,302, the contents of which are hereby incorporated by reference).

In block 612, the data blocks are optionally aggregated into a sequence of larger aggregated data blocks to enable efficient storage. In block 614, the blocks (or aggregate blocks) are then stored into the underlying object store 618 (the "cloud object store" 312 in FIG. 3). When stored, the data blocks are ordered by naming them with monotonically increasing numbers in the object store 618.

In block 616, after the data blocks are stored in the cloud object store 618, the hash-to-location table is updated, adding the hash of each block and its location in the cloud object store 618.

The hash-to-location table (referenced here and in block 608) is stored in a database (e.g. database 620) that is in turn stored in fast, unreliable, storage directly attached to the computer receiving the request. The block location takes the form of either the number of the aggregate block stored in block 614, the offset of the block in the aggregate, and the length of the block; or, the number of the block stored in block 614.

In block 616, the list of network locations from blocks 608-614 may be stored in the object-key-to-location table (FIG. 11), in fast, unreliable, storage directly attached to the computer receiving the request. Preferably the object key and block locations are stored into the cloud object store 618 using the same monotonically increasing naming scheme as the block records. Each file sent to the system is identified by an Object Key. For each file, the Object-Key-to-Location table contains a list of locations for the blocks making up the file. Each of these Locations is known as a 'reference' to the corresponding block. The hash-to-location table is independent of the object-key-to-location table. It contains an entry for every block stored in the system, regardless of whether it is referenced in the object-key-to-location table.

The process may then revert to block 602, in which a response is transmitted to the client device (mentioned in block 602) indicating that the data object has been stored.

Figure 7:
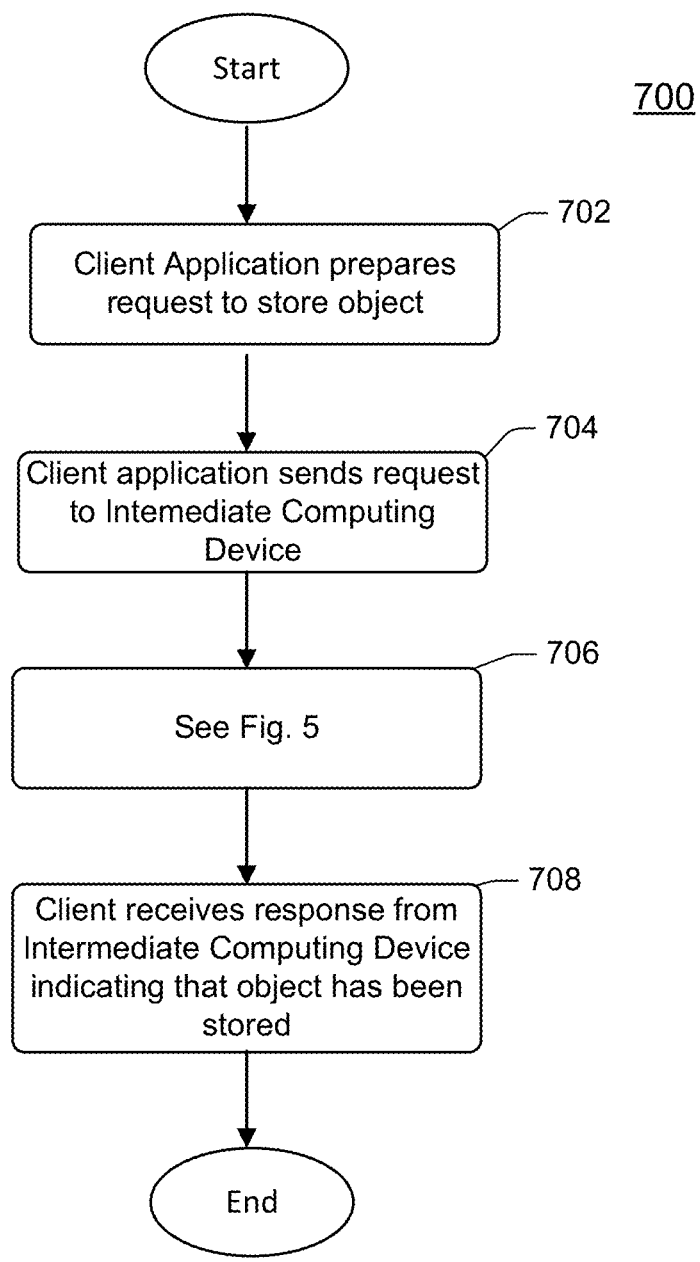
FIG. 7 is a flow diagram illustrating the process for storing and deduplicating data executed on the client device of FIG. 3.

Illustrated in FIG. 7, is exemplary process 700 implemented by the client application 302 (See FIG. 3) for deduplicating storage across a network. Such exemplary process 700 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to FIG. 3, although it may be implemented in other system architectures.

In block 702, client application 302 prepares a request for transmission to intermediate computing device 308 to store a data object. In block 704, client application 302 transmits the data object to intermediate computing device 308 to store a data object.

In block 706, process 500 or 600 is executed by device 308 to store the data object.

In block 708, the client application receives a response notification from the intermediate computing system indicating the data object has been stored.

Figure 8:
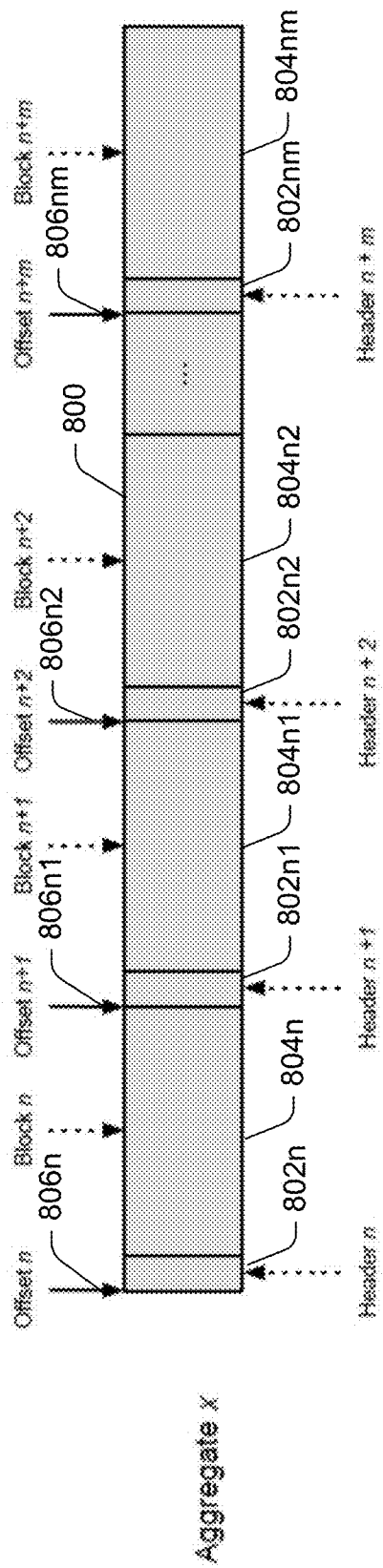
FIG. 8 is a data diagram illustrating how data is partitioned into blocks for storage.

Referring to FIG. 8, an exemplary aggregate data object 800 as produced by block 612 is shown. The data object includes a header 802n-802nm, with a block number 804n-804nm and an offset indication 806n-806nm, and includes a data block.

Figure 9:
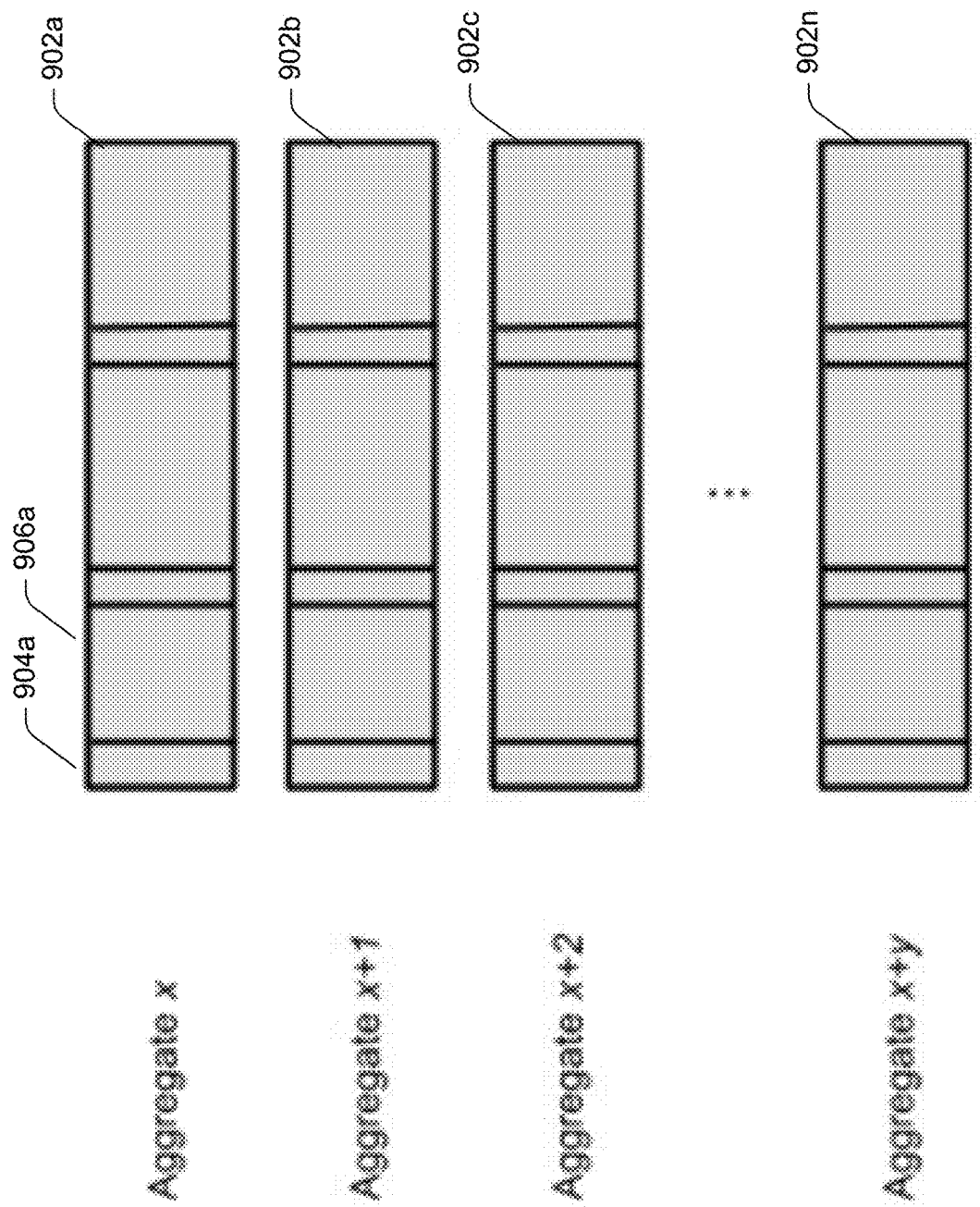
FIG. 9 is a data diagram illustrating how the partitioned data blocks are stored in memory.

Referring to FIG. 9, an exemplary set of aggregate data objects 902a-902n for storage in memory is shown. The data objects 902a-902n each include the header (e.g. 904a) (as described in connection with FIG. 8) and a data block (e.g. 906a).

Figure 10:
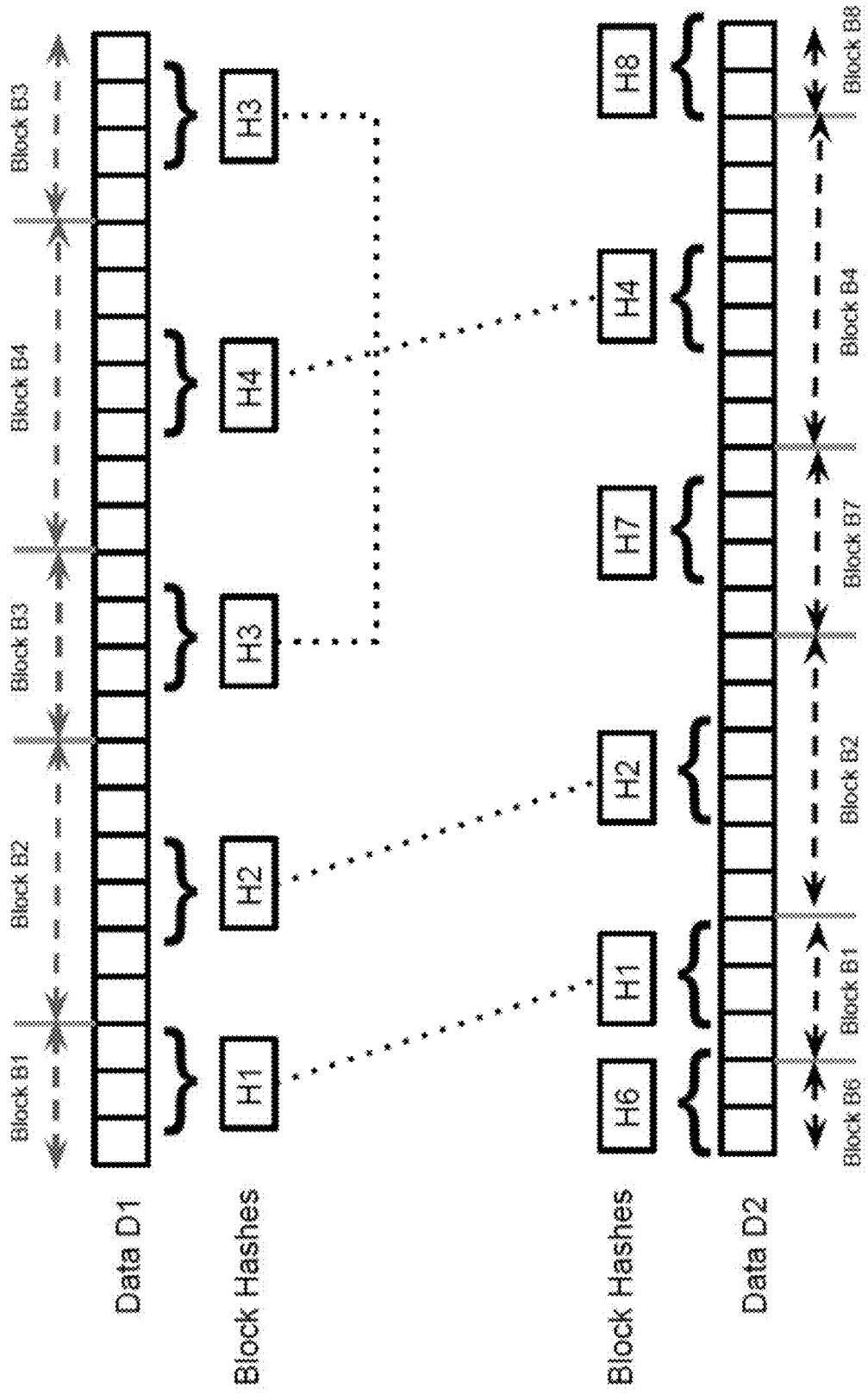
FIG. 10 is a data diagram illustrating a relation between a hash and the data blocks that are stored in memory.

Referring to FIG. 10, an exemplary relation between the hashes (e.g. H1-H8) (which are stored in a separate deduplication table) and two separate data objects D1 and D2 are shown. Portions within blocks B1-B4 of file D1 are shown with hashes H1-H4, and portions within blocks B1, B2, B4, B7, and B8 of file D2 are shown with hashes H1, H2, H4, H6, H7, and H8 respectively. It is noted that portions of data objects having the same hash value are only stored in memory once with its location of storage within memory recorded in the deduplication table along with the hash value.

Referring to FIG. 11, a table 1100 is shown with filenames ("Filename 1"-"Filename N") of the files stored in the file table along with their data objects for the files' network location addresses. Exemplary data objects of Filename 1 are stored at network location address 1-5. Exemplary data objects of Filename 2 are stored at location address 6, 7, 3, 4, 8 and 9. The data objects of "Filename 2" are stored at location address 3 and 4 are shared with "Filename 1". "Filename 3" is a clone of "Filename 1" sharing the data objects at location addresses 1, 2, 3, 4 & 5. "Filename N" shares data objects with "Filename 1" and "Filename 2" at location addresses 7, 3 and 9.

Figure 12:
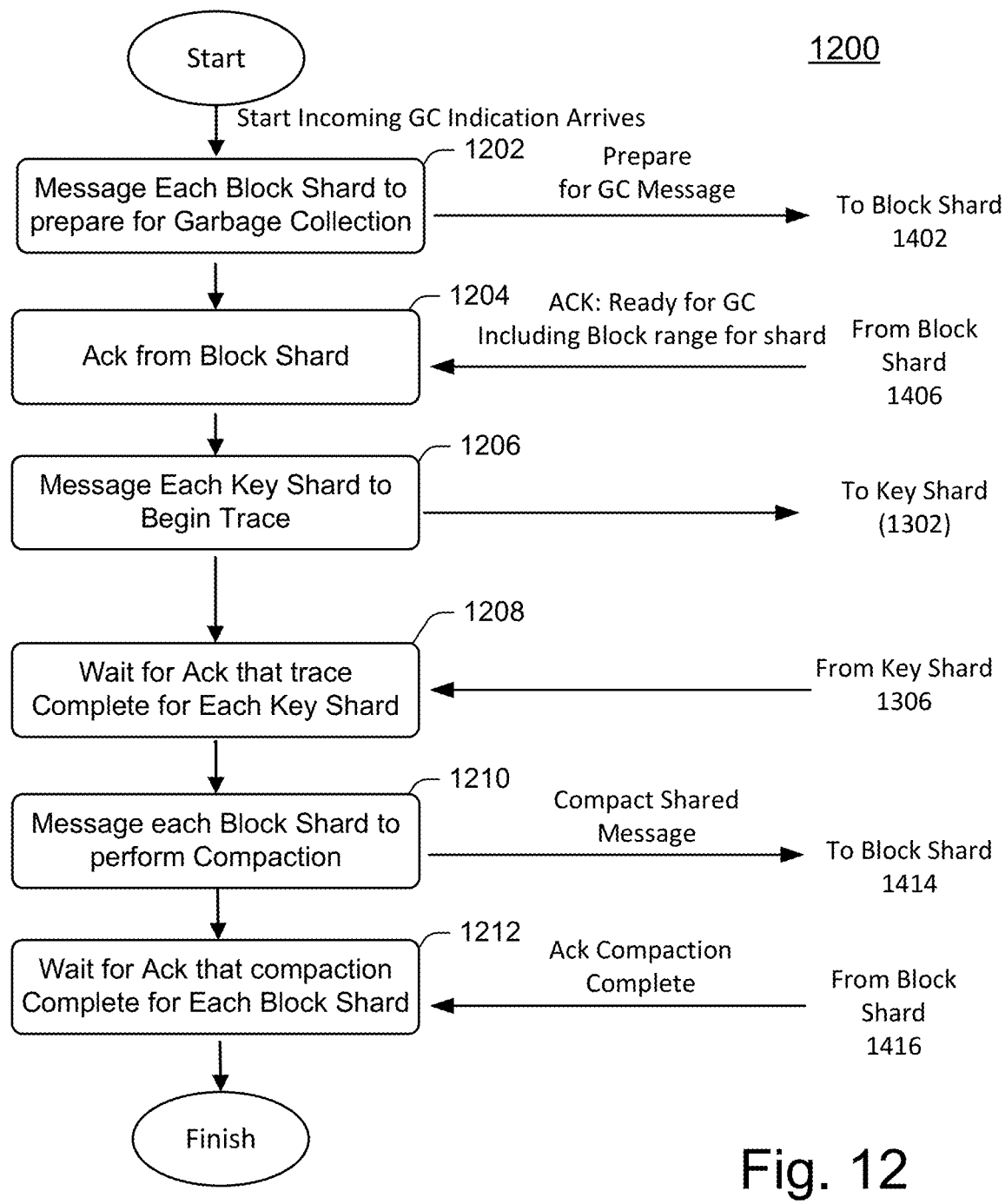
FIG. 12 is a data diagram illustrating a garbage collection coordination process for coordinating garbage collection by an arbitrarily selected StorReduce server in FIG. 3A.

Illustrated in FIG. 12, is exemplary process 1200 implemented by servers 309a-309n (See FIG. 3a) and garbage collection coordinator module 438 (FIG. 4) for deduplicating storage and garbage collection across a network. Garbage collection coordinator module 438 in one of servers 309a-309n is nominated to orchestrate the garbage collection process by whichever server the load balancer happened to forward the 'start garbage collection' request. This will be abbreviated to "GC Coordinator" in the following text and in FIGS. 12 to 15. Such exemplary process 1200 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to FIG. 3a, although it may be implemented in other system architectures.

Each key shard is allocated to a specific server from 309a to 309n, known as the key shard server for that shard. Each block shard is allocated to a specific server from 309a to 309n, known as the block shard server for that shard. To keep the descriptions in the following text concise we refer to sending a message 'to a block shard' or 'to a key shard'. In each case the message is actually sent to the key shard server or block shard server (309a-309n) for that shard, and then the message is internally routed to the key shard component or block shard component for the shard within that server. A reference map is a data structure used to record a set of references to specific block locations, to determine which blocks are 'in-use', versus those able to be deleted. A variety of data structures can be used to implement the reference map.

The GC coordinator sends a message to each key shard to begin a trace operation for that key shard. Each request will include the block range information for every block shard. The trace operation will find all references to blocks that should prevent those blocks from being deleted, across all block shards.

Specifically, in block 1202, an incoming request to Start Garbage Collection arrives into the scale-out cluster, via the Load Balancer. In block 1202 each block shard (in servers 309a-309n) is messaged to prepare for garbage collection (see 1402).

In block 1204 the GC coordinator waits for an 'acknowledge ready for garbage collection' message to be received from each block shard (see 1406). This message will include a block range for the shard.

In block 1206, each key shard (in servers 309a-309n) is sent a message to begin a trace (see 1302) and in block 1208, the coordinator waits for an acknowledgement from each key shard that the trace is complete (see 1306).

In block 1210, the coordinator sends a message to each block shard to perform compaction (see 1414).

In block 1212, the coordinator waits for an acknowledgement from each block shard that compaction has been complete (see 1416).

Figure 13:
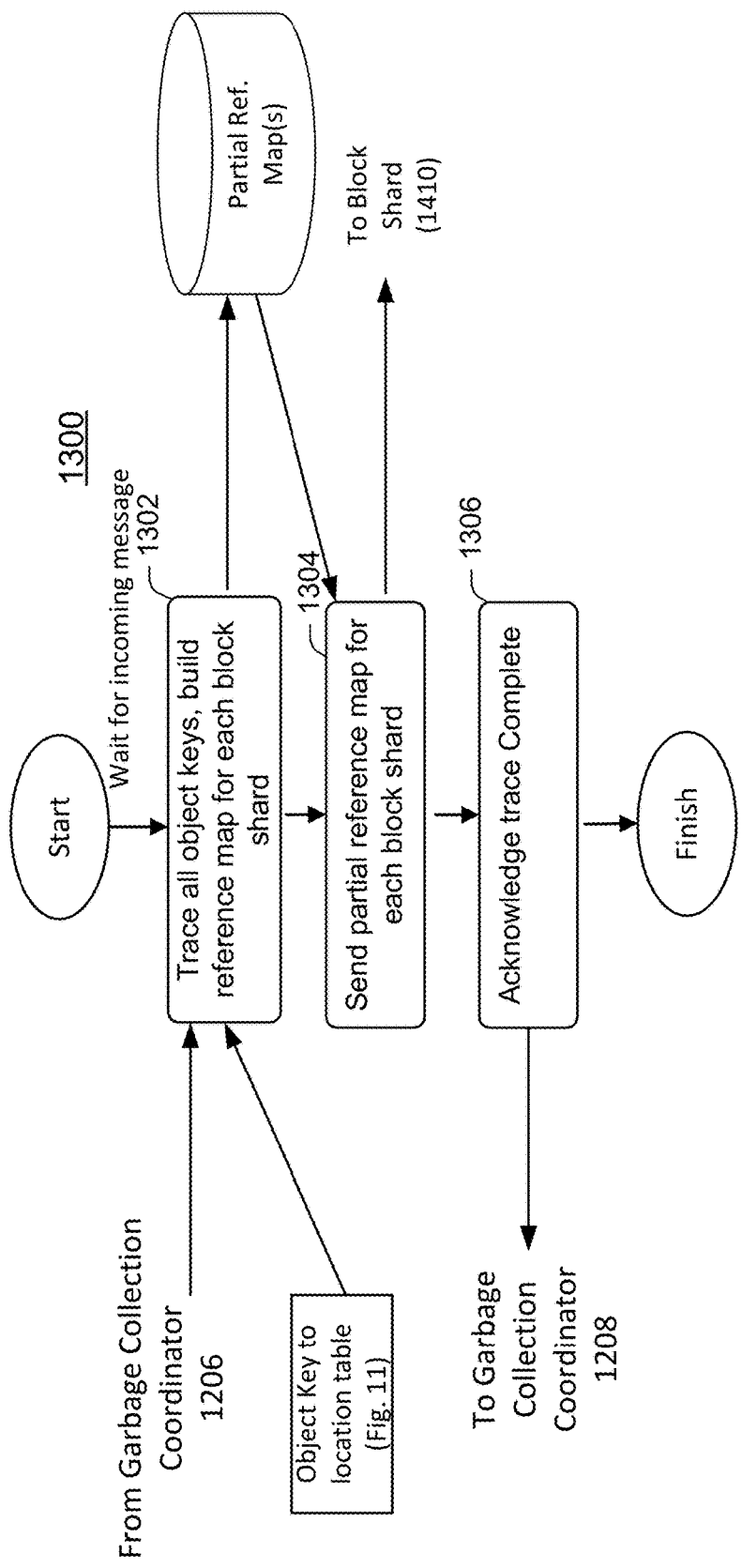
FIG. 13 is a data diagram illustrating a trace process for tracing references in each key shard on StorReduce Servers in FIG. 3A.

Illustrated in FIG. 13, is exemplary process 1300 implemented by key shard modules in servers 309a-309n (FIG. 3a) for performing a trace operation during a garbage collection process across a network. Such exemplary process 1300 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to FIG. 3a, although it may be implemented in other system architectures.

The key shard server performs the following trace process:

a) A partial reference map is created for each block shard, to record the references found. The location of each block that is referenced (i.e. still used) as part of a file is recorded in the reference map. The aim is to find blocks that are no longer referenced so they can be deleted. The key shard server traces through every entry in the object-key-to-location table for every shard, and collect up all the references. The references can be compared with the list of blocks being managed to find blocks that are no longer needed (because the files that used to reference them have been removed).

b) The key shard iterates through the object-key-to-location table for all the objects it manages, recording each reference to a block in the appropriate partial reference map.

c) After a key shard has finished recording references, each partial reference map is sent to its corresponding block shard server.
d) After all reference maps have been sent, the key shard server responds to the GC coordinator, acknowledging that the trace operation is complete for that key shard.

Specifically, in block 1302, after waiting for an incoming message from garbage collection coordinator (see 1206) to start process 1300, all object keys in this key shard are traced and a reference map for each block shard is built using the object-key-to-location table (See FIG. 11) and stored in a partial reference map.

In block 1304, the key shard reads the partial reference map for each block shard and sends each partial reference map to the corresponding block shard (see 1410).

In block 1306, an acknowledgement that the trace is complete is sent to the garbage collection coordinator (see 1208). Once all trace operations have been completed, the Garbage Collection coordinator can begin compaction operations.

Figure 14:
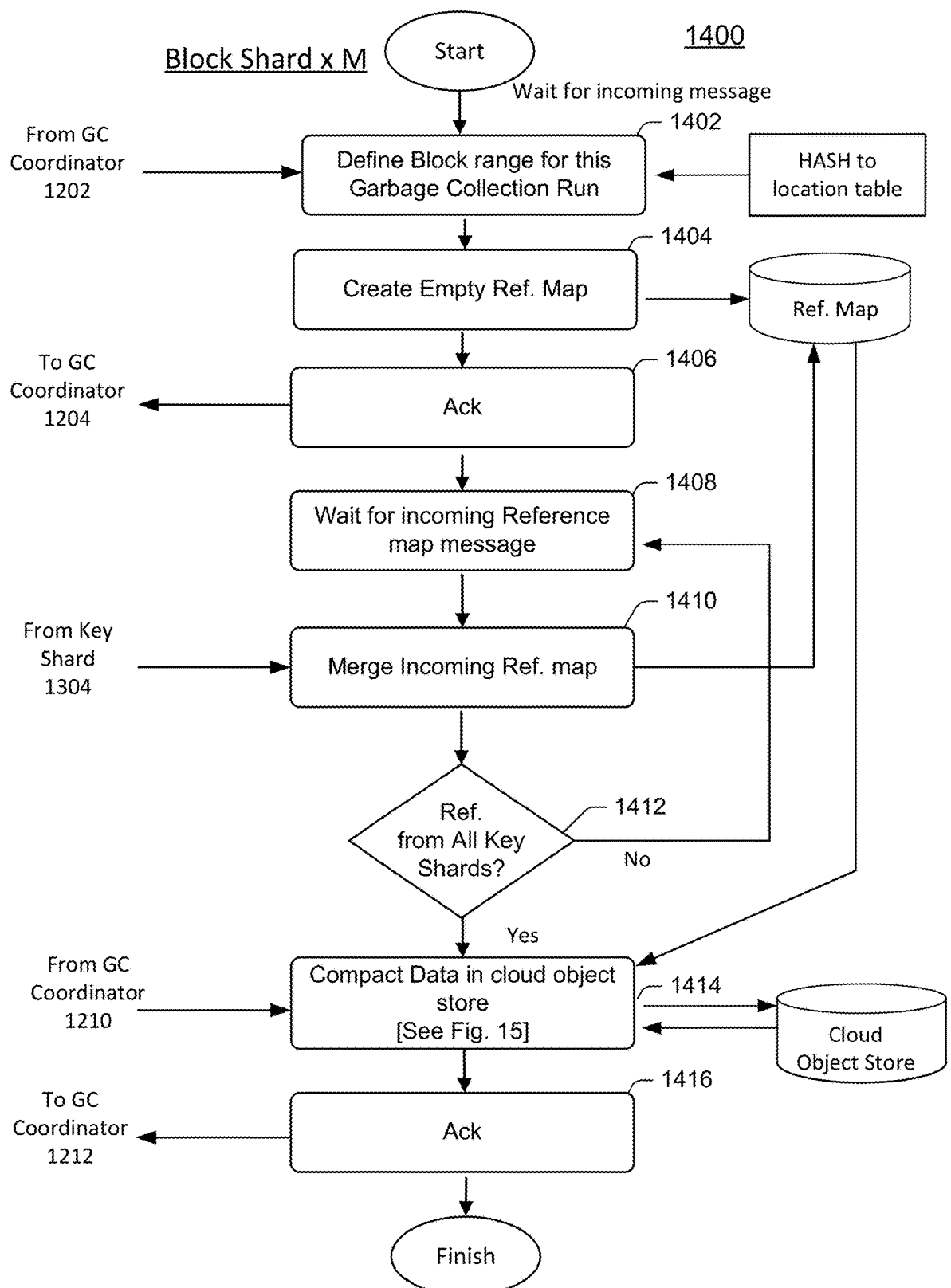
FIG. 14 is a data diagram illustrating a compaction process for compacting data stored in each block shard on StorReduce Servers in FIG. 3A.

Illustrated in FIG. 14, is exemplary process 1400 implemented by block shard modules in servers 309a-309n (FIG. 3a) for performing a compaction operation during a garbage collection process across a network. Such exemplary process 1400 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to FIG. 3a, although it may be implemented in other system architectures.

For each block shard, the corresponding block shard server performs the following process:
A) The current maximum block location for the shard is recorded. This defines the block location range for this shard, which is the set of block locations that will be covered by this GC operation.
B) An empty reference map is created covering the block range. The partial reference maps produced during the trace operation will be merged into this reference map.
C) The block shard server responds to the GC coordinator, acknowledging that it is now ready for GC and providing information about the block range covered by this GC operation.

For each block shard, the block shard server will receive partial reference maps from each key server containing the results of that key server's trace operation. Each incoming partial reference map is merged with the existing reference map for the block shard, contributing more references to blocks. Once the partial reference maps from all key shard servers have been received and merged, the resulting map will contain an exhaustive list of references to blocks in this block shard (within the block location range).

Specifically, in block 1402, the block shard module waits for an incoming message from the GC Coordinator and defines a block location range for this garbage collection run, referencing the hash-to-location table.

In block 1404, the block shard module creates an empty reference map in the reference map table, and in block 1406 the block shard module sends an acknowledgement to the GC Coordinator.

In block 1408, the block shard module waits for incoming partial reference maps from each key shard (see 1304), and then, in block 1410, merges each incoming partial reference map into the existing reference map for the shard. Where the reference maps are implemented using a bitmap, the merge operation is implemented by performing a bitwise OR operation on each corresponding bit in the two bitmaps to merge the two sets of references.

In block 1412 a determination is made whether an incoming partial reference map has been received from all key shards. If it has not, then blocks 1408-1410 are repeated. If all incoming reference maps have been received, and a 'begin compaction' message has been received from the GC Coordinator (see 1210), data compaction is performed in the cloud object store in block 1414 (See FIG. 15 for more detail).

After the data is compacted in the cloud object store, in block 1416 an acknowledgement is transmitted to the GC Coordinator (see 1212).

Figure 15:
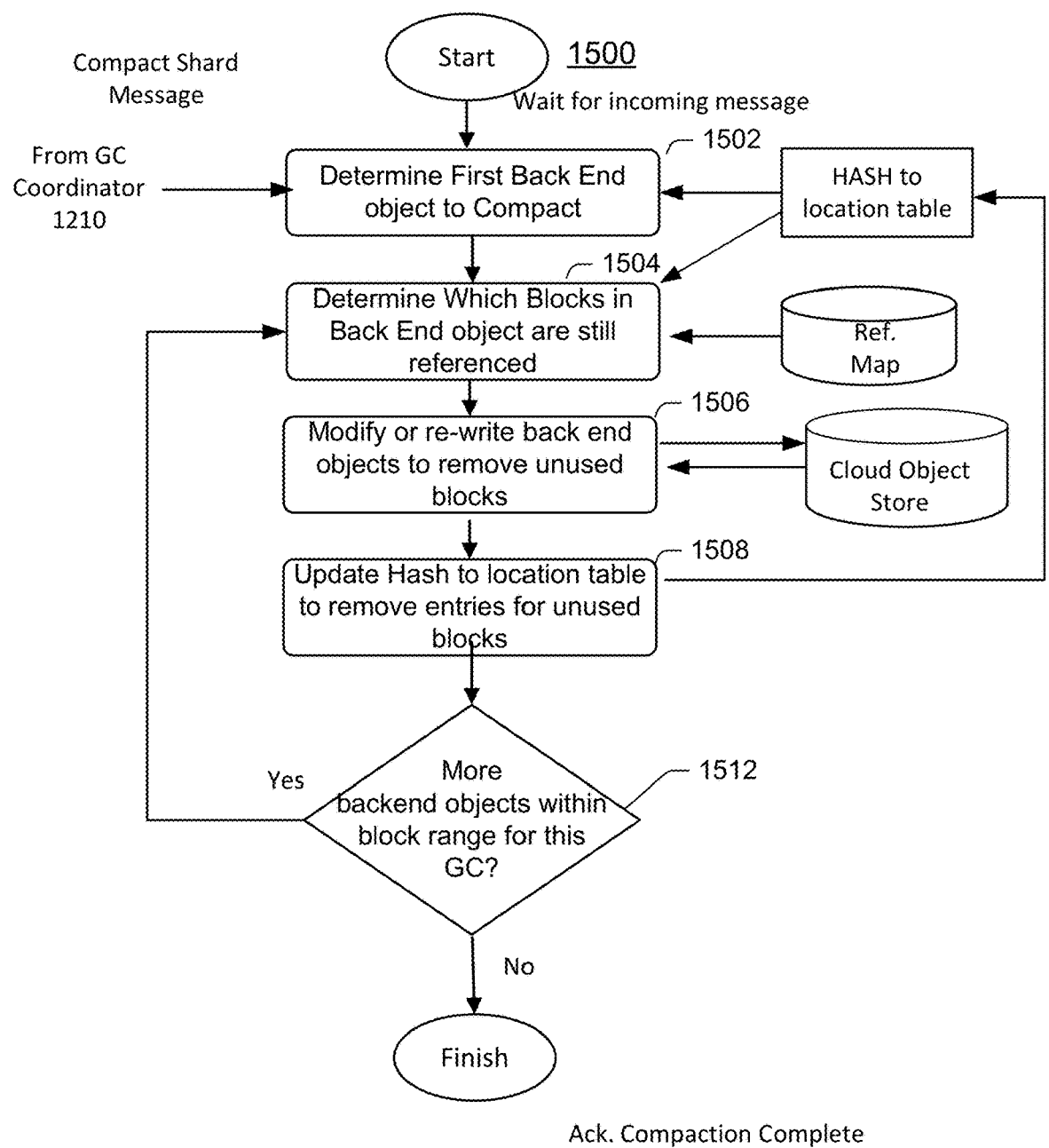
FIG. 15 is a data diagram illustrating a compact data process for compacting data in the cloud object store that provides a more detailed view of the process shown in step 1414 on FIG. 14.

Illustrated in FIG. 15, is exemplary process 1500 implemented by block shard modules in servers 309a-309n (FIG. 3a) for compacting data in the Cloud Object Store during a compaction operation, specifically for block 1414 (FIG. 14) of the garbage collection process. Such exemplary process 1500 may be a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to FIG. 3a and FIG. 14, although it may be implemented in other system architectures.

For each block shard, the block shard server performs the following compaction process: The block shard server iterates through each back-end object in the Cloud Object Store managed by the shard. Each back-end object can contain one or more blocks of data, and therefore can span multiple locations within the block shard.

Each back-end object may be compacted using the following process:
a. The reference map is examined to determine which of the locations within the back-end object are referenced, and which locations are no longer referenced.
b. The back-end object is altered in the Cloud Object Store to remove the block data from locations which are no longer referenced. Only block data which is still referenced will remain.
c. The hash-to-location table is updated to remove the entries for blocks that have been removed during the compaction process.
d. After each back-end object in the Cloud Object Store for this shard has been compacted, the reference map for the block shard can be deleted.

e. The block shard server responds to the GC coordinator acknowledging that the compaction operation is completed for this block shard.

Specifically in block 1502, after waiting for an incoming message to compact the shard from the GC Coordinator (see 1210), the back-end objects to compact are determined using the hash-to-location table.

In block 1504, a determination is made as to which blocks in the back-end object are still referenced using information from the hash-to-location table and the reference map.

In block 1506, the back-end objects are modified or re-written into the cloud object store to remove unused blocks. Back end objects may be modified, or may be re-written by writing a new version of the object that replaces the old version. The new version of the object omits the data blocks which are no longer required.

For example, if a back-end object contains exemplary blocks 1, 2, 3, 4, 5 and 6, and the system determines that blocks 3 and 4 are no longer referenced and can be deleted, then the system will re-write the back-end object so that it contains only blocks 1, 2, 5 and 6. This changes the offset within the back-end object at which blocks 5 and 6 are stored; they are now closer to the start of the back-end object. The offset of blocks 1 and 2 does not change. The amount of storage required for the back-end object is reduced because it no longer contains blocks 3 and 4.

Each location is an offset within a particular back-end object. (For example, shard 5, object number 1,234,567, offset 20,000 bytes from the start of the object). In one implementation this is the location where the bytes making up the data block are stored within the object store.

In block 1508, the hash-to-location table is updated to remove entries for blocks which have been removed from the Cloud Object Store.

In block 1512, a determination is made as to whether more backend objects exist within the block location range for this compact data process. If there are more backend objects, block 1504-block 1508 are repeated. If there are no more objects, then this process completes.

Figure 16:
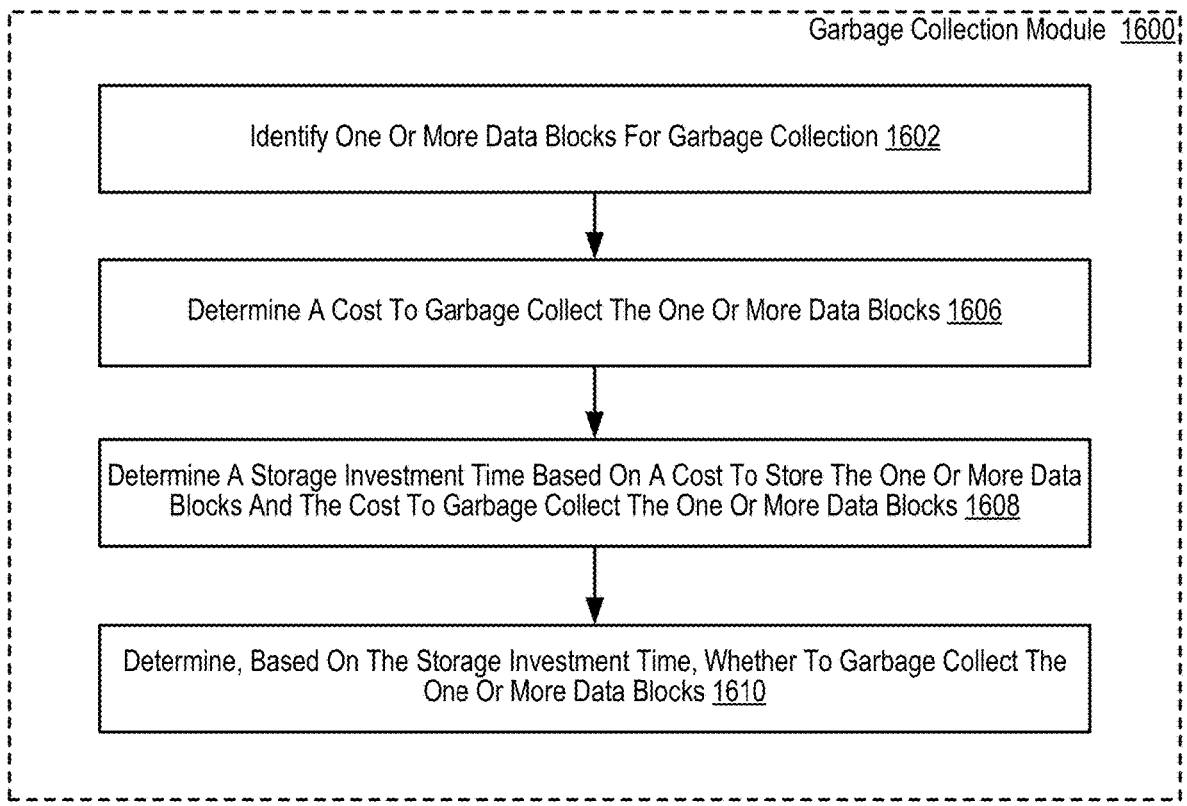
FIG. 16 is a flowchart of an example method for cost-aware garbage collection according to embodiments of the present disclosure.

For further explanation, FIG. 16 sets forth a flow chart illustrating an example method of cost-aware garbage collection in accordance with some embodiments of the present disclosure. The example method depicted in FIG. 16 is carried out by a garbage collection module (1600). The garbage collection module (1600) depicted in FIG. 16 may be embodied, for example, as a module of computer program instructions executing on computer hardware such as a computer processor. The garbage collection module (1600) may reside in a cloud computing environment and may be included as a part of a suite of tools for monitoring and managing one or more storage systems. Alternatively, the garbage collection module (1600) may reside within the storage system itself and may be executed on computer hardware within the storage system.

The method of FIG. 16 includes identifying (1602) one or more data blocks for garbage collection. The one or more mode data blocks may be identified for garbage collection according to any of the approaches set forth in the preceding discussion (e.g., FIGS. 12-15). For example, identifying (1602) the one or more data blocks for garbage collection may include identifying one or more data blocks (e.g., in a cloud object store) that are no longer referenced (e.g., in a hash to location table or other data structure) and are therefore candidates for garbage collection.

The method of FIG. 16 also includes determining (1606) a cost to garbage collect the one or more data blocks. Determining (1606) the cost to garbage collect the one or more data blocks may be determined by one or more user-defined functions to garbage collect data. Such user-defined functions may determine costs to garbage collect data based on a size of the one or more data blocks, locations of the data blocks on disks or other storage mediums, numbers of transactions or operations required to garbage collect the one or more data blocks, or other attributes of the one or more data blocks. The one or more user-defined functions may express costs to garbage collect data as a numerical score, as an amount of required computational resources, a financial cost, or as another value.

The method of FIG. 16 also includes determining (1608) a storage investment time based on a cost to store the one or more data blocks and the cost to garbage collect the one or more data blocks. The cost to store the one or more data blocks may be determined by one or more other user-defined functions. Such other user-defined functions may determine the cost to store the one or more data blocks as a function of time and one or more other attributes, including the size of the one or more data blocks, a number of storage devices or storage mediums required to store the one or more data blocks, a financial storage rate for storing the one or more data blocks (e.g., a dollar amount per unit of time per unit of data size), etc.

Garbage collecting the one or more data blocks results in an initial cost greater than storing the one or more data blocks. As set forth above, the cost to store the one or more data blocks is a function of time. In other words, as time increases, the cost to store the one or more data blocks increases. Thus, there will be a point in time (e.g., after a duration of storage time) where the cost to store the one or more data blocks equals the cost to garbage collect the one or more data blocks. Such a point in time may be considered the "storage investment time." In other words, determining (1608) the storage investment time may include determining, as the storage investment time, a time where the cost to store the one or more data blocks equals the cost to garbage collect the one or more data blocks. Storing the one or more data blocks beyond the storage investment time would incur more costs that garbage collecting the one or more data blocks.

The method of FIG. 16 also includes determining (1610), based on the storage investment time, whether to garbage collect the one or more data blocks. Determining (1610) whether to garbage collect the one or more data blocks may include comparing the storage investment time (e.g., a time where the cost to store the one or more data blocks equals the cost to garbage collect the one or more data blocks) to a threshold. The threshold may include a default threshold, a user-defined threshold, or another threshold. Determining (1610) whether to garbage collect the one or more data blocks may include determining to garbage collect the one or more data blocks in response to the storage investment time falling below a threshold.

For example, assume that the cost to store one or more data blocks equals the time to garbage collect the one or more data blocks after two months. Further assume a three month threshold. Here, the garbage collection module (1600) would determine to garbage collect the one or more data blocks as the storage investment time falls below the three month threshold. Conversely, determining (1610) whether to garbage collect the one or more data blocks may include determining not to garbage collect the one or more data blocks in response to the storage investment time meeting or exceeding the threshold. In this example, the cost to garbage collect the one or more data blocks outweighs the cost to store the one or more data blocks until a time period exceeding the threshold.

Figure 17:
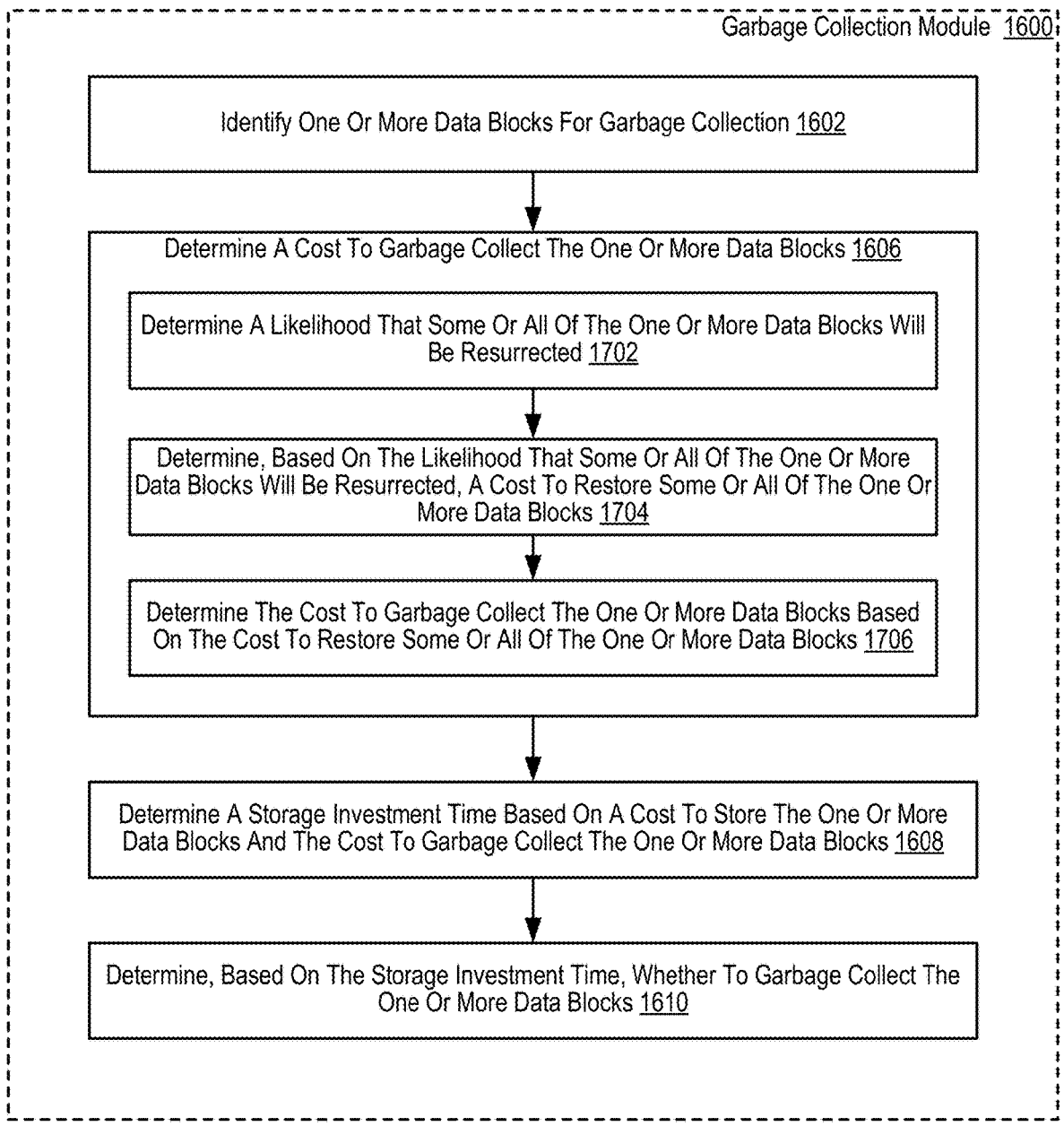
FIG. 17 is a flowchart of an example method for cost-aware garbage collection according to embodiments of the present disclosure.

For further explanation, FIG. 17 sets forth a flow chart illustrating an example method of cost-aware garbage collection in accordance with some embodiments of the present disclosure. The method of FIG. 17 is similar to FIG. 16 in that the method of FIG. 17 includes identifying (1602) one or more data blocks for garbage collection; determining (1606) a cost to garbage collect the one or more data blocks; determining a storage investment time based on a cost to store the one or more data blocks and the cost to garbage collect the one or more data blocks; and determining (1610), based on the storage investment time, whether to garbage collect the one or more data blocks.

The method of FIG. 17 differs from FIG. 16 in that determining (1606) a cost to garbage collect the one or more data blocks includes determining (1702) a likelihood that the one or more data blocks will be restored. A data block is considered restored when the particular data block is stored again after garbage collection (e.g., received from a user or other entity for storage, retrieved from archival storage or another storage location for storage). The likelihood the one or more data blocks will be restored may be based on a defined time window or threshold (e.g., a likelihood that the one or more data blocks will be restored within a certain amount of time). Determining (1702) a likelihood that the one or more data blocks will be restored may be performed based on one or more recorded occurrences of storage of the one or more data blocks. For example, as data blocks are stored, data indicating a storage of the one or more data blocks may be generated. The data indicating the storage of the one or more data blocks may include hashes or other identifiers of the one or more data blocks, times at which the one or more data blocks were stored, or other data. The data indicating the storage of the one or more data blocks, as well as data indicating the storage of other data blocks, may be used to determine a likelihood that the one or more data blocks will be restored (e.g., based on a frequency of storage, based on a machine learning model indicating the likelihood that the one or more data blocks will be restored, etc.). Other data may also be used to determine the likelihood that the one or more data blocks will be restored. For example, data indicating access of data blocks including the one or more data blocks may be used, as data that is frequently access may need to be restored from archival storage or resubmitted by a user after garbage collection.

The method of FIG. 17 further differs from FIG. 16 in that determining (1606) a cost to garbage collect the one or more data blocks includes determining (1704), based on the likelihood the one or more data blocks will be restored, a cost to restore the one or more data blocks. The cost to restore the one or more data blocks may be determined based on one or more user-defined functions. These user-defined functions may calculate the cost to restore the one or more data blocks based on a size of the one or more data blocks, associated addresses or offsets of the one or more data blocks, or other attributes. The likelihood the one or more data blocks will be restored may then be used to scale or factor the cost to restore the one or more data blocks.

As an example, the likelihood the one or more data blocks will be restored may be compared to a threshold. Where the likelihood the one or more data blocks will be restored meets or exceeds the threshold, a first scalar may be applied to the cost to restore the one or more data blocks (e.g., a scalar of 1, causing the cost to restore the one or more data blocks to be factored into the cost to garbage collect the one or more data blocks, as described below). Where the likelihood the one or more data blocks will be restored falls below the threshold, a second scalar may be applied to the cost to restore the one or more data blocks (e.g., a scalar of 0, causing the cost to restore the one or more data blocks to not be factored into the cost to garbage collect the one or more data blocks, as described below). The likelihood the one or more data blocks will be restored may itself be used as a scalar applied to the cost to restore the one or more data blocks, For example, where likelihood the one or more data blocks will be restored is 70 percent, the cost to restore the one or more data blocks may be scaled by 0.7 when factored into the cost to garbage collect the one or more data blocks.

The method of FIG. 17 further differs from FIG. 16 in that determining (1606) a cost to garbage collect the one or more data blocks includes determining (1706) the cost to garbage collect the one or more data blocks based on the cost to restore the one or more data blocks. For example, the cost to garbage collect the one or more data blocks may be incremented or increased by the cost to restore the one or more data blocks (e.g., the scaled or factored cost to restore the one or more data blocks. Thus, the storage investment time reflects a time where the cost to store the one or more data blocks equals the cost to garbage collect the one or more data blocks and the cost (e.g., scaled cost) to restore the one or more data blocks.

Figure 18:
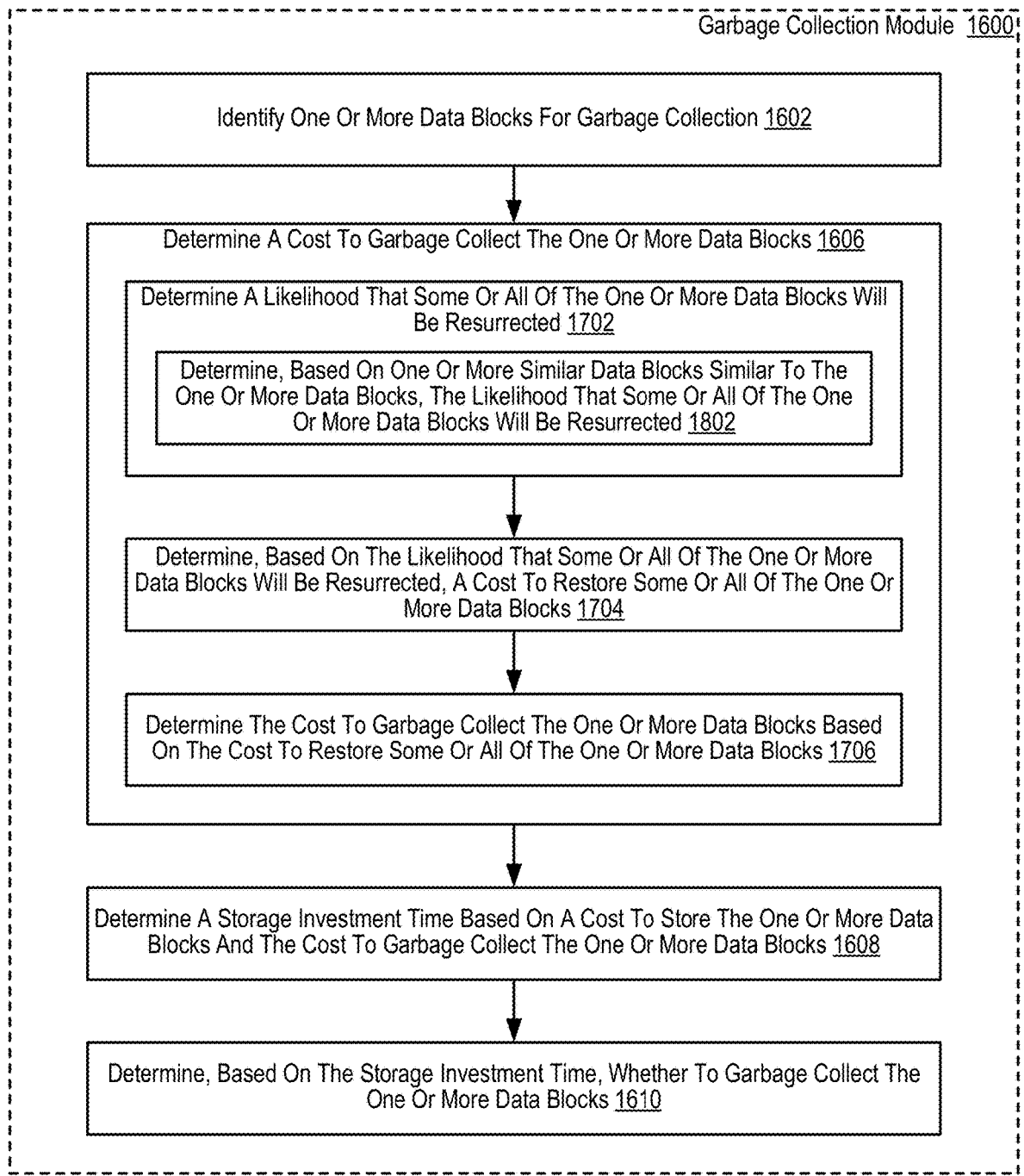
FIG. 18 is a flowchart of an example method for cost-aware garbage collection according to embodiments of the present disclosure.

For further explanation, FIG. 18 sets forth a flow chart illustrating an example method of cost-aware garbage collection in accordance with some embodiments of the present disclosure. The method of FIG. 18 is similar to FIG. 17 in that the method of FIG. 17 includes identifying (1602) one or more data blocks for garbage collection; determining (1606) a cost to garbage collect the one or more data blocks; determining a storage investment time based on a cost to store the one or more data blocks and the cost to garbage collect the one or more data blocks; and determining (1610), based on the storage investment time, whether to garbage collect the one or more data blocks; where determining (1606) a cost to garbage collect the one or more data blocks includes determining (1702) a likelihood that the one or more data blocks will be restored; determining (1704), based on a likelihood the one or more data blocks will be restored, a cost to restore the one or more data blocks; and determining (1706) the cost to garbage collect the one or more data blocks based on the cost to restore the one or more data blocks.

The method of FIG. 18 differs from FIG. 17 in that determining (1702) a likelihood that the one or more data blocks will be restored includes determining (102), based on one or more similar data blocks similar to the one or more data blocks, the likelihood that the one or more data blocks will be restored. As set forth above, data indicating storage or access of the one or more data blocks may be used to determine the likelihood that the one or more data blocks will be restored. Additionally, data indicating storage or access of similar data blocks may also be used to determine the likelihood that the one or more data blocks will be restored. For example, a portion of a hash or identifier of a data block may be deterministically calculated based on one or more attributes of the data block such that data blocks with similar or identical attributes will have similar or identical portions of the hash or identifier. Accordingly, data indicating storage or access of data blocks with similar portions of the hash or identifier (e.g., having a degree of similarity exceeding a threshold, having a string differential falling below a threshold) may be selected for determining the likelihood that the one or more data blocks will be restored.

Figure 19:
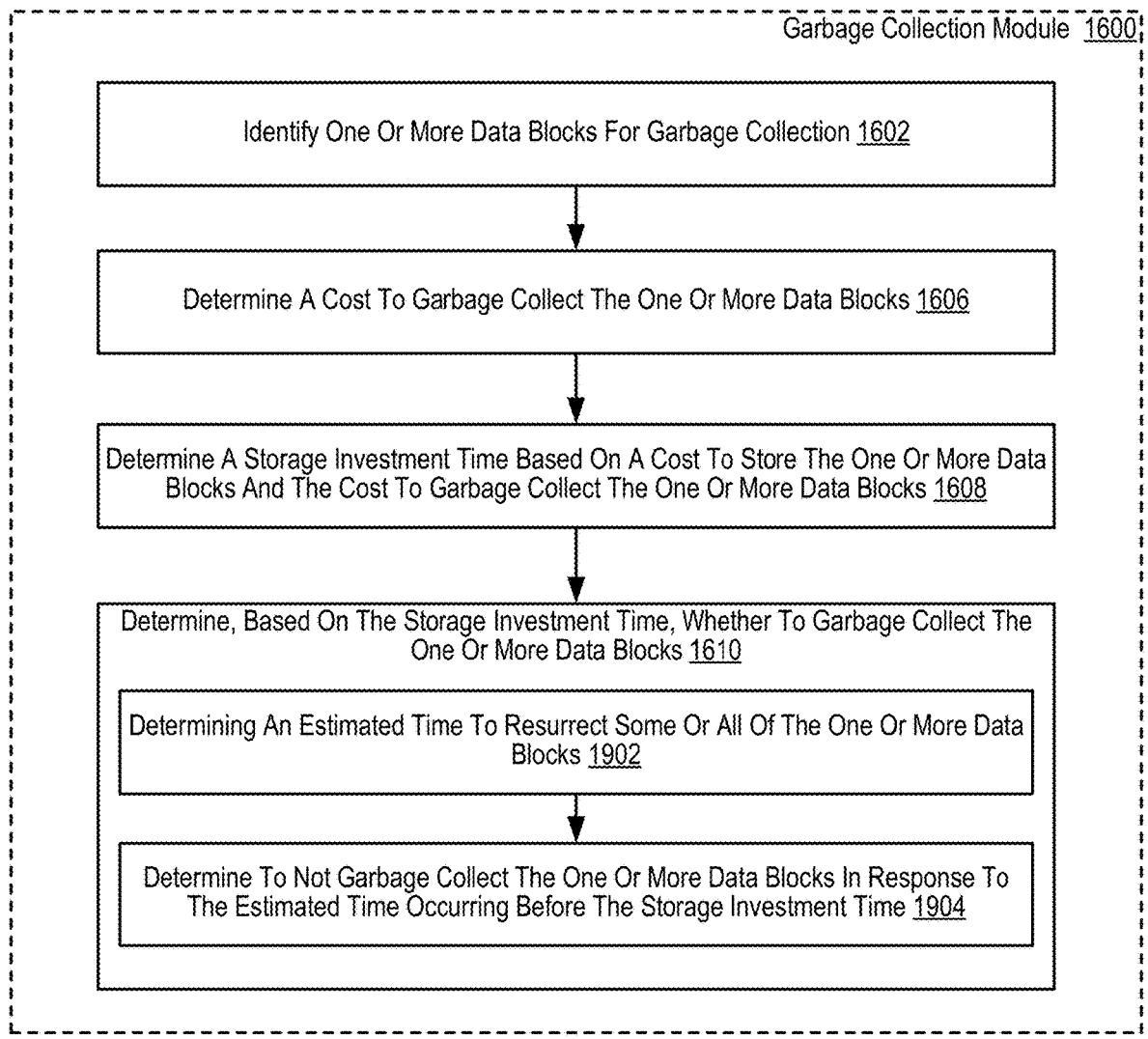
FIG. 19 is a flowchart of an example method for cost-aware garbage collection according to embodiments of the present disclosure.

For further explanation, FIG. 19 sets forth a flow chart illustrating an example method of cost-aware garbage collection in accordance with some embodiments of the present disclosure. The method of FIG. 19 is similar to FIG. 16 in that the method of FIG. 19 includes identifying (1602) one or more data blocks for garbage collection; determining (1606) a cost to garbage collect the one or more data blocks; determining a storage investment time based on a cost to store the one or more data blocks and the cost to garbage collect the one or more data blocks; and determining (1610), based on the storage investment time, whether to garbage collect the one or more data blocks.

The method of FIG. 19 differs from FIG. 16 in that determining (1610), based on the storage investment time, whether to garbage collect the one or more data blocks includes determining (1902) an estimated time to restore the one or more data blocks. The estimated time to restore the one or more data blocks comprises a particular time (e.g., data and/or time) where the one or more data blocks are predicted to be restored (e.g., submitted for storage from a user or other entity, retrieved from archival storage or another storage location). For example, data indicating previous storages or accesses of the one or more data blocks may be provided as input to a machine learning model or other algorithm to determine the estimated time to restore the one or more data blocks.

The method of FIG. 19 differs from FIG. 16 in that determining (1610), based on the storage investment time, whether to garbage collect the one or more data blocks includes determining (1904) to not garbage collect the one or more data blocks in response to the estimated time occurring before the storage investment time. In other words, a decision to garbage collect the one or more data blocks may be overridden in response to the estimated time to restore the one or more data blocks occurring before the storage investment time. As an example, assume one or more data blocks have a storage investment time of two months. Further assume a threshold of three months, where data blocks are garbage collected if they have a storage investment time of three months or less. In this example, the garbage collection module (1600) would determine to garbage collect the one or more data blocks.

Further assume that the estimated time to restore the one or more data blocks is one month in the future. The decision to garbage collect the one or more data blocks would be overridden as it is likely that the one or more data blocks would need to be restored, if garbage collected, before the storage investment time.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

Figure 20A:
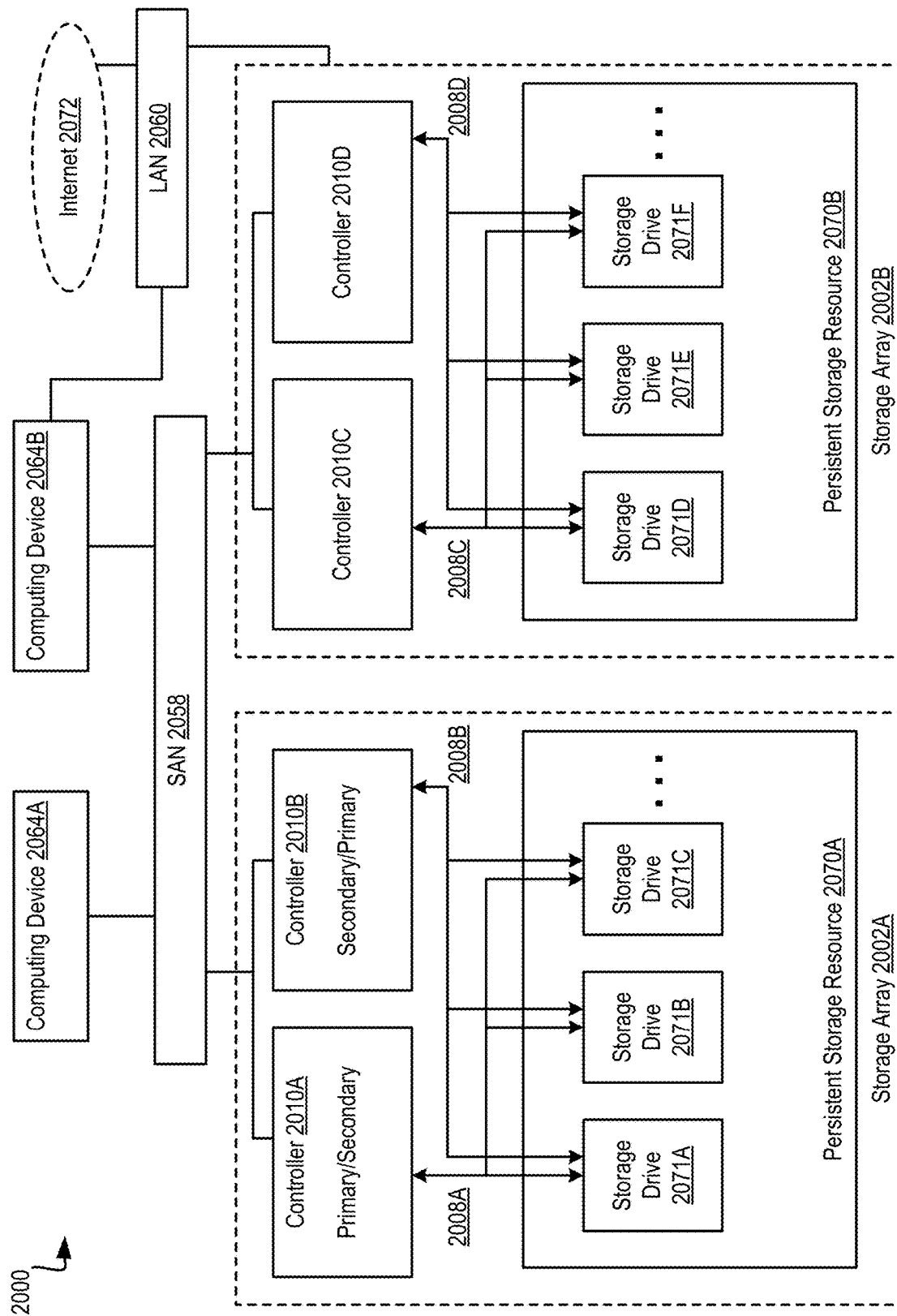
FIG. 20A illustrates a first example system for data storage in accordance with some implementations.

Example methods, apparatus, and products in accordance with embodiments of the present disclosure are described with reference to the accompanying drawings, beginning with FIG. 20A. FIG. 20A illustrates an example system for data storage, in accordance with some implementations. System 2000 (also referred to as "storage system" herein) includes numerous elements for purposes of illustration rather than limitation. It may be noted that system 2000 may include the same, more, or fewer elements configured in the same or different manner in other implementations.

System 2000 includes a number of computing devices 2064A-B. Computing devices (also referred to as "client devices" herein) may be embodied, for example, a server in a data center, a workstation, a personal computer, a notebook, or the like. Computing devices 2064A-B may be coupled for data communications to one or more storage arrays 2002A-B through a storage area network ('SAN') 2058 or a local area network ('LAN') 2060.

The SAN 2058 may be implemented with a variety of data communications fabrics, devices, and protocols. For example, the fabrics for SAN 2058 may include Fibre Channel, Ethernet, Infiniband, Serial Attached Small Computer System Interface ('SAS'), or the like. Data communications protocols for use with SAN 2058 may include Advanced Technology Attachment ('ATA'), Fibre Channel Protocol, Small Computer System Interface ('SCSI'), Internet Small Computer System Interface ('iSCSI'), Hyper-SCSI, Non-Volatile Memory Express ('NVMe') over Fabrics, or the like. It may be noted that SAN 2058 is provided for illustration, rather than limitation. Other data communication couplings may be implemented between computing devices 2064A-B and storage arrays 2002A-B.

The LAN 2060 may also be implemented with a variety of fabrics, devices, and protocols. For example, the fabrics for LAN 2060 may include Ethernet (802.3), wireless (802.11), or the like. Data communication protocols for use in LAN 2060 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 2002A-B may provide persistent data storage for the computing devices 2064A-B. Storage array 2002A may be contained in a chassis (not shown), and storage array 2002B may be contained in another chassis (not shown), in implementations. Storage array 2002A and 2002B may include one or more storage array controllers 2010A-D (also referred to as "controller" herein). A storage array controller 2010A-D may be embodied as a module of automated computing machinery comprising computer hardware, computer software, or a combination of computer hardware and software. In some implementations, the storage array controllers 2010A-D may be configured to carry out various storage tasks. Storage tasks may include writing data received from the computing devices 2064A-B to storage array 2002A-B, erasing data from storage array 2002A-B, retrieving data from storage array 2002A-B and providing data to computing devices 2064A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 2010A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 2010A-D may include, for example, a data communications adapter configured to support communications via the SAN 2058 or LAN 2060. In some implementations, storage array controller 2010A-D may be independently coupled to the LAN 2060. In implementations, storage array controller 2010A-D may include an I/O controller or the like that couples the storage array controller 2010A-D for data communications, through a midplane (not shown), to a persistent storage resource 2070A-B (also referred to as a "storage resource" herein). The persistent storage resource 2070A-B main include any number of storage drives 2071A-F (also referred to as "storage devices" herein) and any number of non-volatile Random Access Memory ('NVRAM') devices (not shown).

In some implementations, the NVRAM devices of a persistent storage resource 2070A-B may be configured to receive, from the storage array controller 2010A-D, data to be stored in the storage drives 2071A-F. In some examples, the data may originate from computing devices 2064A-B. In some examples, writing data to the NVRAM device may be carried out more quickly than directly writing data to the storage drive 2071A-F. In implementations, the storage array controller 2010A-D may be configured to utilize the NVRAM devices as a quickly accessible buffer for data destined to be written to the storage drives 2071A-F. Latency for write requests using NVRAM devices as a buffer may be improved relative to a system in which a storage array controller 2010A-D writes data directly to the storage drives 2071A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 2071A-F.

In implementations, storage drive 2071A-F may refer to any device configured to record data persistently, where "persistently" or "persistent" refers as to a device's ability to maintain recorded data after loss of power. In some implementations, storage drive 2071A-F may correspond to non-disk storage media. For example, the storage drive 2071A-F may be one or more solid-state drives ('SSDs'), flash memory based storage, any type of solid-state non-volatile memory, or any other type of non-mechanical storage device. In other implementations, storage drive 2071A-F may include mechanical or spinning hard disk, such as hard-disk drives ('HDD').

In some implementations, the storage array controllers 2010A-D may be configured for offloading device management responsibilities from storage drive 2071A-F in storage array 2002A-B. For example, storage array controllers 2010A-D may manage control information that may describe the state of one or more memory blocks in the storage drives 2071A-F. The control information may indicate, for example, that a particular memory block has failed and should no longer be written to, that a particular memory block contains boot code for a storage array controller 2010A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 2071A-F may be stored in one or more particular memory blocks of the storage drives 2071A-F that are selected by the storage array controller 2010A-D. The selected memory blocks may be tagged with an identifier indicating that the selected memory block contains control information. The identifier may be utilized by the storage array controllers 2010A-D in conjunction with storage drives 2071A-F to quickly identify the memory blocks that contain control information. For example, the storage controllers 2010A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 2071A-F.

In implementations, storage array controllers 2010A-D may offload device management responsibilities from storage drives 2071A-F of storage array 2002A-B by retrieving, from the storage drives 171A-F, control information describing the state of one or more memory blocks in the storage drives 2071A-F. Retrieving the control information from the storage drives 2071A-F may be carried out, for example, by the storage array controller 2010A-D querying the storage drives 2071A-F for the location of control information for a particular storage drive 2071A-F. The storage drives 2071A-F may be configured to execute instructions that enable the storage drive 2071A-F to identify the location of the control information. The instructions may be executed by a controller (not shown) associated with or otherwise located on the storage drive 2071A-F and may cause the storage drive 2071A-F to scan a portion of each memory block to identify the memory blocks that store control information for the storage drives 2071A-F. The storage drives 2071A-F may respond by sending a response message to the storage array controller 2010A-D that includes the location of control information for the storage drive 2071A-F. Responsive to receiving the response message, storage array controllers 2010A-D may issue a request to read data stored at the address associated with the location of control information for the storage drives 2071A-F.

In other implementations, the storage array controllers 2010A-D may further offload device management responsibilities from storage drives 2071A-F by performing, in response to receiving the control information, a storage drive management operation. A storage drive management operation may include, for example, an operation that is typically performed by the storage drive 2071A-F (e.g., the controller (not shown) associated with a particular storage drive 2071A-F). A storage drive management operation may include, for example, ensuring that data is not written to failed memory blocks within the storage drive 2071A-F, ensuring that data is written to memory blocks within the storage drive 2071A-F in such a way that adequate wear leveling is achieved, and so forth.

In implementations, storage array 2002A-B may implement two or more storage array controllers 2010A-D. For example, storage array 2002A may include storage array controllers 2010A and storage array controllers 2010B. At a given instance, a single storage array controller 2010A-D (e.g., storage array controller 2010A) of a storage system 2000 may be designated with primary status (also referred to as "primary controller" herein), and other storage array controllers 2010A-D (e.g., storage array controller 2010A) may be designated with secondary status (also referred to as "secondary controller" herein). The primary controller may have particular rights, such as permission to alter data in persistent storage resource 2070A-B (e.g., writing data to persistent storage resource 2070A-B). At least some of the rights of the primary controller may supersede the rights of the secondary controller. For instance, the secondary controller may not have permission to alter data in persistent storage resource 2070A-B when the primary controller has the right. The status of storage array controllers 2010A-D may change. For example, storage array controller 2010A may be designated with secondary status, and storage array controller 2010B may be designated with primary status.

In some implementations, a primary controller, such as storage array controller 2010A, may serve as the primary controller for one or more storage arrays 2002A-B, and a second controller, such as storage array controller 2010B, may serve as the secondary controller for the one or more storage arrays 2002A-B. For example, storage array controller 2010A may be the primary controller for storage array 2002A and storage array 2002B, and storage array controller 2010B may be the secondary controller for storage array 2002A and 2002B. In some implementations, storage array controllers 2010C and 2010D (also referred to as "storage processing modules") may neither have primary or secondary status. Storage array controllers 2010C and 2010D, implemented as storage processing modules, may act as a communication interface between the primary and secondary controllers (e.g., storage array controllers 2010A and 2010B, respectively) and storage array 2002B. For example, storage array controller 2010A of storage array 2002A may send a write request, via SAN 2058, to storage array 2002B. The write request may be received by both storage array controllers 2010C and 2010D of storage array 2002B. Storage array controllers 2010C and 2010D facilitate the communication, e.g., send the write request to the appropriate storage drive 2071A-F. It may be noted that in some implementations storage processing modules may be used to increase the number of storage drives controlled by the primary and secondary controllers.

In implementations, storage array controllers 2010A-D are communicatively coupled, via a midplane (not shown), to one or more storage drives 2071A-F and to one or more NVRAM devices (not shown) that are included as part of a storage array 2002A-B. The storage array controllers 2010A-D may be coupled to the midplane via one or more data communication links and the midplane may be coupled to the storage drives 2071A-F and the NVRAM devices via one or more data communications links. The data communications links described herein are collectively illustrated by data communications links 2008A-D and may include a Peripheral Component Interconnect Express ('PCIe') bus, for example.

Figure 20B:
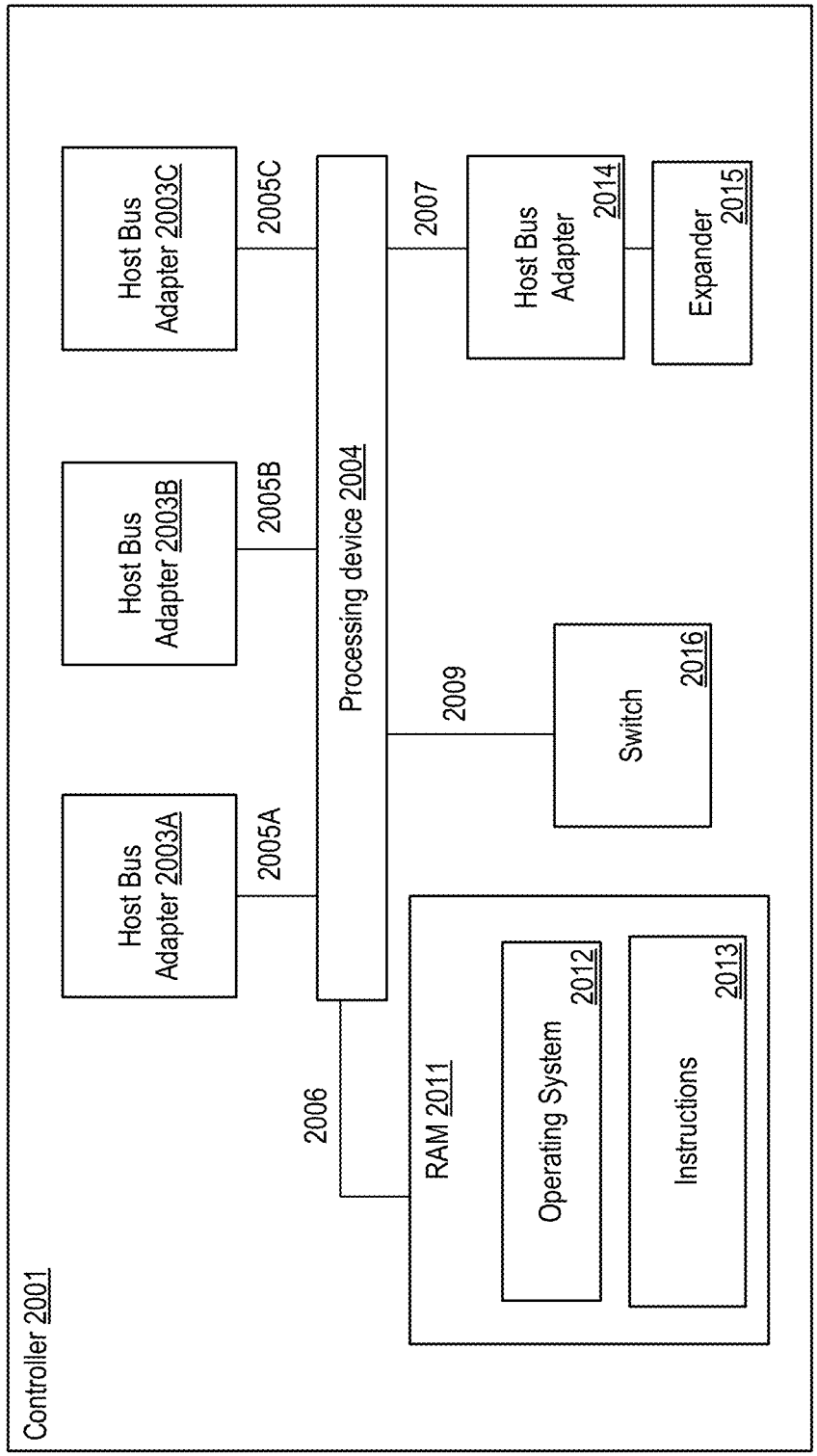
FIG. 20B illustrates a second example system for data storage in accordance with some implementations.

FIG. 20B illustrates an example system for data storage, in accordance with some implementations. Storage array controller 2001 illustrated in FIG. 20B may be similar to the storage array controllers 2010A-D described with respect to FIG. 20A. In one example, storage array controller 2001 may be similar to storage array controller 2010A or storage array controller 2010B. Storage array controller 2001 includes numerous elements for purposes of illustration rather than limitation. It may be noted that storage array controller 2001 may include the same, more, or fewer elements configured in the same or different manner in other implementations. It may be noted that elements of FIG. 20A may be included below to help illustrate features of storage array controller 2001.

Storage array controller 2001 may include one or more processing devices 2004 and random access memory ('RAM') 2011. Processing device 2004 (or controller 2001) represents one or more general-purpose processing devices such as a microprocessor, central processing unit, or the like. More particularly, the processing device 2004 (or controller 2001) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 2004 (or controller 2001) may also be one or more special-purpose processing devices such as an ASIC, an FPGA, a digital signal processor ('DSP'), network processor, or the like.

The processing device 2004 may be connected to the RAM 2011 via a data communications link 2006, which may be embodied as a high speed memory bus such as a Double-Data Rate 4 ('DDR4') bus. Stored in RAM 2011 is an operating system 2012. In some implementations, instructions 2013 are stored in RAM 2011. Instructions 2013 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 2001 includes one or more host bus adapters 2003A-C that are coupled to the processing device 2004 via a data communications link 2005A-C. In implementations, host bus adapters 2003A-C may be computer hardware that connects a host system (e.g., the storage array controller) to other network and storage arrays. In some examples, host bus adapters 2003A-C may be a Fibre Channel adapter that enables the storage array controller 2001 to connect to a SAN, an Ethernet adapter that enables the storage array controller 2001 to connect to a LAN, or the like. Host bus adapters 2003A-C may be coupled to the processing device 2004 via a data communications link 2005A-C such as, for example, a PCIe bus.

In implementations, storage array controller 2001 may include a host bus adapter 2014 that is coupled to an expander 2015. The expander 2015 may be used to attach a host system to a larger number of storage drives. The expander 2015 may, for example, be a SAS expander utilized to enable the host bus adapter 2014 to attach to storage drives in an implementation where the host bus adapter 2014 is embodied as a SAS controller.

In implementations, storage array controller 2001 may include a switch 2016 coupled to the processing device 2004 via a data communications link 2009. The switch 2016 may be a computer hardware device that can create multiple endpoints out of a single endpoint, thereby enabling multiple devices to share a single endpoint. The switch 2016 may, for example, be a PCIe switch that is coupled to a PCIe bus (e.g., data communications link 2009) and presents multiple PCIe connection points to the midplane.

In implementations, storage array controller 2001 includes a data communications link 2007 for coupling the storage array controller 2001 to other storage array controllers. In some examples, data communications link 2007 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 20C:
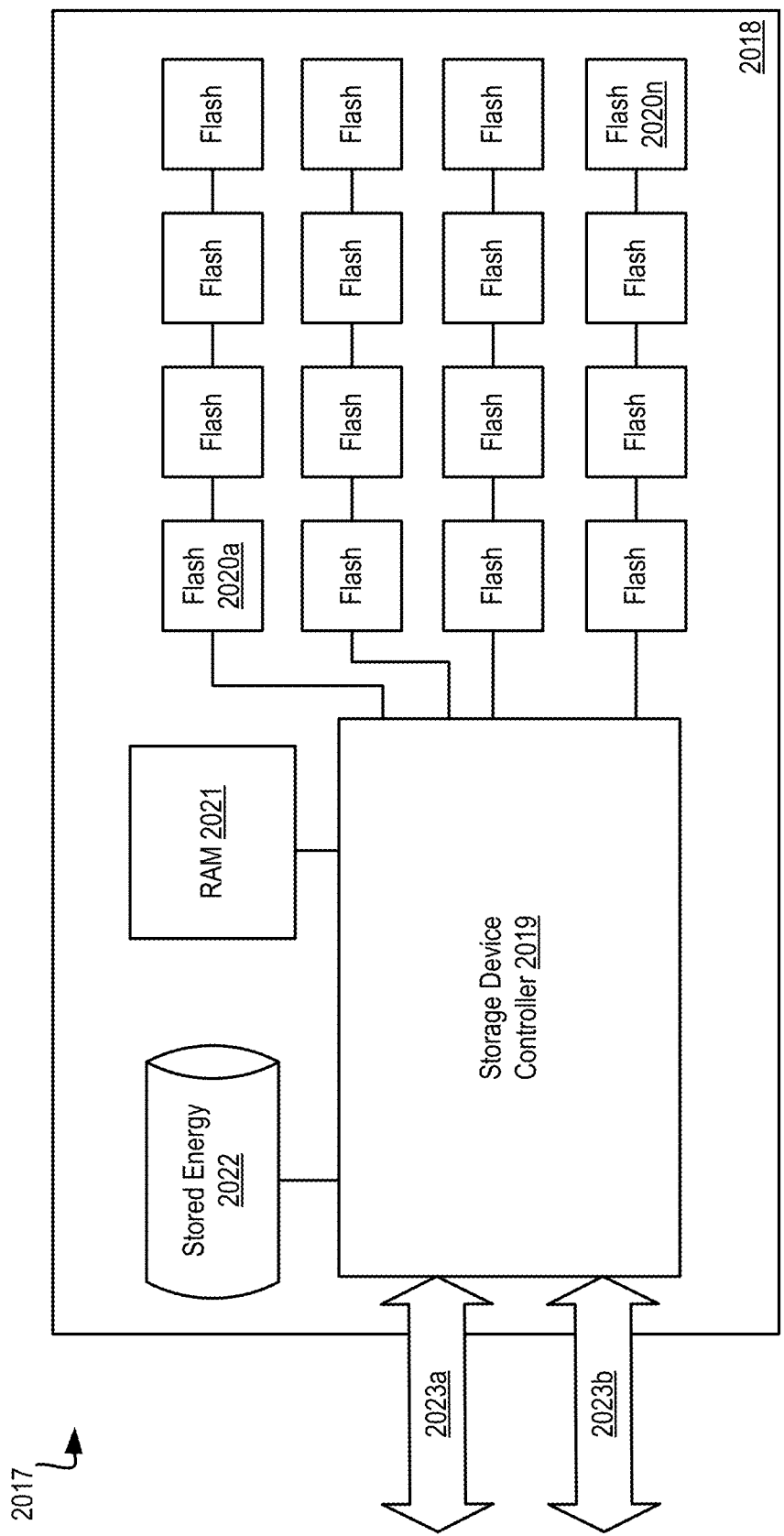
FIG. 20C illustrates a third example system for data storage in accordance with some implementations.

FIG. 20C illustrates a third example system 2017 for data storage in accordance with some implementations. System 2017 (also referred to as "storage system" herein) includes numerous elements for purposes of illustration rather than limitation. It may be noted that system 2017 may include the same, more, or fewer elements configured in the same or different manner in other implementations.

In one embodiment, system 2017 includes a dual Peripheral Component Interconnect (PCP) flash storage device 2018 with separately addressable fast write storage. System 2017 may include a storage controller 2019. In one embodiment, storage controller 2019A-D may be a CPU, ASIC, FPGA, or any other circuitry that may implement control structures necessary according to the present disclosure. In one embodiment, system 2017 includes flash memory devices (e.g., including flash memory devices 2020a-n), operatively coupled to various channels of the storage device controller 2019. Flash memory devices 2020a-n, may be presented to the controller 2019A-D as an addressable collection of Flash pages, erase blocks, and/or control elements sufficient to allow the storage device controller 2019A-D to program and retrieve various aspects of the Flash. In one embodiment, storage device controller 2019A-D may perform operations on flash memory devices 2020a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 2017 may include RAM 2021 to store separately addressable fast-write data. In one embodiment, RAM 2021 may be one or more separate discrete devices. In another embodiment, RAM 2021 may be integrated into storage device controller 2019A-D or multiple storage device controllers. The RAM 2021 may be utilized for other purposes as well, such as temporary program memory for a processing device (e.g., a CPU) in the storage device controller 2019.

In one embodiment, system 2017 may include a stored energy device 2022, such as a rechargeable battery or a capacitor. Stored energy device 2022 may store energy sufficient to power the storage device controller 2019, some amount of the RAM (e.g., RAM 2021), and some amount of Flash memory (e.g., Flash memory 2020a-2020n) for sufficient time to write the contents of RAM to Flash memory. In one embodiment, storage device controller 2019A-D may write the contents of RAM to Flash Memory if the storage device controller detects loss of external power.

In one embodiment, system 2017 includes two data communications links 2023a, 2023b. In one embodiment, data communications links 2023a, 2023b may be PCI interfaces. In another embodiment, data communications links 2023a, 2023b may be based on other communications standards (e.g., HyperTransport, InfiniBand, etc.). Data communications links 2023a, 2023b may be based on non-volatile memory express ('NVMe') or NVMe over fabrics ('NVMf') specifications that allow external connection to the storage device controller 2019A-D from other components in the storage system 2017. It should be noted that data communications links may be interchangeably referred to herein as PCI buses for convenience.

System 2017 may also include an external power source (not shown), which may be provided over one or both data communications links 2023a, 2023b, or which may be provided separately. An alternative embodiment includes a separate Flash memory (not shown) dedicated for use in storing the content of RAM 2021. The storage device controller 2019A-D may present a logical device over a PCI bus which may include an addressable fast-write logical device, or a distinct part of the logical address space of the storage device 2018, which may be presented as PCI memory or as persistent storage. In one embodiment, operations to store into the device are directed into the RAM 2021. On power failure, the storage device controller 2019A-D may write stored content associated with the addressable fast-write logical storage to Flash memory (e.g., Flash memory 2020a-n) for long-term persistent storage.

In one embodiment, the logical device may include some presentation of some or all of the content of the Flash memory devices 2020a-n, where that presentation allows a storage system including a storage device 2018 (e.g., storage system 2017) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 2022 may be sufficient to ensure completion of in-progress operations to the Flash memory devices 2020a-2020n stored energy device 2022 may power storage device controller 2019A-D and associated Flash memory devices (e.g., 2020a-n) for those operations, as well as for the storing of fast-write RAM to Flash memory. Stored energy device 2022 may be used to store accumulated statistics and other parameters kept and tracked by the Flash memory devices 2020a-n and/or the storage device controller 2019. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 2022 to measure corresponding discharge characteristics, etc. If the available energy decreases over time, the effective available capacity of the addressable fast-write storage may be decreased to ensure that it can be written safely based on the currently available stored energy.

Figure 20D:
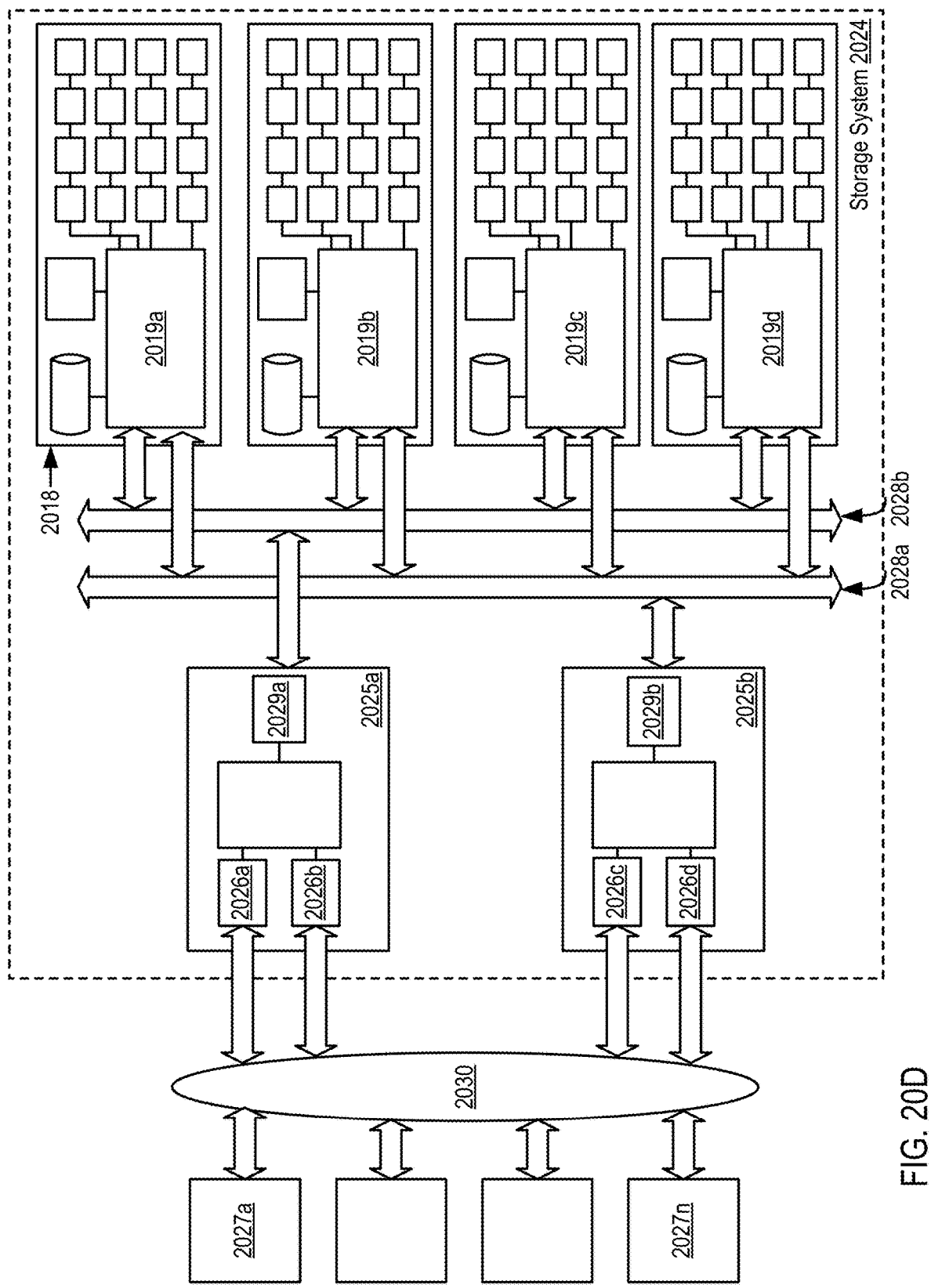
FIG. 20D illustrates a fourth example system for data storage in accordance with some implementations.

FIG. 20D illustrates a third example system 2024 for data storage in accordance with some implementations. In one embodiment, system 2024 includes storage controllers 2025a, 2025b. In one embodiment, storage controllers 2025a, 2025b are operatively coupled to Dual PCI storage devices 2019a, 2019b and 2019c, 2019d, respectively. Storage controllers 2025a, 2025b may be operatively coupled (e.g., via a storage network 2030) to some number of host computers 2027a-n.

In one embodiment, two storage controllers (e.g., 2025a and 2025b) provide storage services, such as a SCS) block storage array, a file server, an object server, a database or data analytics service, etc. The storage controllers 2025a, 2025b may provide services through some number of network interfaces (e.g., 2026a-d) to host computers 2027a-n outside of the storage system 2024. Storage controllers 2025a, 2025b may provide integrated services or an application entirely within the storage system 2024, forming a converged storage and compute system. The storage controllers 2025a, 2025b may utilize the fast write memory within or across storage devices 2019a-d to journal in progress operations to ensure the operations are not lost on a power failure, storage controller removal, storage controller or storage system shutdown, or some fault of one or more software or hardware components within the storage system 2024.

In one embodiment, controllers 2025a, 2025b operate as PCI masters to one or the other PCI buses 2028a, 2028b. In another embodiment, 2028a and 2028b may be based on other communications standards (e.g., HyperTransport, InfiniBand, etc.). Other storage system embodiments may operate storage controllers 2025a, 2025b as multi-masters for both PCI buses 2028a, 2028b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 2019a may be operable under direction from a storage controller 2025a to synthesize and transfer data to be stored into Flash memory devices from data that has been stored in RAM (e.g., RAM 2021 of FIG. 20C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 2028a, 2028b) from the storage controllers 2025a, 2025b. In one embodiment, a recalculation may include compressing data, attaching indexing or other metadata, combining multiple data segments together, performing erasure code calculations, etc.

In one embodiment, under direction from a storage controller 2025a, 2025b, a storage device controller 2019a, 2019b may be operable to calculate and transfer data to other storage devices from data stored in RAM (e.g., RAM 2021 of FIG. 20C) without involvement of the storage controllers 2025a, 2025b. This operation may be used to mirror data stored in one controller 2025a to another controller 2025b, or it could be used to offload compression, data aggregation, and/or erasure coding calculations and transfers to storage devices to reduce load on storage controllers or the storage controller interface 2029a, 2029b to the PCI bus 2028a, 2028b.

A storage device controller 2019A-D may include mechanisms for implementing high availability primitives for use by other parts of a storage system external to the Dual PCI storage device 2018. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 2025a, 2025b may initiate the use of erase blocks within and across storage devices (e.g., 2018) in accordance with an age and expected remaining lifespan of the storage devices, or based on other statistics. The storage controllers 2025a, 2025b may initiate garbage collection and data migration data between storage devices in accordance with pages that are no longer needed as well as to manage Flash page and erase block lifespans and to manage overall system performance.

In one embodiment, the storage system 2024 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 21A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 2A is a perspective view of a storage cluster 2061, with multiple storage nodes 2050 and internal solid-state memory coupled to each storage node to provide network attached storage or storage area network, in accordance with some embodiments. A network attached storage, storage area network, or a storage cluster, or other storage memory, could include one or more storage clusters 2061, each having one or more storage nodes 2050, in a flexible and reconfigurable arrangement of both the physical components and the amount of storage memory provided thereby. The storage cluster 2061 is designed to fit in a rack, and one or more racks can be set up and populated as desired for the storage memory. The storage cluster 2061 has a chassis 2038 having multiple slots 2042. It should be appreciated that chassis 2038 may be referred to as a housing, enclosure, or rack unit. In one embodiment, the chassis 2038 has fourteen slots 2042, although other numbers of slots are readily devised. For example, some embodiments have four slots, eight slots, sixteen slots, thirty-two slots, or other suitable number of slots. Each slot 2042 can accommodate one storage node 2050 in some embodiments. Chassis 2038 includes flaps 2048 that can be utilized to mount the chassis 2038 on a rack. Fans 2044 provide air circulation for cooling of the storage nodes 2050 and components thereof, although other cooling components could be used, or an embodiment could be devised without cooling components. A switch fabric 2046 couples storage nodes 2050 within chassis 2038 together and to a network for communication to the memory. In an embodiment depicted in herein, the slots 2042 to the left of the switch fabric 2046 and fans 2044 are shown occupied by storage nodes 2050, while the slots 2042 to the right of the switch fabric 2046 and fans 2044 are empty and available for insertion of storage node 2050 for illustrative purposes. This configuration is one example, and one or more storage nodes 2050 could occupy the slots 2042 in various further arrangements. The storage node arrangements need not be sequential or adjacent in some embodiments. Storage nodes 2050 are hot pluggable, meaning that a storage node 2050 can be inserted into a slot 2042 in the chassis 2038, or removed from a slot 2042, without stopping or powering down the system. Upon insertion or removal of storage node 2050 from slot 2042, the system automatically reconfigures in order to recognize and adapt to the change. Reconfiguration, in some embodiments, includes restoring redundancy and/or rebalancing data or load.

Each storage node 2050 can have multiple components. In the embodiment shown here, the storage node 2050 includes a printed circuit board 2059 populated by a CPU 2056, i.e., processor, a memory 2054 coupled to the CPU 2056, and a non-volatile solid state storage 2052 coupled to the CPU 2056, although other mountings and/or components could be used in further embodiments. The memory 2054 has instructions which are executed by the CPU 2056 and/or data operated on by the CPU 2056. As further explained below, the non-volatile solid state storage 2052 includes flash or, in further embodiments, other types of solid-state memory.

Figure 21A:
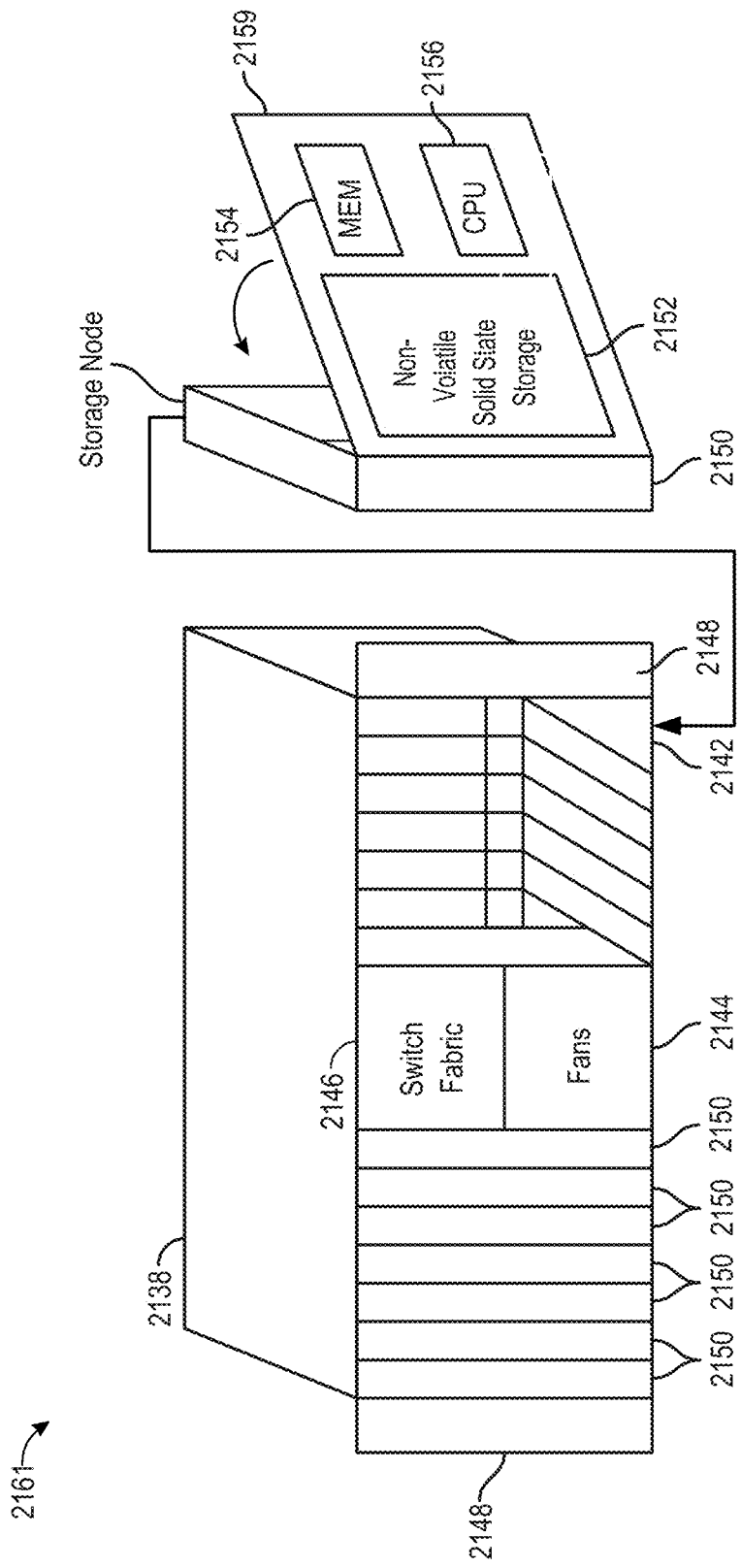
FIG. 21A is a perspective view of a storage cluster with multiple storage nodes and internal storage coupled to each storage node to provide network attached storage, in accordance with some embodiments.

Referring to FIG. 21A, storage cluster 2161 is scalable, meaning that storage capacity with non-uniform storage sizes is readily added, as described above. One or more storage nodes 2150 can be plugged into or removed from each chassis and the storage cluster self-configures in some embodiments. Plug-in storage nodes 2150, whether installed in a chassis as delivered or later added, can have different sizes. For example, in one embodiment a storage node 2150 can have any multiple of 4 TB, e.g., 8 TB, 12 TB, 16 TB, 32 TB, etc. In further embodiments, a storage node 2150 could have any multiple of other storage amounts or capacities. Storage capacity of each storage node 2150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 2152 or storage nodes 2150 within the chassis.

Figure 21B:
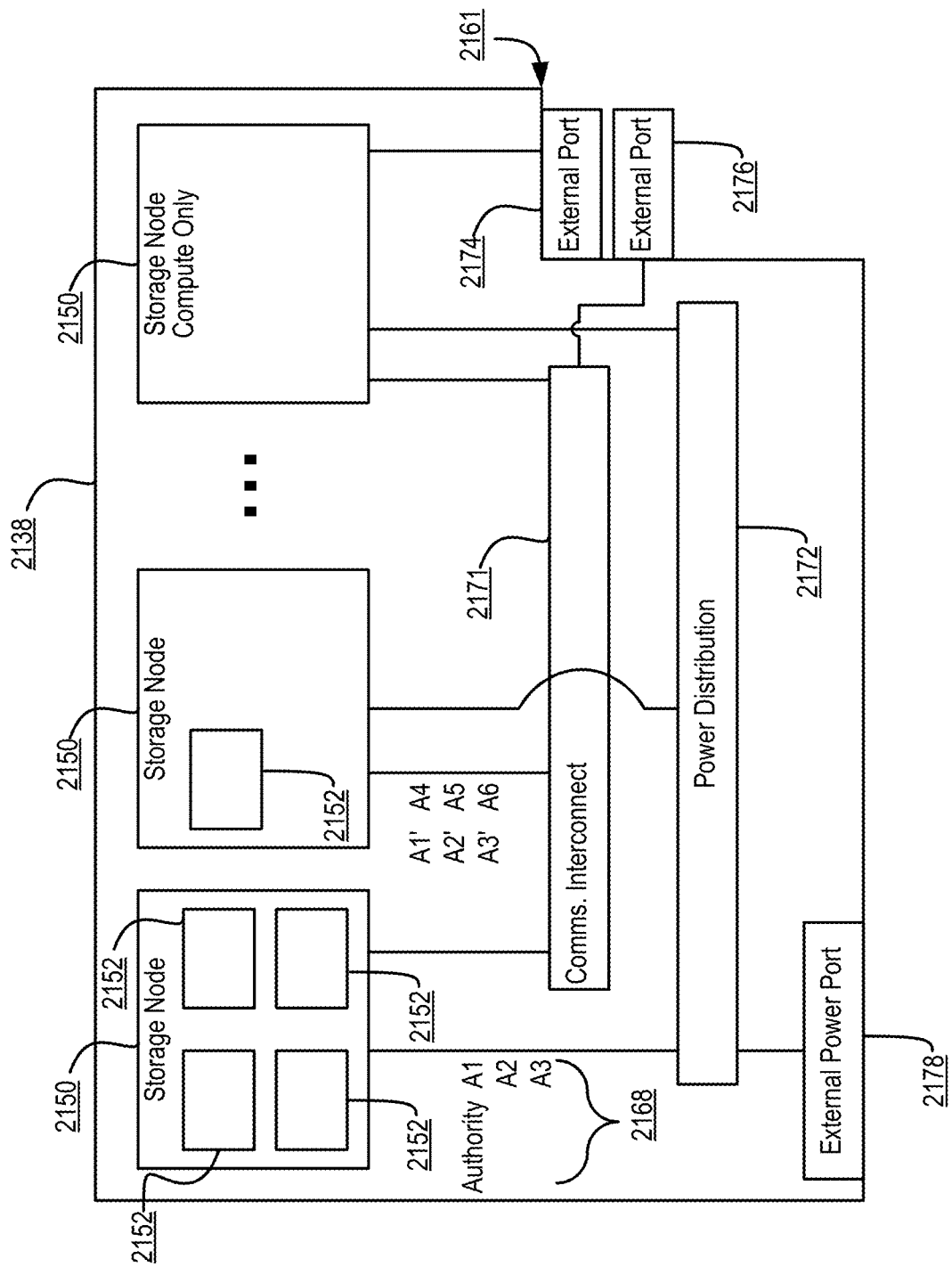
FIG. 21B is a block diagram showing an interconnect switch coupling multiple storage nodes in accordance with some embodiments.

FIG. 21B is a block diagram showing a communications interconnect 2173 and power distribution bus 2172 coupling multiple storage nodes 2150. Referring back to FIG. 21A, the communications interconnect 2173 can be included in or implemented with the switch fabric 2146 in some embodiments. Where multiple storage clusters 2161 occupy a rack, the communications interconnect 2173 can be included in or implemented with a top of rack switch, in some embodiments. As illustrated in FIG. 21B, storage cluster 2161 is enclosed within a single chassis 2138. External port 2176 is coupled to storage nodes 2150 through communications interconnect 2173, while external port 2174 is coupled directly to a storage node. External power port 2178 is coupled to power distribution bus 2172. Storage nodes 2150 may include varying amounts and differing capacities of non-volatile solid state storage 2152 as described with reference to FIG. 21A. In addition, one or more storage nodes 2150 may be a compute only storage node as illustrated in FIG. 21B. Authorities 2168 are implemented on the non-volatile solid state storages 2152, for example as lists or other data structures stored in memory. In some embodiments the authorities are stored within the non-volatile solid state storage 2152 and supported by software executing on a controller or other processor of the non-volatile solid state storage 2152. In a further embodiment, authorities 2168 are implemented on the storage nodes 2150, for example as lists or other data structures stored in the memory 2154 and supported by software executing on the CPU 2156 of the storage node 2150. Authorities 2168 control how and where data is stored in the non-volatile solid state storages 2152 in some embodiments. This control assists in determining which type of erasure coding scheme is applied to the data, and which storage nodes 2150 have which portions of the data. Each authority 2168 may be assigned to a non-volatile solid state storage 2152. Each authority may control a range of inode numbers, segment numbers, or other data identifiers which are assigned to data by a file system, by the storage nodes 2150, or by the non-volatile solid state storage 2152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 2168. Authorities 2168 have a relationship to storage nodes 2150 and non-volatile solid state storage 2152 in some embodiments. Each authority 2168, covering a range of data segment numbers or other identifiers of the data, may be assigned to a specific non-volatile solid state storage 2152. In some embodiments the authorities 2168 for all of such ranges are distributed over the non-volatile solid state storages 2152 of a storage cluster. Each storage node 2150 has a network port that provides access to the non-volatile solid state storage(s) 2152 of that storage node 2150. Data can be stored in a segment, which is associated with a segment number and that segment number is an indirection for a configuration of a RAID (redundant array of independent disks) stripe in some embodiments. The assignment and use of the authorities 2168 thus establishes an indirection to data. Indirection may be referred to as the ability to reference data indirectly, in this case via an authority 2168, in accordance with some embodiments. A segment identifies a set of non-volatile solid state storage 2152 and a local identifier into the set of non-volatile solid state storage 2152 that may contain data. In some embodiments, the local identifier is an offset into the device and may be reused sequentially by multiple segments. In other embodiments the local identifier is unique for a specific segment and never reused. The offsets in the non-volatile solid state storage 2152 are applied to locating data for writing to or reading from the non-volatile solid state storage 2152 (in the form of a RAID stripe). Data is striped across multiple units of non-volatile solid state storage 2152, which may include or be different from the non-volatile solid state storage 2152 having the authority 2168 for a particular data segment.

If there is a change in where a particular segment of data is located, e.g., during a data move or a data reconstruction, the authority 2168 for that data segment should be consulted, at that non-volatile solid state storage 2152 or storage node 2150 having that authority 2168. In order to locate a particular piece of data, embodiments calculate a hash value for a data segment or apply an inode number or a data segment number. The output of this operation points to a non-volatile solid state storage 2152 having the authority 2168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 2152, which may be done through an explicit mapping. The operation is repeatable, so that when the calculation is performed, the result of the calculation repeatably and reliably points to a particular non-volatile solid state storage 2152 having that authority 2168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 2152 for an authority in the presence of a set of non-volatile solid state storage 2152 that are reachable and constitute the same cluster. The calculation also determines an ordered set of peer non-volatile solid state storage 2152 that will also record the authority to non-volatile solid state storage mapping so that the authority may be determined even if the assigned non-volatile solid state storage is unreachable. A duplicate or substitute authority 2168 may be consulted if a specific authority 2168 is unavailable in some embodiments.

With reference to FIGS. 21A and 21B, two of the many tasks of the CPU 2156 on a storage node 2150 are to break up write data, and reassemble read data. When the system has determined that data is to be written, the authority 2168 for that data is located as above. When the segment ID for data is already determined the request to write is forwarded to the non-volatile solid state storage 2152 currently determined to be the host of the authority 2168 determined from the segment. The host CPU 2156 of the storage node 2150, on which the non-volatile solid state storage 2152 and corresponding authority 2168 reside, then breaks up or shards the data and transmits the data out to various non-volatile solid state storage 2152. The transmitted data is written as a data stripe in accordance with an erasure coding scheme. In some embodiments, data is requested to be pulled, and in other embodiments, data is pushed. In reverse, when data is read, the authority 2168 for the segment ID containing the data is located as described above. The host CPU 2156 of the storage node 2150 on which the non-volatile solid state storage 2152 and corresponding authority 2168 reside requests the data from the non-volatile solid state storage and corresponding storage nodes pointed to by the authority. In some embodiments the data is read from flash storage as a data stripe. The host CPU 2156 of storage node 2150 then reassembles the read data, correcting any errors (if present) according to the appropriate erasure coding scheme, and forwards the reassembled data to the network. In further embodiments, some or all of these tasks can be handled in the non-volatile solid state storage 2152. In some embodiments, the segment host requests the data be sent to storage node 2150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 2152 coupled to the host CPUs 2156 (See FIGS. 21E and 21G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots.

Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 2152 may be assigned a range of address space. Within this assigned range, the non-volatile solid state storage 2152 is able to allocate addresses without synchronization with other non-volatile solid state storage 2152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium.

Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 21C:
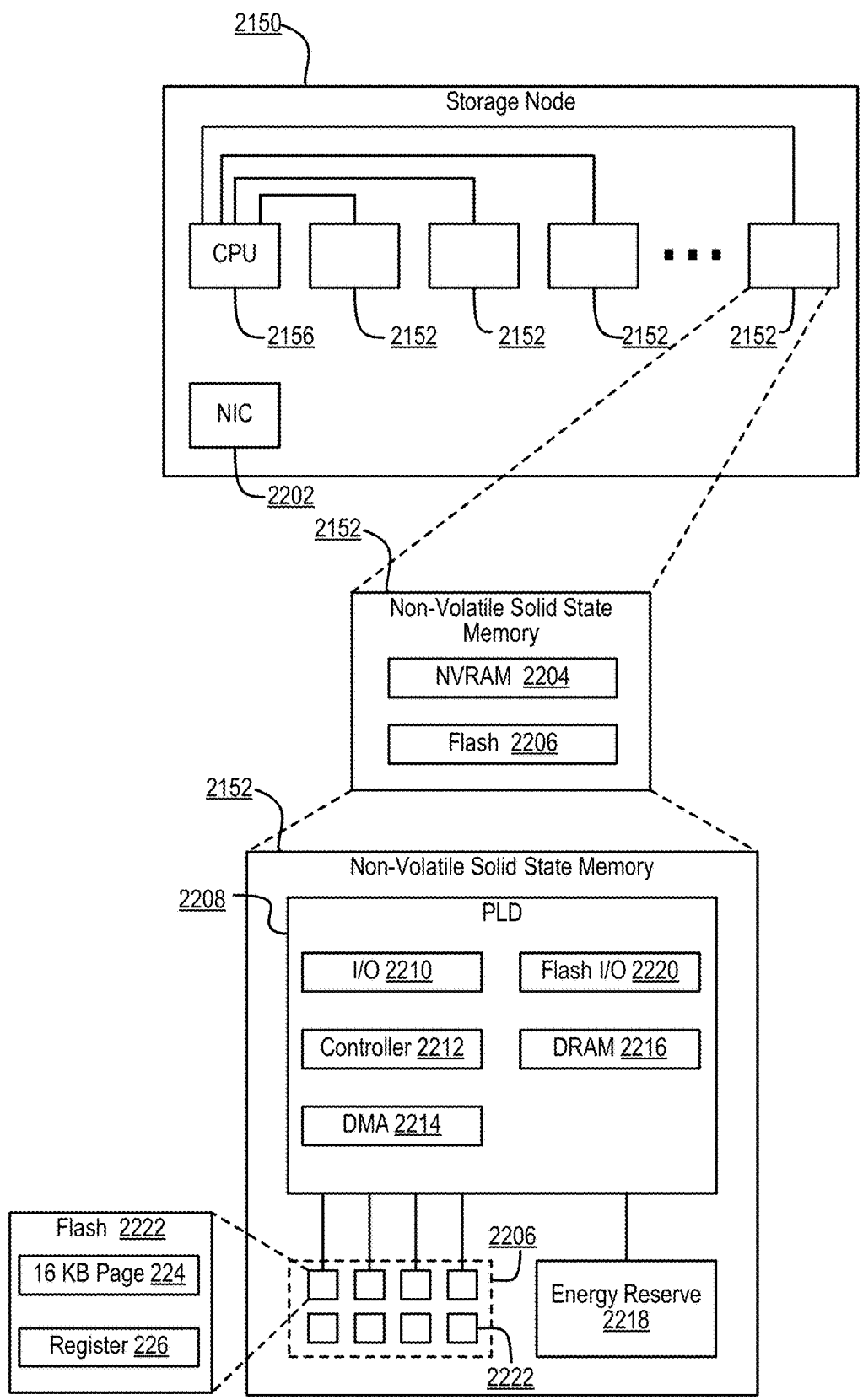
FIG. 21C is a multiple level block diagram, showing contents of a storage node and contents of one of the non-volatile solid state storage units in accordance with some embodiments.

FIG. 21C is a multiple level block diagram, showing contents of a storage node 2150 and contents of a non-volatile solid state storage 2152 of the storage node 2150. Data is communicated to and from the storage node 2150 by a network interface controller ('NIC') 2202 in some embodiments. Each storage node 2150 has a CPU 2156, and one or more non-volatile solid state storage 2152, as discussed above. Moving down one level in FIG. 21C, each non-volatile solid state storage 2152 has a relatively fast non-volatile solid state memory, such as nonvolatile random access memory ('NVRAM') 2204, and flash memory 2206. In some embodiments, NVRAM 2204 may be a component that does not require program/erase cycles (DRAM, MRAM, PCM), and can be a memory that can support being written vastly more often than the memory is read from. Moving down another level in FIG. 21C, the NVRAM 2204 is implemented in one embodiment as high speed volatile memory, such as dynamic random access memory (DRAM) 2216, backed up by energy reserve 2218. Energy reserve 2218 provides sufficient electrical power to keep the DRAM 2216 powered long enough for contents to be transferred to the flash memory 2206 in the event of power failure. In some embodiments, energy reserve 2218 is a capacitor, super-capacitor, battery, or other device, that supplies a suitable supply of energy sufficient to enable the transfer of the contents of DRAM 2216 to a stable storage medium in the case of power loss. The flash memory 2206 is implemented as multiple flash dies 2222, which may be referred to as packages of flash dies 2222 or an array of flash dies 2222. It should be appreciated that the flash dies 2222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 2152 has a controller 2212 or other processor, and an input output (I/O) port 2210 coupled to the controller 2212. I/O port 2210 is coupled to the CPU 2156 and/or the network interface controller 2202 of the flash storage node 2150. Flash input output (I/O) port 2220 is coupled to the flash dies 2222, and a direct memory access unit (DMA) 2214 is coupled to the controller 2212, the DRAM 2216 and the flash dies 2222. In the embodiment shown, the I/O port 2210, controller 2212, DMA unit 2214 and flash I/O port 2220 are implemented on a programmable logic device ('PLD') 2208, e.g., an FPGA. In this embodiment, each flash die 2222 has pages, organized as sixteen kB (kilobyte) pages 2224, and a register 2226 through which data can be written to or read from the flash die 2222. In further embodiments, other types of solid-state memory are used in place of, or in addition to flash memory illustrated within flash die 2222.

Storage clusters 2161, in various embodiments as disclosed herein, can be contrasted with storage arrays in general. The storage nodes 2150 are part of a collection that creates the storage cluster 2161. Each storage node 2150 owns a slice of data and computing required to provide the data. Multiple storage nodes 2150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 2152 described herein have multiple interfaces active simultaneously and serving multiple purposes. In some embodiments, some of the functionality of a storage node 2150 is shifted into a storage unit 2152, transforming the storage unit 2152 into a combination of storage unit 2152 and storage node 2150. Placing computing (relative to storage data) into the storage unit 2152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 2161, as described herein, multiple controllers in multiple storage units 2152 and/or storage nodes 2150 cooperate in various ways (e.g., for erasure coding, data sharding, metadata communication and redundancy, storage capacity expansion or contraction, data recovery, and so on).

Figure 21D:
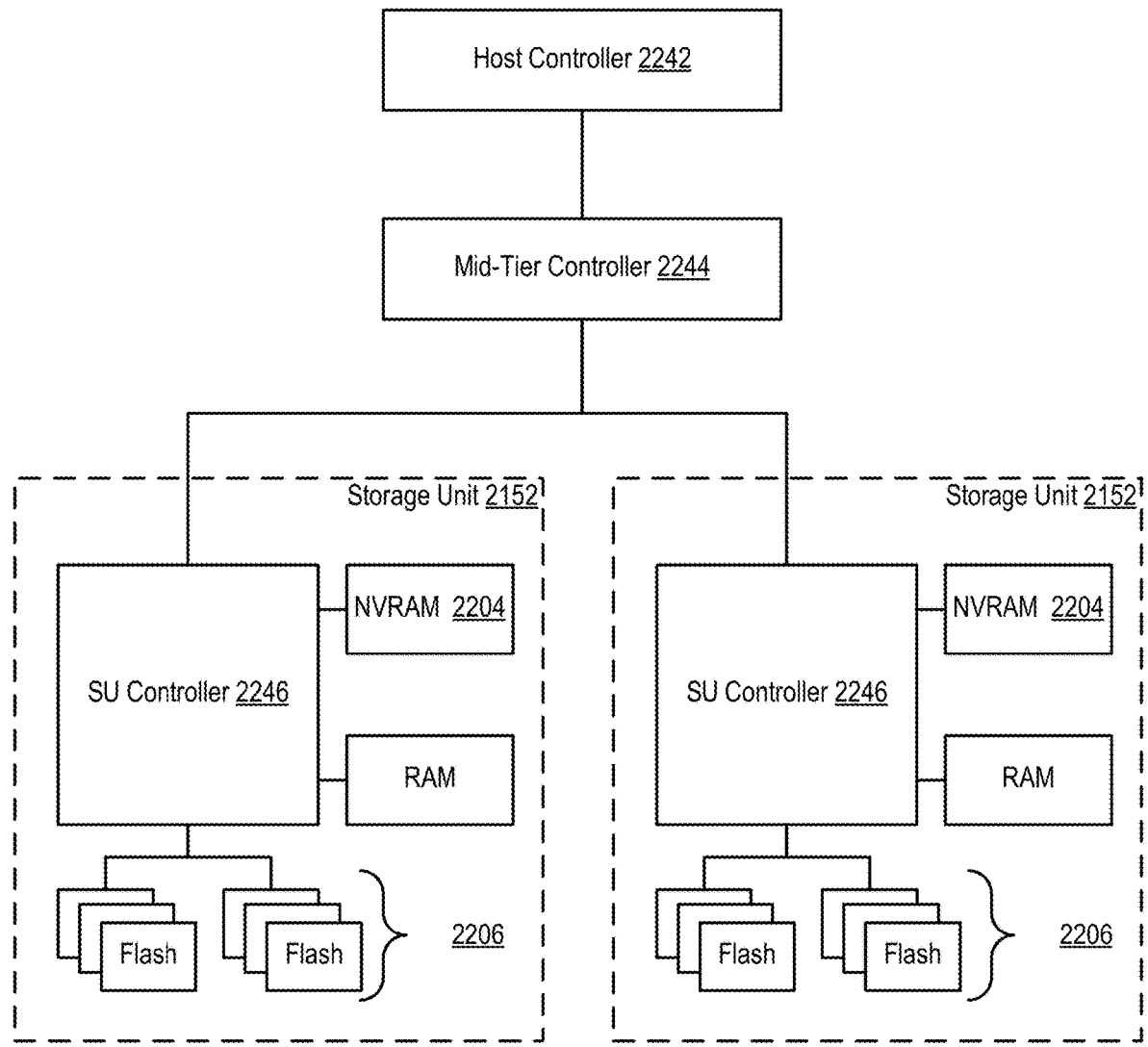
FIG. 21D shows a storage server environment, which uses embodiments of the storage nodes and storage units of some previous figures in accordance with some embodiments.

FIG. 21D shows a storage server environment, which uses embodiments of the storage nodes 2150 and storage units 2152 of FIGS. 21A-C. In this version, each storage unit 2152 has a processor such as controller 2212 (see FIG. 21C), an FPGA, flash memory 2206, and NVRAM 2204 (which is super-capacitor backed DRAM 216, see FIGS. 21B and 21C) on a PCIe (peripheral component interconnect express) board in a chassis 2138 (see FIG. 21A). The storage unit 2152 may be implemented as a single board containing storage, and may be the largest tolerable failure domain inside the chassis. In some embodiments, up to two storage units 2152 may fail and the device will continue with no data loss.

The physical storage is divided into named regions based on application usage in some embodiments. The NVRAM 2204 is a contiguous block of reserved memory in the storage unit 2152 DRAM 2216, and is backed by NAND flash. NVRAM 2204 is logically divided into multiple memory regions written for two as spool (e.g., spool_region). Space within the NVRAM 2204 spools is managed by each authority 2168 independently. Each device provides an amount of storage space to each authority 2168. That authority 2168 further manages lifetimes and allocations within that space. Examples of a spool include distributed transactions or notions. When the primary power to a storage unit 2152 fails, onboard super-capacitors provide a short duration of power hold up. During this holdup interval, the contents of the NVRAM 2204 are flushed to flash memory 2206. On the next power-on, the contents of the NVRAM 2204 are recovered from the flash memory 2206.

As for the storage unit controller, the responsibility of the logical "controller" is distributed across each of the blades containing authorities 2168. This distribution of logical control is shown in FIG. 21D as a host controller 242, mid-tier controller 244 and storage unit controller(s) 2246. Management of the control plane and the storage plane are treated independently, although parts may be physically co-located on the same blade. Each authority 2168 effectively serves as an independent controller. Each authority 2168 provides its own data and metadata structures, its own background workers, and maintains its own lifecycle.

Figure 21E:
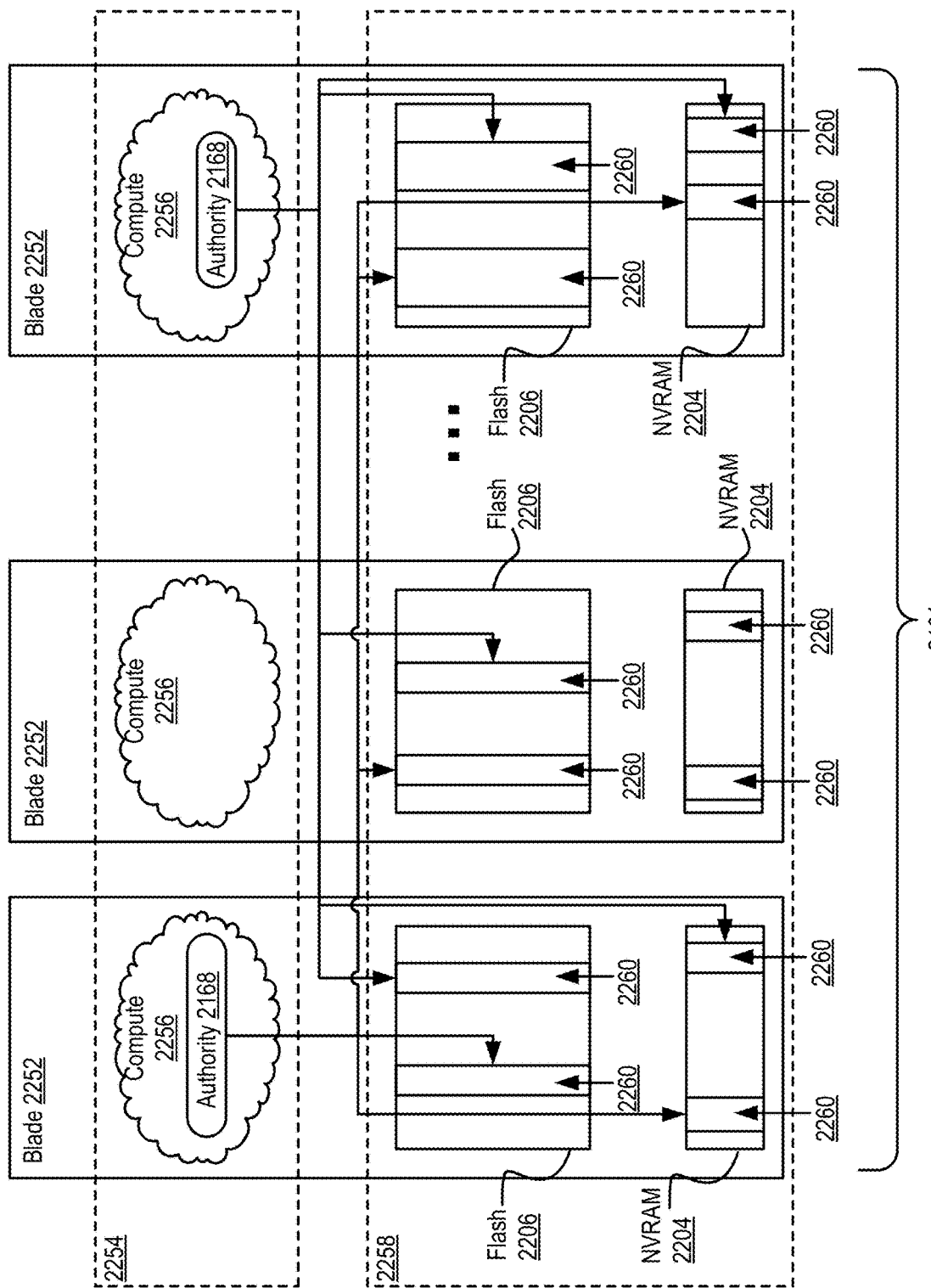
FIG. 21E is a blade hardware block diagram, showing a control plane, compute and storage planes, and authorities interacting with underlying physical resources, in accordance with some embodiments.

FIG. 21E is a blade 2252 hardware block diagram, showing a control plane 2254, compute and storage planes 2256, 2258, and authorities 2168 interacting with underlying physical resources, using embodiments of the storage nodes 2150 and storage units 2152 of FIGS. 21A-C in the storage server environment of FIG. 21D. The control plane 2254 is partitioned into a number of authorities 2168 which can use the compute resources in the compute plane 2256 to run on any of the blades 2252. The storage plane 2258 is partitioned into a set of devices, each of which provides access to flash 2206 and NVRAM 2204 resources. In one embodiment, the compute plane 2256 may perform the operations of a storage array controller, as described herein, on one or more devices of the storage plane 2258 (e.g., a storage array).

In the compute and storage planes 2256, 2258 of FIG. 21E, the authorities 2168 interact with the underlying physical resources (i.e., devices). From the point of view of an authority 2168, its resources are striped over all of the physical devices. From the point of view of a device, it provides resources to all authorities 2168, irrespective of where the authorities happen to run. Each authority 2168 has allocated or has been allocated one or more partitions 2260 of storage memory in the storage units 2152, e.g. partitions 2260 in flash memory 2206 and NVRAM 2204. Each authority 2168 uses those allocated partitions 2260 that belong to it, for writing or reading user data. Authorities can be associated with differing amounts of physical storage of the system. For example, one authority 2168 could have a larger number of partitions 2260 or larger sized partitions 2260 in one or more storage units 2152 than one or more other authorities 2168.

Figure 21F:
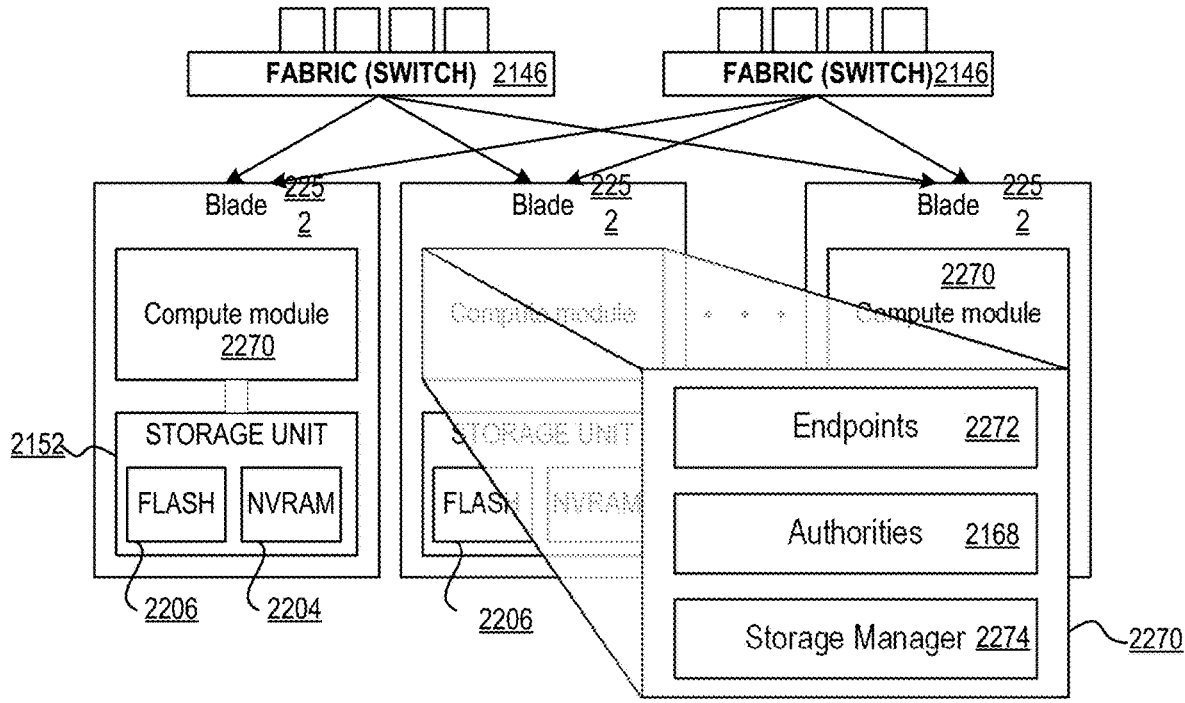
FIG. 21F depicts elasticity software layers in blades of a storage cluster, in accordance with some embodiments.

FIG. 21F depicts elasticity software layers in blades 2252 of a storage cluster, in accordance with some embodiments. In the elasticity structure, elasticity software is symmetric, i.e., each blade's compute module 2270 runs the three identical layers of processes depicted in FIG. 21F. Storage managers 2274 execute read and write requests from other blades 2252 for data and metadata stored in local storage unit 2152 NVRAM 2204 and flash 2206. Authorities 2168 fulfill client requests by issuing the necessary reads and writes to the blades 2252 on whose storage units 2152 the corresponding data or metadata resides. Endpoints 2272 parse client connection requests received from switch fabric 2146 supervisory software, relay the client connection requests to the authorities 2168 responsible for fulfillment, and relay the authorities' 2168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 21F, authorities 2168 running in the compute modules 2270 of a blade 252 perform the internal operations required to fulfill client requests. One feature of elasticity is that authorities 2168 are stateless, i.e., they cache active data and metadata in their own blades' 2252 DRAMs for fast access, but the authorities store every update in their NVRAM 2204 partitions on three separate blades 2252 until the update has been written to flash 2206. All the storage system writes to NVRAM 2204 are in triplicate to partitions on three separate blades 252 in some embodiments. With triple-mirrored NVRAM 2204 and persistent storage protected by parity and Reed-Solomon RAID checksums, the storage system can survive concurrent failure of two blades 2252 with no loss of data, metadata, or access to either.

Because authorities 2168 are stateless, they can migrate between blades 2252. Each authority 2168 has a unique identifier. NVRAM 2204 and flash 2206 partitions are associated with authorities' 2168 identifiers, not with the blades 2252 on which they are running in some. Thus, when an authority 2168 migrates, the authority 2168 continues to manage the same storage partitions from its new location. When a new blade 2252 is installed in an embodiment of the storage cluster, the system automatically rebalances load by: partitioning the new blade's 2252 storage for use by the system's authorities 2168, migrating selected authorities 2168 to the new blade 2252, starting endpoints 2272 on the new blade 2252 and including them in the switch fabric's 2146 client connection distribution algorithm.

From their new locations, migrated authorities 2168 persist the contents of their NVRAM 2204 partitions on flash 2206, process read and write requests from other authorities 2168, and fulfill the client requests that endpoints 2272 direct to them. Similarly, if a blade 2252 fails or is removed, the system redistributes its authorities 2168 among the system's remaining blades 2252. The redistributed authorities 2168 continue to perform their original functions from their new locations.

Figure 21G:
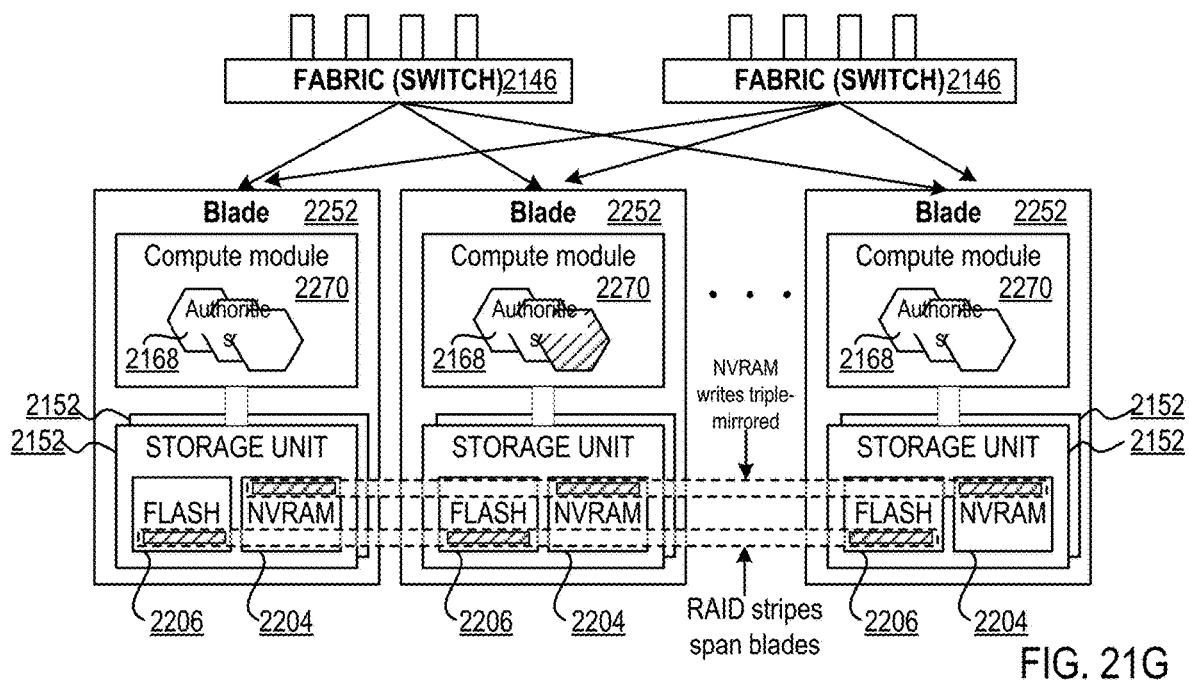
FIG. 21G depicts authorities and storage resources in blades of a storage cluster, in accordance with some embodiments.

FIG. 21G depicts authorities 2168 and storage resources in blades 2252 of a storage cluster, in accordance with some embodiments. Each authority 2168 is exclusively responsible for a partition of the flash 2206 and NVRAM 2204 on each blade 2252. The authority 2168 manages the content and integrity of its partitions independently of other authorities 2168. Authorities 2168 compress incoming data and preserve it temporarily in their NVRAM 2204 partitions, and then consolidate, RAID-protect, and persist the data in segments of the storage in their flash 2206 partitions. As the authorities 2168 write data to flash 2206, storage managers 2274 perform the necessary flash translation to optimize write performance and maximize media longevity. In the background, authorities 2168 "garbage collect," or reclaim space occupied by data that clients have made obsolete by overwriting the data. It should be appreciated that since authorities' 2168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

FIG. 3A sets forth a diagram of a storage system 2306 that is coupled for data communications with a cloud services provider 2302 in accordance with some embodiments of the present disclosure. Although depicted in less detail, the storage system 2306 depicted in FIG. 3A may be similar to the storage systems described above with reference to the figures described above. In some embodiments, the storage system 2306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 2306 is coupled to the cloud services provider 2302 via a data communications link 2304. The data communications link 2304 may be embodied as a dedicated data communications link, as a data communications pathway that is provided through the use of one or data communications networks such as a wide area network ('WAN') or LAN, or as some other mechanism capable of transporting digital information between the storage system 2306 and the cloud services provider 2302. Such a data communications link 2304 may be fully wired, fully wireless, or some aggregation of wired and wireless data communications pathways. In such an example, digital information may be exchanged between the storage system 2306 and the cloud services provider 2302 via the data communications link 2304 using one or more data communications protocols. For example, digital information may be exchanged between the storage system 2306 and the cloud services provider 2302 via the data communications link 2304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

Figure 22A:
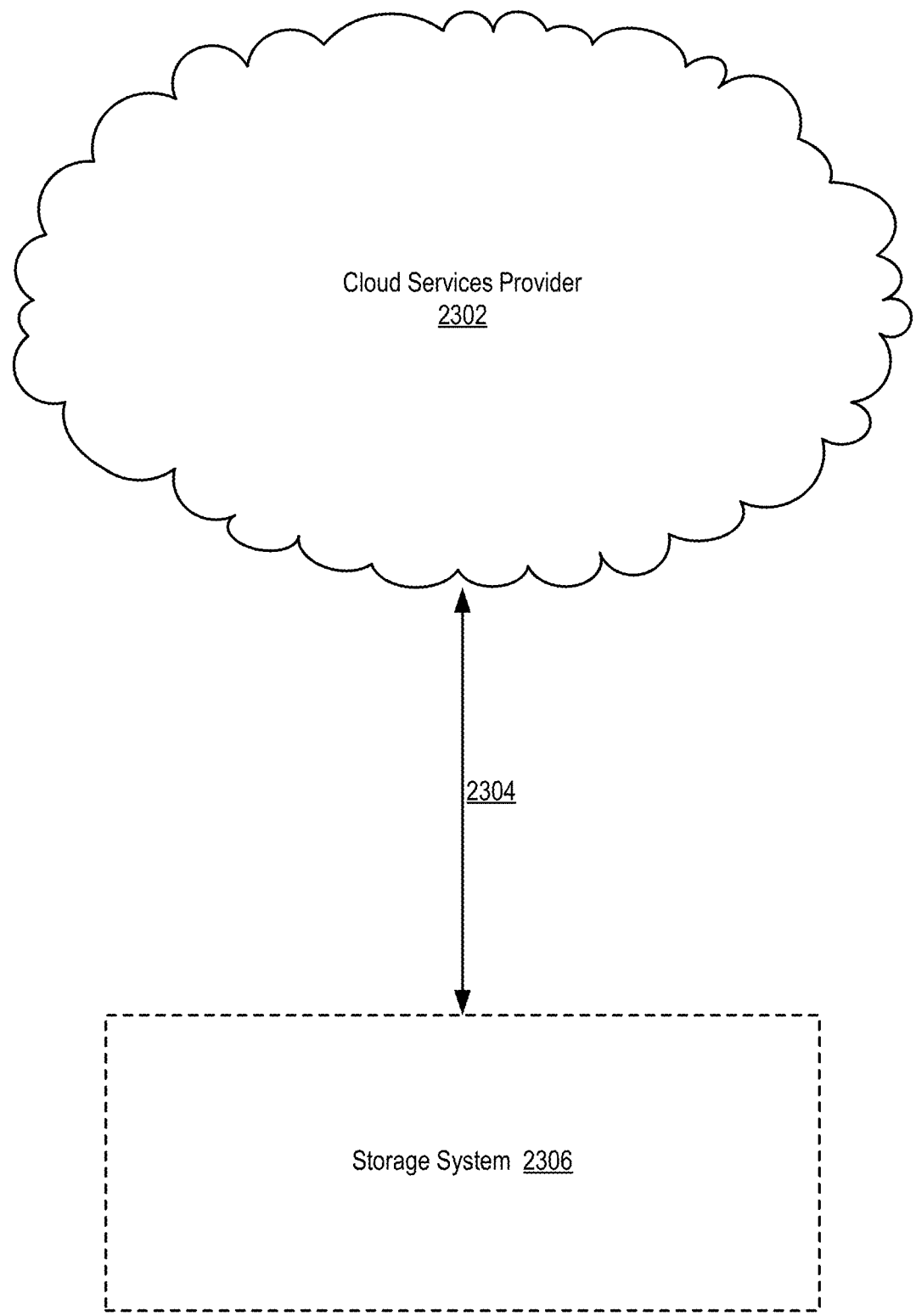
FIG. 22A sets forth a diagram of a storage system that is coupled for data communications with a cloud services provider in accordance with some embodiments of the present disclosure.

The cloud services provider 2302 depicted in FIG. 22A may be embodied, for example, as a system and computing environment that provides a vast array of services to users of the cloud services provider 2302 through the sharing of computing resources via the data communications link 2304. The cloud services provider 2302 may provide on-demand access to a shared pool of configurable computing resources such as computer networks, servers, storage, applications and services, and so on. The shared pool of configurable resources may be rapidly provisioned and released to a user of the cloud services provider 2302 with minimal management effort. Generally, the user of the cloud services provider 2302 is unaware of the exact computing resources utilized by the cloud services provider 2302 to provide the services. Although in many cases such a cloud services provider 2302 may be accessible via the Internet, readers of skill in the art will recognize that any system that abstracts the use of shared resources to provide services to a user through any data communications link may be considered a cloud services provider 2302.

In the example depicted in FIG. 22A, the cloud services provider 2302 may be configured to provide a variety of services to the storage system 2306 and users of the storage system 2306 through the implementation of various service models. For example, the cloud services provider 2302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 2302 offers access to its storage infrastructure for use by the storage system 2306 and users of the storage system 2306, and so on. Readers will appreciate that the cloud services provider 2302 may be configured to provide additional services to the storage system 2306 and users of the storage system 2306 through the implementation of additional service models, as the service models described above are included only for explanatory purposes and in no way represent a limitation of the services that may be offered by the cloud services provider 2302 or a limitation as to the service models that may be implemented by the cloud services provider 2302.

In the example depicted in FIG. 22A, the cloud services provider 2302 may be embodied, for example, as a private cloud, as a public cloud, or as a combination of a private cloud and public cloud. In an embodiment in which the cloud services provider 2302 is embodied as a private cloud, the cloud services provider 2302 may be dedicated to providing services to a single organization rather than providing services to multiple organizations. In an embodiment where the cloud services provider 2302 is embodied as a public cloud, the cloud services provider 2302 may provide services to multiple organizations. In still alternative embodiments, the cloud services provider 2302 may be embodied as a mix of a private and public cloud services with a hybrid cloud deployment.

Although not explicitly depicted in FIG. 22A, readers will appreciate that a vast amount of additional hardware components and additional software components may be necessary to facilitate the delivery of cloud services to the storage system 2306 and users of the storage system 2306. For example, the storage system 2306 may be coupled to (or even include) a cloud storage gateway. Such a cloud storage gateway may be embodied, for example, as hardware-based or software-based appliance that is located on premise with the storage system 2306. Such a cloud storage gateway may operate as a bridge between local applications that are executing on the storage array 2306 and remote, cloud-based storage that is utilized by the storage array 2306. Through the use of a cloud storage gateway, organizations may move primary iSCSI or NAS to the cloud services provider 2302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 2302.

In order to enable the storage system 2306 and users of the storage system 2306 to make use of the services provided by the cloud services provider 2302, a cloud migration process may take place during which data, applications, or other elements from an organization's local systems (or even from another cloud environment) are moved to the cloud services provider 2302. In order to successfully migrate data, applications, or other elements to the cloud services provider's 2302 environment, middleware such as a cloud migration tool may be utilized to bridge gaps between the cloud services provider's 2302 environment and an organization's environment. Such cloud migration tools may also be configured to address potentially high network costs and long transfer times associated with migrating large volumes of data to the cloud services provider 2302, as well as addressing security concerns associated with sensitive data to the cloud services provider 2302 over data communications networks. In order to further enable the storage system 2306 and users of the storage system 2306 to make use of the services provided by the cloud services provider 2302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 22A, and as described briefly above, the cloud services provider 2302 may be configured to provide services to the storage system 2306 and users of the storage system 2306 through the usage of a SaaS service model, eliminating the need to install and run the application on local computers, which may simplify maintenance and support of the application. Such applications may take many forms in accordance with various embodiments of the present disclosure. For example, the cloud services provider 2302 may be configured to provide access to data analytics applications to the storage system 2306 and users of the storage system 2306. Such data analytics applications may be configured, for example, to receive vast amounts of telemetry data phoned home by the storage system 2306. Such telemetry data may describe various operating characteristics of the storage system 2306 and may be analyzed for a vast array of purposes including, for example, to determine the health of the storage system 2306, to identify workloads that are executing on the storage system 2306, to predict when the storage system 2306 will run out of various resources, to recommend configuration changes, hardware or software upgrades, workflow migrations, or other actions that may improve the operation of the storage system 2306.

The cloud services provider 2302 may also be configured to provide access to virtualized computing environments to the storage system 2306 and users of the storage system 2306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 22B:
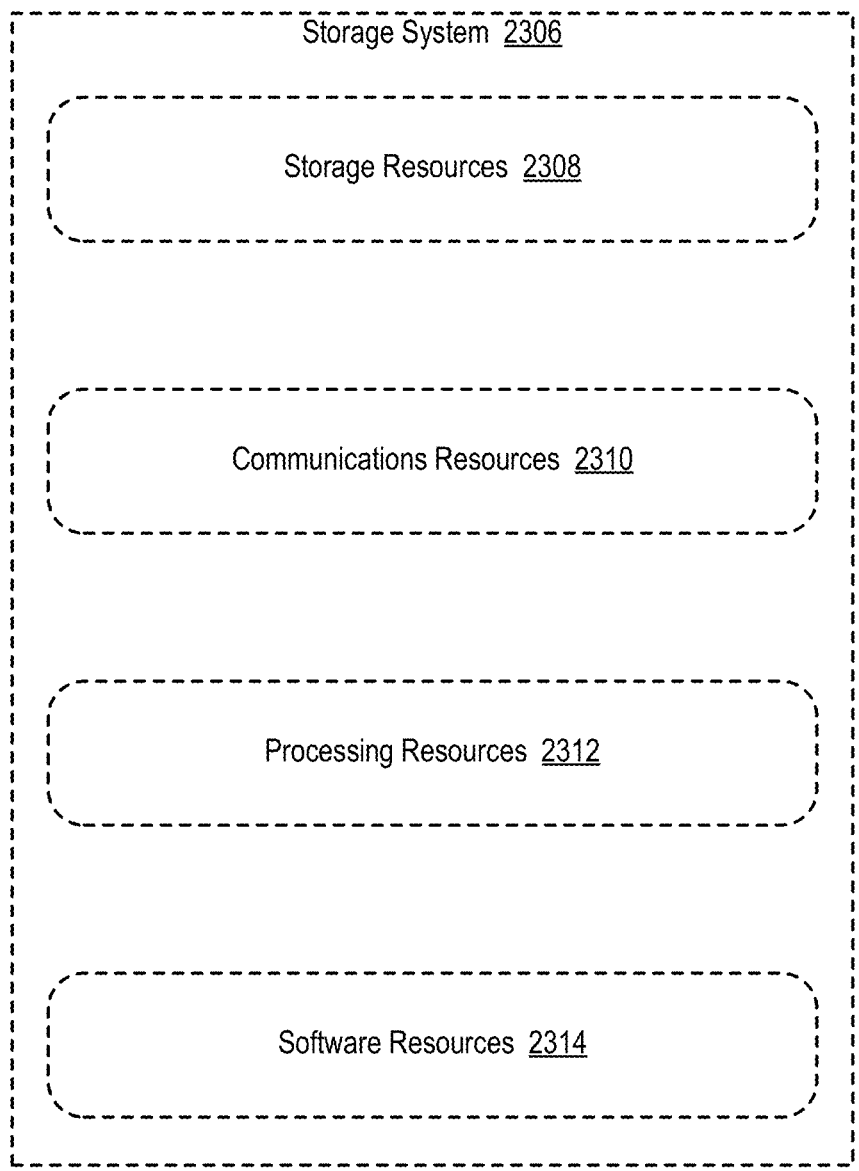
FIG. 22B sets forth a diagram of a storage system in accordance with some embodiments of the present disclosure.

For further explanation, FIG. 22B sets forth a diagram of a storage system 2306 in accordance with some embodiments of the present disclosure. Although depicted in less detail, the storage system 2306 depicted in FIG. 22B may be similar to the storage systems described above as the storage system may include many of the components described above.

The storage system 2306 depicted in FIG. 22B may include a vast amount of storage resources 2308, which may be embodied in many forms. For example, the storage resources 2308 can include nano-RAM or another form of nonvolatile random access memory that utilizes carbon nanotubes deposited on a substrate, 3D crosspoint nonvolatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 2308 may include non-volatile magnetoresistive random-access memory ('MRAM'), including spin transfer torque ('STT') MRAM. The example storage resources 2308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 2308 depicted in FIG. 22A may be embodied in a variety of form factors, including but not limited to, dual in-line memory modules ('DIMMs'), non-volatile dual in-line memory modules ('NVDIMMs'), M.2, U.2, and others.

The storage resources 2308 depicted in FIG. 22A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 2306 depicted in FIG. 22B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 2306 depicted in FIG. 22B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 2306 depicted in FIG. 22B also includes communications resources 2310 that may be useful in facilitating data communications between components within the storage system 2306, as well as data communications between the storage system 2306 and computing devices that are outside of the storage system 2306, including embodiments where those resources are separated by a relatively vast expanse. The communications resources 2310 may be configured to utilize a variety of different protocols and data communication fabrics to facilitate data communications between components within the storage systems as well as computing devices that are outside of the storage system. For example, the communications resources 2310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 2310 can also include mechanisms for accessing storage resources 2308 within the storage system 2306 utilizing serial attached SCSI ('SAS'), serial ATA ('SATA') bus interfaces for connecting storage resources 2308 within the storage system 2306 to host bus adapters within the storage system 2306, internet small computer systems interface ('iSCSI') technologies to provide block-level access to storage resources 2308 within the storage system 2306, and other communications resources that that may be useful in facilitating data communications between components within the storage system 2306, as well as data communications between the storage system 2306 and computing devices that are outside of the storage system 2306.

The storage system 2306 depicted in FIG. 22B also includes processing resources 2312 that may be useful in useful in executing computer program instructions and performing other computational tasks within the storage system 2306. The processing resources 2312 may include one or more ASICs that are customized for some particular purpose as well as one or more CPUs. The processing resources 2312 may also include one or more DSPs, one or more FPGAs, one or more systems on a chip ('SoCs'), or other form of processing resources 2312. The storage system 2306 may utilize the storage resources 2312 to perform a variety of tasks including, but not limited to, supporting the execution of software resources 2314 that will be described in greater detail below.

The storage system 2306 depicted in FIG. 22B also includes software resources 2314 that, when executed by processing resources 2312 within the storage system 2306, may perform a vast array of tasks. The software resources 2314 may include, for example, one or more modules of computer program instructions that when executed by processing resources 2312 within the storage system 2306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 2314 may also include software that is useful in implementing software-defined storage ('SDS'). In such an example, the software resources 2314 may include one or more modules of computer program instructions that, when executed, are useful in policy-based provisioning and management of data storage that is independent of the underlying hardware. Such software resources 2314 may be useful in implementing storage virtualization to separate the storage hardware from the software that manages the storage hardware.

The software resources 2314 may also include software that is useful in facilitating and optimizing I/O operations that are directed to the storage resources 2308 in the storage system 2306. For example, the software resources 2314 may include software modules that perform carry out various data reduction techniques such as, for example, data compression, data deduplication, and others. The software resources 2314 may include software modules that intelligently group together I/O operations to facilitate better usage of the underlying storage resource 2308, software modules that perform data migration operations to migrate from within a storage system, as well as software modules that perform other functions. Such software resources 2314 may be embodied as one or more software containers or in many other ways.

Figure 22C:
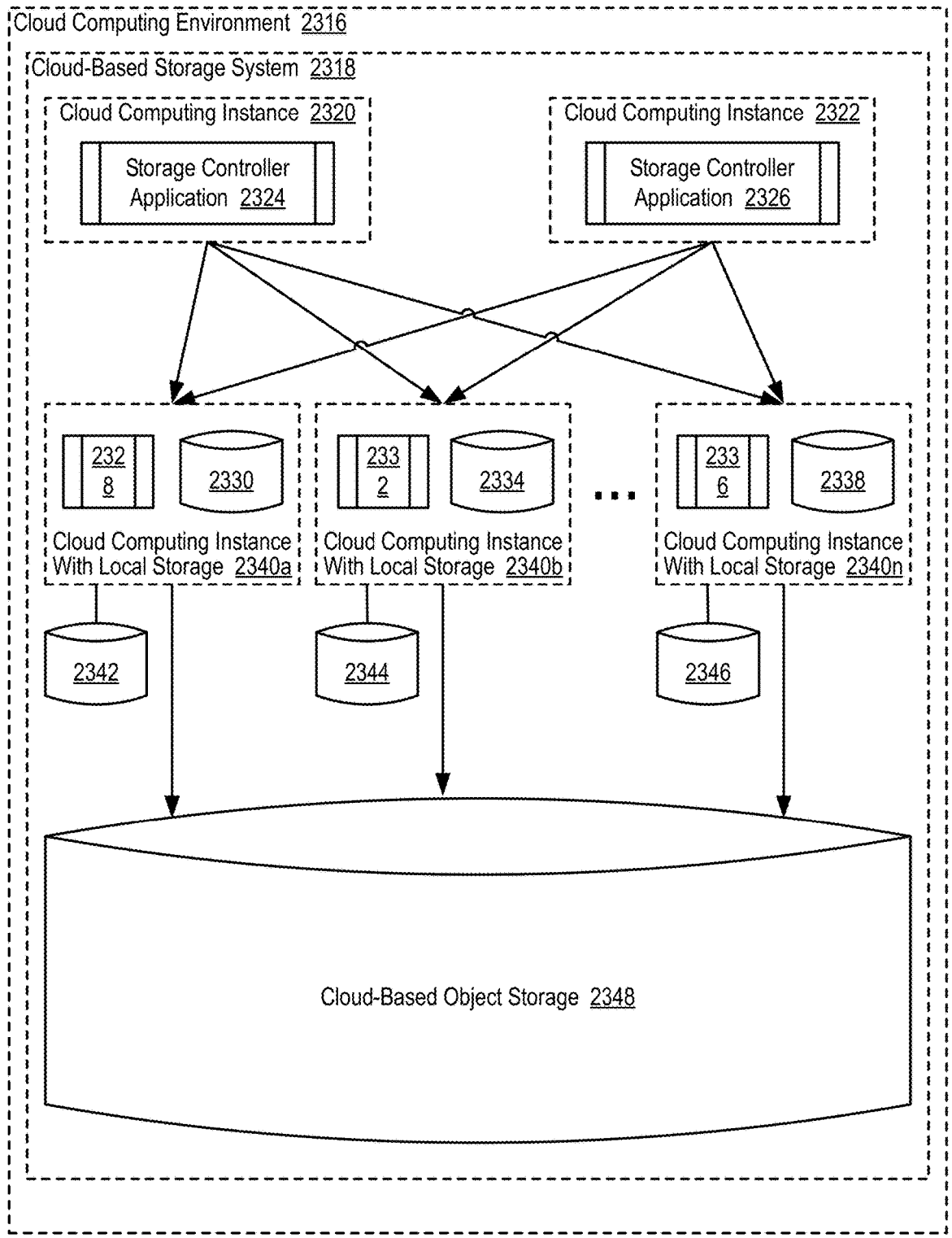
FIG. 22C sets forth an example of a cloud-based storage system in accordance with some embodiments of the present disclosure.

For further explanation, FIG. 22C sets forth an example of a cloud-based storage system 2318 in accordance with some embodiments of the present disclosure. In the example depicted in FIG. 22C, the cloud-based storage system 2318 is created entirely in a cloud computing environment 2316 such as, for example, Amazon Web Services ('AWS'), Microsoft Azure, Google Cloud Platform, IBM Cloud, Oracle Cloud, and others. The cloud-based storage system 2318 may be used to provide services similar to the services that may be provided by the storage systems described above. For example, the cloud-based storage system 2318 may be used to provide block storage services to users of the cloud-based storage system 2318, the cloud-based storage system 2318 may be used to provide storage services to users of the cloud-based storage system 2318 through the use of solid-state storage, and so on.

The cloud-based storage system 2318 depicted in FIG. 22C includes two cloud computing instances 2320, 2322 that each are used to support the execution of a storage controller application 2324, 2326. The cloud computing instances 2320, 2322 may be embodied, for example, as instances of cloud computing resources (e.g., virtual machines) that may be provided by the cloud computing environment 2316 to support the execution of software applications such as the storage controller application 2324, 2326. In one embodiment, the cloud computing instances 2320, 2322 may be embodied as Amazon Elastic Compute Cloud ('EC2') instances. In such an example, an Amazon Machine Image ('AMI') that includes the storage controller application 2324, 2326 may be booted to create and configure a virtual machine that may execute the storage controller application 2324, 2326.

In the example method depicted in FIG. 22C, the storage controller application 2324, 2326 may be embodied as a module of computer program instructions that, when executed, carries out various storage tasks. For example, the storage controller application 2324, 2326 may be embodied as a module of computer program instructions that, when executed, carries out the same tasks as the controllers 2010A, 110B in FIG. 1A described above such as writing data received from the users of the cloud-based storage system 2318 to the cloud-based storage system 2318, erasing data from the cloud-based storage system 2318, retrieving data from the cloud-based storage system 2318 and providing such data to users of the cloud-based storage system 2318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 2320, 2322 that each include the storage controller application 2324, 2326, in some embodiments one cloud computing instance 2320 may operate as the primary controller as described above while the other cloud computing instance 2322 may operate as the secondary controller as described above. Readers will appreciate that the storage controller application 2324, 2326 depicted in FIG. 22C may include identical source code that is executed within different cloud computing instances 2320, 2322.

Consider an example in which the cloud computing environment 2316 is embodied as AWS and the cloud computing instances are embodied as EC2 instances. In such an example, the cloud computing instance 2320 that operates as the primary controller may be deployed on one of the instance types that has a relatively large amount of memory and processing power while the cloud computing instance 2322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 2322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 2322 that originally operated as the secondary controller begins operating as the secondary controller again. In such an example, the cloud computing instance 2320 that formerly operated as the primary controller may be terminated. Readers will appreciate that in alternative embodiments, the cloud computing instance 2320 that is operating as the secondary controller after the failover event may continue to operate as the secondary controller and the cloud computing instance 2322 that operated as the primary controller after the occurrence of the failover event may be terminated once the primary role has been assumed by the third cloud computing instance (not shown).

Readers will appreciate that while the embodiments described above relate to embodiments where one cloud computing instance 2320 operates as the primary controller and the second cloud computing instance 2322 operates as the secondary controller, other embodiments are within the scope of the present disclosure. For example, each cloud computing instance 2320, 2322 may operate as a primary controller for some portion of the address space supported by the cloud-based storage system 2318, each cloud computing instance 2320, 2322 may operate as a primary controller where the servicing of I/O operations directed to the cloud-based storage system 2318 are divided in some other way, and so on. In fact, in other embodiments where costs savings may be prioritized over performance demands, only a single cloud computing instance may exist that contains the storage controller application.

The cloud-based storage system 2318 depicted in FIG. 22C includes cloud computing instances 2340a, 2340b, 2340n with local storage 2330, 2334, 2338. The cloud computing instances 2340a, 2340b, 2340n depicted in FIG. 22C may be embodied, for example, as instances of cloud computing resources that may be provided by the cloud computing environment 2316 to support the execution of software applications. The cloud computing instances 2340a, 2340b, 2340n of FIG. 22C may differ from the cloud computing instances 2320, 2322 described above as the cloud computing instances 2340a, 2340b, 2340n of FIG. 22C have local storage 2330, 2334, 2338 resources whereas the cloud computing instances 2320, 2322 that support the execution of the storage controller application 2324, 2326 need not have local storage resources. The cloud computing instances 2340a, 2340b, 2340n with local storage 2330, 2334, 2338 may be embodied, for example, as EC2 M5 instances that include one or more SSDs, as EC2 R5 instances that include one or more SSDs, as EC2 I3 instances that include one or more SSDs, and so on. In some embodiments, the local storage 2330, 2334, 2338 must be embodied as solid-state storage (e.g., SSDs) rather than storage that makes use of hard disk drives.

In the example depicted in FIG. 22C, each of the cloud computing instances 2340a, 2340b, 2340n with local storage 2330, 2334, 2338 can include a software daemon 2328, 2332, 2336 that, when executed by a cloud computing instance 2340a, 2340b, 2340n can present itself to the storage controller applications 2324, 2326 as if the cloud computing instance 2340a, 2340b, 2340n were a physical storage device (e.g., one or more SSDs). In such an example, the software daemon 2328, 2332, 2336 may include computer program instructions similar to those that would normally be contained on a storage device such that the storage controller applications 2324, 2326 can send and receive the same commands that a storage controller would send to storage devices. In such a way, the storage controller applications 2324, 2326 may include code that is identical to (or substantially identical to) the code that would be executed by the controllers in the storage systems described above. In these and similar embodiments, communications between the storage controller applications 2324, 2326 and the cloud computing instances 2340a, 2340b, 2340n with local storage 2330, 2334, 2338 may utilize iSCSI, NVMe over TCP, messaging, a custom protocol, or in some other mechanism.

In the example depicted in FIG. 22C, each of the cloud computing instances 2340a, 2340b, 2340n with local storage 2330, 2334, 2338 may also be coupled to block-storage 2342, 2344, 2346 that is offered by the cloud computing environment 2316. The block-storage 2342, 2344, 2346 that is offered by the cloud computing environment 2316 may be embodied, for example, as Amazon Elastic Block Store ('EBS') volumes. For example, a first EBS volume may be coupled to a first cloud computing instance 2340a, a second EBS volume may be coupled to a second cloud computing instance 2340b, and a third EBS volume may be coupled to a third cloud computing instance 2340n. In such an example, the block-storage 2342, 2344, 2346 that is offered by the cloud computing environment 2316 may be utilized in a manner that is similar to how the NVRAM devices described above are utilized, as the software daemon 2328, 2332, 2336 (or some other module) that is executing within a particular cloud comping instance 2340a, 2340b, 2340n may, upon receiving a request to write data, initiate a write of the data to its attached EBS volume as well as a write of the data to its local storage 2330, 2334, 2338 resources. In some alternative embodiments, data may only be written to the local storage 2330, 2334, 2338 resources within a particular cloud comping instance 2340a, 2340b, 2340n. In an alternative embodiment, rather than using the block-storage 2342, 2344, 2346 that is offered by the cloud computing environment 2316 as NVRAM, actual RAM on each of the cloud computing instances 2340a, 2340b, 2340n with local storage 2330, 2334, 2338 may be used as NVRAM, thereby decreasing network utilization costs that would be associated with using an EBS volume as the NVRAM.

In the example depicted in FIG. 22C, the cloud computing instances 2340a, 2340b, 2340n with local storage 2330, 2334, 2338 may be utilized, by cloud computing instances 2320, 2322 that support the execution of the storage controller application 2324, 2326 to service I/O operations that are directed to the cloud-based storage system 2318.

Readers will appreciate that when a request to write data is received by a particular cloud computing instance 2340a, 2340b, 2340n with local storage 2330, 2334, 2338, the software daemon 2328, 2332, 2336 or some other module of computer program instructions that is executing on the particular cloud computing instance 2340a, 2340b, 2340n may be configured to not only write the data to its own local storage 2330, 2334, 2338 resources and any appropriate block-storage 2342, 2344, 2346 that are offered by the cloud computing environment 2316, but the software daemon 2328, 2332, 2336 or some other module of computer program instructions that is executing on the particular cloud computing instance 2340a, 2340b, 2340n may also be configured to write the data to cloud-based object storage 2348 that is attached to the particular cloud computing instance 2340a, 2340b, 2340n. The cloud-based object storage 2348 that is attached to the particular cloud computing instance 2340a, 2340b, 2340n may be embodied, for example, as Amazon Simple Storage Service ('S3') storage that is accessible by the particular cloud computing instance 2340a, 2340b, 2340n. In other embodiments, the cloud computing instances 2320, 2322 that each include the storage controller application 2324, 2326 may initiate the storage of the data in the local storage 2330, 2334, 2338 of the cloud computing instances 2340a, 2340b, 2340n and the cloud-based object storage 2348.

Readers will appreciate that, as described above, the cloud-based storage system 2318 may be used to provide block storage services to users of the cloud-based storage system 2318. While the local storage 2330, 2334, 2338 resources and the block-storage 2342, 2344, 2346 resources that are utilized by the cloud computing instances 2340a, 2340b, 2340n may support block-level access, the cloud-based object storage 2348 that is attached to the particular cloud computing instance 2340a, 2340b, 2340n supports only object-based access. In order to address this, the software daemon 2328, 2332, 2336 or some other module of computer program instructions that is executing on the particular cloud computing instance 2340a, 2340b, 2340n may be configured to take blocks of data, package those blocks into objects, and write the objects to the cloud-based object storage 2348 that is attached to the particular cloud computing instance 2340a, 2340b, 2340n.

In some embodiments, all data that is stored by the cloud-based storage system 2318 may be stored in both: 1) the cloud-based object storage 2348, and 2) at least one of the local storage 2330, 2334, 2338 resources or block-storage 2342, 2344, 2346 resources that are utilized by the cloud computing instances 2340a, 2340b, 2340n. In such embodiments, the local storage 2330, 2334, 2338 resources and block-storage 2342, 2344, 2346 resources that are utilized by the cloud computing instances 2340a, 2340b, 2340n may effectively operate as cache that generally includes all data that is also stored in S3, such that all reads of data may be serviced by the cloud computing instances 2340a, 2340b, 2340n without requiring the cloud computing instances 2340a, 2340b, 2340n to access the cloud-based object storage 2348. Readers will appreciate that in other embodiments, however, all data that is stored by the cloud-based storage system 2318 may be stored in the cloud-based object storage 2348, but less than all data that is stored by the cloud-based storage system 2318 may be stored in at least one of the local storage 2330, 2334, 2338 resources or block-storage 2342, 2344, 2346 resources that are utilized by the cloud computing instances 2340a, 2340b, 2340n. In such an example, various policies may be utilized to determine which subset of the data that is stored by the cloud-based storage system 2318 should reside in both: 1) the cloud-based object storage 2348, and 2) at least one of the local storage 2330, 2334, 2338 resources or block-storage 2342, 2344, 2346 resources that are utilized by the cloud computing instances 2340a, 2340b, 2340n.

As described above, when the cloud computing instances 2340a, 2340b, 2340n with local storage 2330, 2334, 2338 are embodied as EC2 instances, the cloud computing instances 2340a, 2340b, 2340n with local storage 2330, 2334, 2338 are only guaranteed to have a monthly uptime of 99.9% and data stored in the local instance store only persists during the lifetime of each cloud computing instance 2340a, 2340b, 2340n with local storage 2330, 2334, 2338. As such, one or more modules of computer program instructions that are executing within the cloud-based storage system 2318 (e.g., a monitoring module that is executing on its own EC2 instance) may be designed to handle the failure of one or more of the cloud computing instances 2340a, 2340b, 2340n with local storage 2330, 2334, 2338. In such an example, the monitoring module may handle the failure of one or more of the cloud computing instances 2340a, 2340b, 2340n with local storage 2330, 2334, 2338 by creating one or more new cloud computing instances with local storage, retrieving data that was stored on the failed cloud computing instances 2340a, 2340b, 2340n from the cloud-based object storage 2348, and storing the data retrieved from the cloud-based object storage 2348 in local storage on the newly created cloud computing instances. Readers will appreciate that many variants of this process may be implemented.

Consider an example in which all cloud computing instances 2340a, 2340b, 2340n with local storage 2330, 2334, 2338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 2348. Readers will appreciate that instances types are selected that allow for the maximum data transfer rates between the new cloud computing instances and the cloud-based object storage 2348 such that the new high-bandwidth cloud computing instances can be rehydrated with data from the cloud-based object storage 2348 as quickly as possible. Once the new high-bandwidth cloud computing instances are rehydrated with data from the cloud-based object storage 2348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 2318. The number of new cloud computing instances that are created may substantially exceed the number of cloud computing instances that are needed to locally store all of the data stored by the cloud-based storage system 2318 in order to more rapidly pull data from the cloud-based object storage 2348 and into the new cloud computing instances, as each new cloud computing instance can (in parallel) retrieve some portion of the data stored by the cloud-based storage system 2318. In such embodiments, once the data stored by the cloud-based storage system 2318 has been pulled into the newly created cloud computing instances, the data may be consolidated within a subset of the newly created cloud computing instances and those newly created cloud computing instances that are excessive may be terminated.

Readers will appreciate that various performance aspects of the cloud-based storage system 2318 may be monitored (e.g., by a monitoring module that is executing in an EC2 instance) such that the cloud-based storage system 2318 can be scaled-up or scaled-out as needed. Consider an example in which the monitoring module monitors the performance of the could-based storage system 2318 via communications with one or more of the cloud computing instances 2320, 2322 that each are used to support the execution of a storage controller application 2324, 2326, via monitoring communications between cloud computing instances 2320, 2322, 2340a, 2340b, 2340n, via monitoring communications between cloud computing instances 2320, 2322, 2340a, 2340b, 2340n and the cloud-based object storage 2348, or in some other way. In such an example, assume that the monitoring module determines that the cloud computing instances 2320, 2322 that are used to support the execution of a storage controller application 2324, 2326 are undersized and not sufficiently servicing the I/O requests that are issued by users of the cloud-based storage system 2318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 2320, 2322 that are used to support the execution of a storage controller application 2324, 2326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Readers will appreciate that the cloud-based storage system 2318 may be sized up and down automatically by a monitoring module applying a predetermined set of rules that may be relatively simple of relatively complicated. In fact, the monitoring module may not only take into account the current state of the cloud-based storage system 2318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 2318 may be based on current performance metrics, predicted workloads, and many other factors, including combinations thereof.

Readers will further appreciate that because the cloud-based storage system 2318 may be dynamically scaled, the cloud-based storage system 2318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 2318 described here can always 'add' additional storage (e.g., by adding more cloud computing instances with local storage). Because the cloud-based storage system 2318 described here can always 'add' additional storage, the cloud-based storage system 2318 can make more intelligent decisions regarding when to perform garbage collection. For example, the cloud-based storage system 2318 may implement a policy that garbage collection only be performed when the number of IOPS being serviced by the cloud-based storage system 2318 falls below a certain level. In some embodiments, other system-level functions (e.g., deduplication, compression) may also be turned off and on in response to system load, given that the size of the cloud-based storage system 2318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 22C.

In some embodiments, especially in embodiments where the cloud-based object storage 2348 resources are embodied as Amazon S3, the cloud-based storage system 2318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state.

Readers will further appreciate that the backups (often in the form of one or more snapshots) may also be utilized to perform rapid recovery of the storage system. Consider an example in which the storage system is infected with ransomware that locks users out of the storage system. In such an example, software resources 2314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 2306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VDUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns— from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available— including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain—computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 22D:
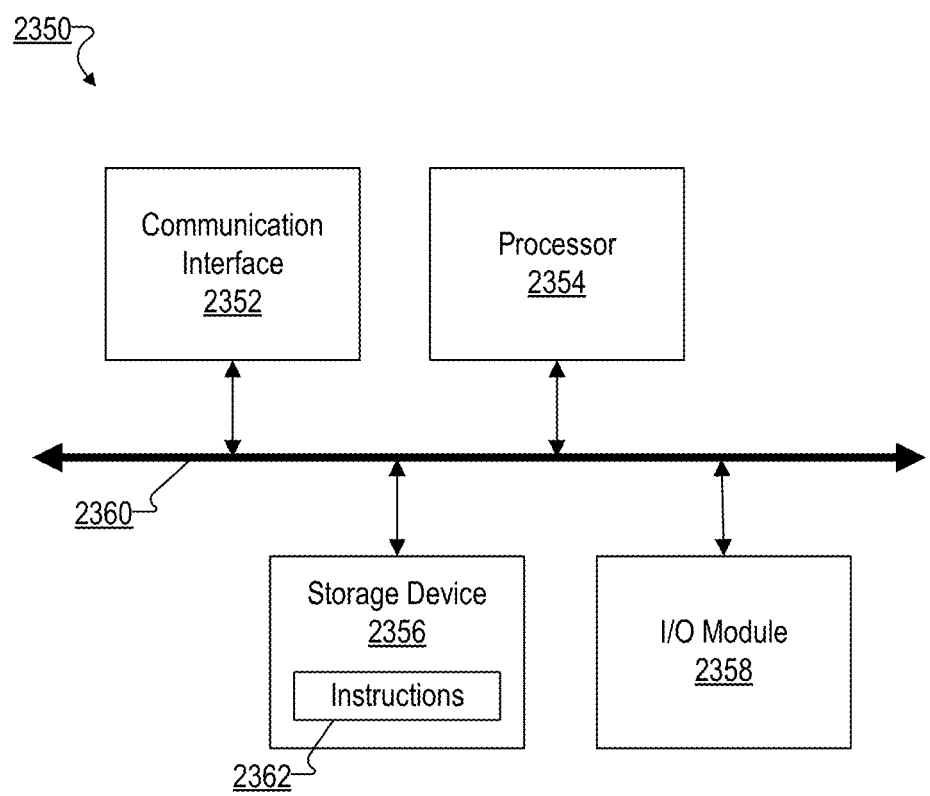
FIG. 22D illustrates an exemplary computing device that may be specifically configured to perform one or more of the processes described herein.

For further explanation, FIG. 22D illustrates an exemplary computing device 2350 that may be specifically configured to perform one or more of the processes described herein. As shown in FIG. 22D, computing device 2350 may include a communication interface 2352, a processor 2354, a storage device 2356, and an input/output ("I/O") module 2358 communicatively connected one to another via a communication infrastructure 2360. While an exemplary computing device 2350 is shown in FIG. 22D, the components illustrated in FIG. 22D are not intended to be limiting. Additional or alternative components may be used in other embodiments. Components of computing device 2350 shown in FIG. 22D will now be described in additional detail.

Communication interface 2352 may be configured to communicate with one or more computing devices. Examples of communication interface 2352 include, without limitation, a wired network interface (such as a network interface card), a wireless network interface (such as a wireless network interface card), a modem, an audio/video connection, and any other suitable interface.

Processor 2354 generally represents any type or form of processing unit capable of processing data and/or interpreting, executing, and/or directing execution of one or more of the instructions, processes, and/or operations described herein. Processor 2354 may perform operations by executing computer-executable instructions 2362 (e.g., an application, software, code, and/or other executable data instance) stored in storage device 2356.

Storage device 2356 may include one or more data storage media, devices, or configurations and may employ any type, form, and combination of data storage media and/or device. For example, storage device 2356 may include, but is not limited to, any combination of the non-volatile media and/or volatile media described herein. Electronic data, including data described herein, may be temporarily and/or permanently stored in storage device 2356. For example, data representative of computer-executable instructions 2362 configured to direct processor 2354 to perform any of the operations described herein may be stored within storage device 2356. In some examples, data may be arranged in one or more databases residing within storage device 2356.

I/O module 2358 may include one or more I/O modules configured to receive user input and provide user output. I/O module 2358 may include any hardware, firmware, software, or combination thereof supportive of input and output capabilities. For example, I/O module 2358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 2350.

Figure 23:
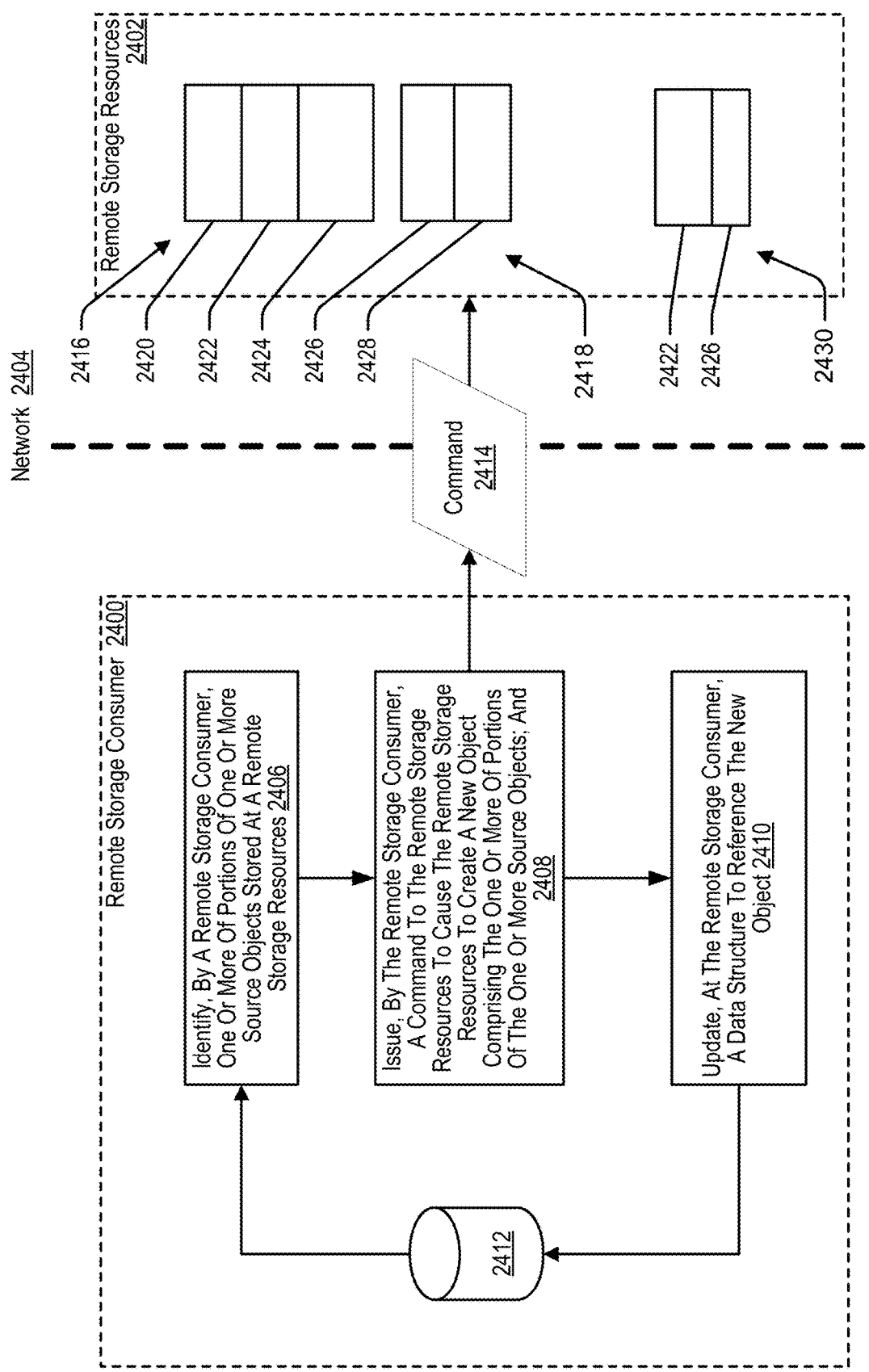
FIG. 23 is a flowchart of an example method for cost-effective storage management according to embodiments of the present disclosure.

For further explanation, FIG. 23 sets forth a flow chart illustrating an example method of cost-effective storage management in accordance with some embodiments of the present disclosure. The example depicted in FIG. 23 include a remote storage consumer 2400 which may be embodied as a device, system, user, application, or other entity that utilizes remote storage. For example, the remote storage consumer 2400 may be embodied as a storage system such as those described above, where the remote storage consumer 2400 and the remote storage resources 2402 are part of a distributed shared memory or storage. Alternatively, the remote storage consumer 2400 may be a server or some other computing device. The remote storage resources 2402 may be embodied, for example, as one of the storage systems described above (that provides APIs described below), as cloud storage such as one or more S3 buckets, as other forms of cloud storage, or in some other way.

In some embodiments, the example method depicted in FIG. 23 may be carried out at least in part by some module that is executing remotely relative to the remote storage resources 2402. The module may be embodied, for example, as a garbage collection module of computer program instructions executing on computer hardware such as a computer processor. As depicted in FIG. 23, a remote storage consumer 2400 may communicate with a remote storage resources 2402 by way of a network 2404 or other communication interface. The remote storage resources may implement a remote data management application program interface (API) to facilitate communication between the storage system.

The described methods are suitable for remote storage resources 2402 in which stored data needs to be reduced through a deletion/removal process such as garbage collection. The process of deleting/removing data may be complicated when using, for example, remote object storage. Such an object storage is typically designed to write an object once and does not update the data in the object once written. Therefore, the stored objects typically cannot be modified in place and require uploading of a new, updated object and deletion of the existing object. Therefore, the process of modifying an object may require large amounts of resources to retrieve the data contained in the object from object storage, make changes to the data, package the data into a new object, and upload the new object to the object storage. In contrast, the following methods optimize costs by removing the need to transfer an object out of the remote storage resources 2402 when modifying the object.

The method of FIG. 23 includes identifying 2406, by a remote storage consumer 2400, one or more of portions 2422, 2426 of one or more source objects 2416, 2418 stored at a remote storage resources 2402. In some examples, the remote storage consumer 2400 may implement a distributed shared memory storage architecture and the remote storage resources 2402 may be an object server providing object storage. In some examples, the remote storage resources 2402 may be a cloud object store service including, but are not limited to, Amazon® S3, Microsoft® Azure Blob Service and Google® Cloud Storage, or an on-premises Object Storage System. Identifying 2406, by the remote storage consumer 2400, one or more of portions 2422, 2426 of one or more source objects 2416, 2418 stored at the remote storage resources 2402 may be carried out by accessing a mapping data structure 2412, such as a reference map, that correlates data to source objects 2416, 2418 in the remote storage resources 2402. In some examples, the mapping data structure 2412 may be a distributed shared memory database. For example, the remote storage consumer 2400 may store a first block shard comprising multiple storage blocks as a first source object 2416 at the remote storage resources 2402 and a second block shard comprising multiple storage blocks as a second object 2418 at the remote storage resources 2402. The remote storage consumer 2400 may maintain the mapping data structure 2412 tracking which object corresponds to a particular block shard. Additionally, the mapping data structure 2412 may map individual shards or smaller units of data such as a file to byte ranges of each object.

The remote storage consumer 2400 may perform an operation that requires data stored in objects at the remote storage resources 2402 to be modified. For example, during a garbage collection process the remote storage consumer 2400 may identify data that no longer needs to be maintained by the remote storage consumer 2400. The remote storage consumer 2400 may reference the mapping data structure 2412 to identify one or more portions 2422, 2426 of one or more source objects 2416, 2418 that correspond to the data that no longer needs to be maintained by the remote storage consumer 2400. For example, a garbage collection process of the remote storage consumer 2400 may determine that some data no longer needs to be maintained by the remote storage consumer 2400. The remote storage consumer 2400 may then use the mapping data structure 2412 to identify the source objects 2416, 2418 that correspond to the data that no longer needs to be maintained. The remote storage consumer 2400 may then use the mapping data structure 2412 to identify the portions 2422, 2426 of the corresponding source objects 2416, 2418 that should be maintained. For example, the remote storage consumer 2400 may identify portions of the source object 2416 and source object 2418 as corresponding to the data that no longer needs to be maintained. The remote storage consumer 2400 may then identify the portions 2422, 2426, or byte ranges, of the source objects 2416, 2418 that should be maintained. For example, the remote storage consumer 2400 may select portions 2420, 2424, 2428 of the first source object 2416 and portion 2428 of the second source object 2418 as no longer needed. The remote storage consumer 2400 may then invert the selection to identify the one or more portions 2422, 2426 to be maintained.

The method of FIG. 23 also includes issuing 2408, by the remote storage consumer 2400, a command 2414 to the remote storage resources 2402 to cause the remote storage resources 2402 to create a new object 2430 comprising the one or more of portions 2422, 2426 of the one or more source objects 2416, 2418. Issuing 2408, by the remote storage consumer 2400, the command 2414 to the remote storage resources 2402 to cause the remote storage resources 2402 to create the new object 2430 comprising the one or more of portions 2422, 2426 of the one or more source objects 2416, 2418 may be carried out by sending a command 2414 over the network 2404 to the remote storage resources. Although FIG. 23 identifies the remote storage consumer 2400 and the remote storage resources 2402 as communicating over a network 2404, the reader will appreciate that the remote storage consumer 2400 and the remote storage resources 2402 may be connected by any communication medium that provides for communication between the remote storage consumer 2400 and the remote storage resources 2402. For example, the remote storage consumer 2400 may generate a command 2414 identifying an operation to perform, the source objects 2416, 2418 to be operated on, the portions 2422, 2426 of the source objects 2416, 2418 to maintain, and an identification of a new object 2430 to be created from the portions 2422, 2426 of the source objects 2416, 2418. The remote storage consumer 2400 may then send the command 2414 over the network 2404 to the remote storage resources 2402. In general, the described command 2414 may be implemented with a remote storage resources 2402 that allows for server-side creation of new objects from byte ranges of other objects at the remote storage resources 2402.

The command 2414 may be formatted and transmitted by the remote storage consumer 2400 according to an API provided by the remote storage resources 2402. The API may provide for operations such as a byte-range read during a get operation and a multipart upload with support for upload copies. In some examples, a single command to the API may accomplish the described functionality, or in other examples a pipelined command comprising sub-commands may be used. For example, the command 2414 may pipeline a result of a byte range read sub-command into a multipart upload put-copy sub-command. Thus, in response to receiving the command 2414, the remote storage resources 2402 would read the byte ranges of the source objects identified in the sub-command and pipeline data corresponding to the byte ranges into a multipart upload subcommand to create the new object 2430.

Of note, the remote storage resources 2402 creates the new object 2430 comprising the portions 2422, 2426 of the source objects 2416, 2418 without requiring data contained in the source objects 2416, 2418 to be transferred to or from the remote storage consumer 2400. Thus, the remote storage consumer 2400 efficiently modifies existing data, such as during a garbage collection process, without retransmitting data. Avoiding retransmission of the data between the remote storage consumer 2400 and the remote storage resources 2402 may substantially reduce compute costs associated with a cloud provider by offloading the creation of the new object 2430 to the cloud provider. In this manner, transport and transaction costs are saved, and time to completion is reduce, and load is reduced on the consuming application as well.

The method of FIG. 23 also includes updating 2410, at the remote storage consumer 2400, a mapping data structure 2412 to reference the new object 2430. Updating 2410, at the remote storage consumer 2400, the mapping data structure 2412 to reference the new object 2430 may be carried out by writing a new mapping data structure 2412 mapping data to the new object 2430, or by updating an existing mapping data structure 2412 to map the data to the new object 2430. For example, the remote storage consumer 2400 may modify the mapping data structure 2412 to include a new reference to the new object 2430. In some examples, updating the mapping data structure 2412 to reference the new object 2430 may further include updating the mapping data structure 2412 to remove the reference to the source objects 2416, 2418 or updating the mapping data structure 2412 to indicate that the original reference to the source objects 2416, 2418 is no longer current.

Figure 24:
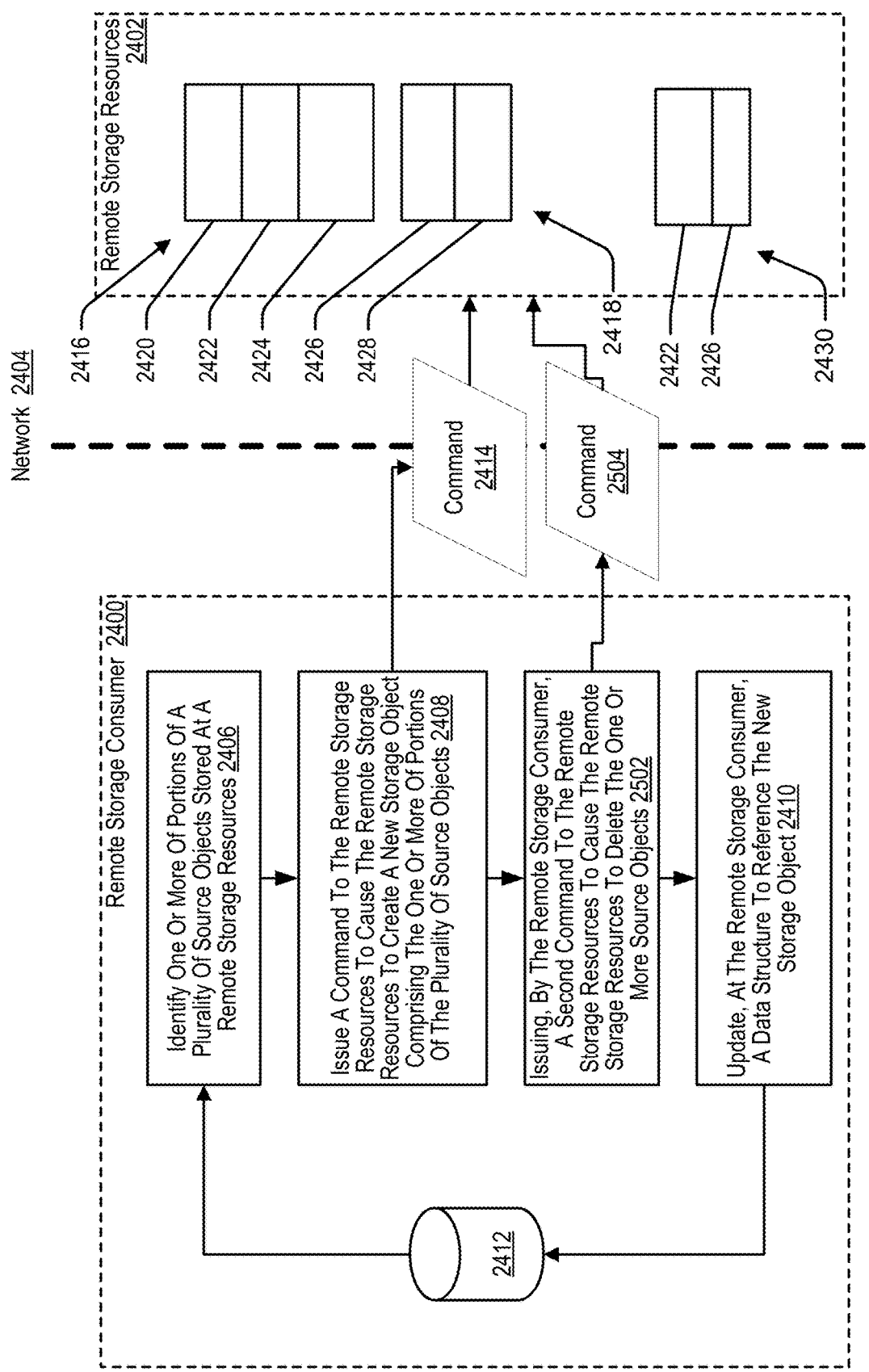
FIG. 24 is a flowchart of another example method for cost-effective storage management according to embodiments of the present disclosure.

For further explanation, FIG. 24 sets forth a flow chart illustrating another example method of cost-effective storage management according to embodiments of the present disclosure. The method of FIG. 24 is similar to the method of FIG. 23 in that the method of FIG. 24 also includes also includes identifying 2406, by a remote storage consumer 2400, one or more of portions 2422, 2426 of one or more source objects 2416, 2418 stored at a remote storage resources 2402, issuing 2408, by the remote storage consumer 2400, a command 2414 to the remote storage resources 2402 to cause the remote storage resources 2402 to create a new object 2430 comprising the one or more of portions 2422, 2426 of the one or more source objects 2416, 2418, and updating 2410, at the remote storage consumer 2400, a mapping data structure 2412 to reference the new object 2430.

The method of FIG. 24 differs from the method of FIG. 23 in that, the method of FIG. 23 also includes issuing 2502, by the remote storage consumer 2400, a second command 2504 to the remote storage resources 2402 to cause the remote storage resources 2402 to delete the one or more source objects 2416, 2418. Issuing 2502, by the remote storage consumer 2400, a second command 2504 to the remote storage resources 2402 to cause the remote storage resources 2302 to delete the one or more source objects 2316. 2318 may be carried out by sending a second command 2504 from the remote storage consumer 2300 over the network 2304 to the remote storage resources 2302. The second command 2504 may identify the source objects 2416, 2418 and indicate that the source objects 2416, 2418 are to be deleted. The second command 2504 may be formatted according to a remote data management API provided by the remote storage resources. After receiving the second command 2504, the remote storage resources 2402 may delete any objects, such as source objects 2416, 2418 identified in the second command 2504. Thus, after executing the second command 2504, the remote storage resources 2402 may store the new object 2430 but not the source objects 2416, 2418 since the source objects 2416, 2418 were deleted by the second command 2504. In examples in which the source object 2416, 2418 are deleted by the remote storage resources 2402 in response to receipt of the second command 2504, the remote storage consumer 2400 may update the mapping data structure 2412 to remove references to the source objects 2416, 2418 in addition to updating the mapping data structure to refer to the new object 2430.

Figure 25:
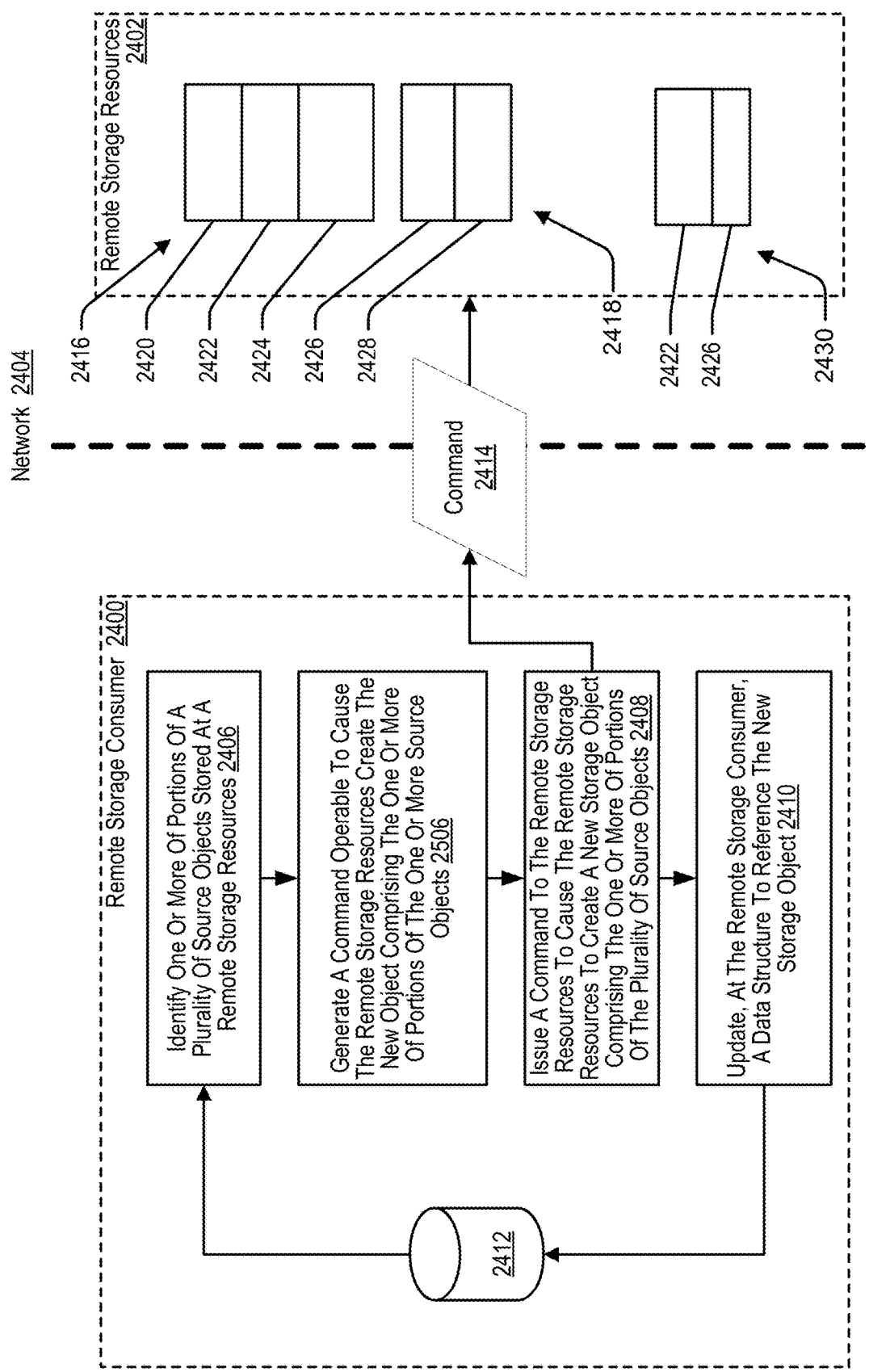
FIG. 25 is a flowchart of another example method for cost-effective storage management according to embodiments of the present disclosure.

For further explanation, FIG. 25 sets forth a flow chart illustrating another example method of cost-effective storage management according to embodiments of the present disclosure. The method of FIG. 25 is similar to the method of FIG. 23 in that the method of FIG. 25 also includes identifying 2406, by a remote storage consumer 2400, one or more of portions 2422, 2426 of one or more source objects 2416, 2418 stored at a remote storage resources 2402, issuing 2408, by the remote storage consumer 2400, a command 2414 to the remote storage resources 2402 to cause the remote storage resources 2402 to create a new object 2430 comprising the one or more of portions 2422, 2426 of the one or more source objects 2416, 2418, and updating 2410, at the remote storage consumer 2400, a mapping data structure 2412 to reference the new object 2430.

The method of FIG. 25 differs from the method of FIG. 23 in that, the method of FIG. 25 also includes generating 2506 the command 2414 operable to cause the remote storage resources 2402 to create the new object 2430 comprising the one or more of portions 2422, 2426 of the one or more source objects 2416, 2418. Generating 2506 the command 2414 operable to cause the remote storage resources 2402 to create the new object 2430 comprising the one or more of portions 2422, 2426 of the one or more source objects 2416, 2418 may be carried out by identifying data to be deleted, such as obsolete data resulting from a garbage collection process, identifying source objects 2416, 2418 associated with the data, and identifying portions 2422, 2426 of the source objects 2416, 2418 corresponding to data to keep. For example, the remote storage consumer 2400 may perform a garbage collection operation and identify data that can be deleted. The remote storage consumer 2400 may then determine the source objects 2416, 2418 corresponding to the data to be deleted and selected data ranges within the source objects 2416, 2418 that do not correspond to the data to be deleted. The remote storage consumer 2400 may then format this information into a command to be sent to the remote storage resources 2402. The command may be formatted according to an API provided by the remote storage resources 2402 or a pipelined command suitable for use with the API provided by the remote storage resources 2402.

Figure 26:
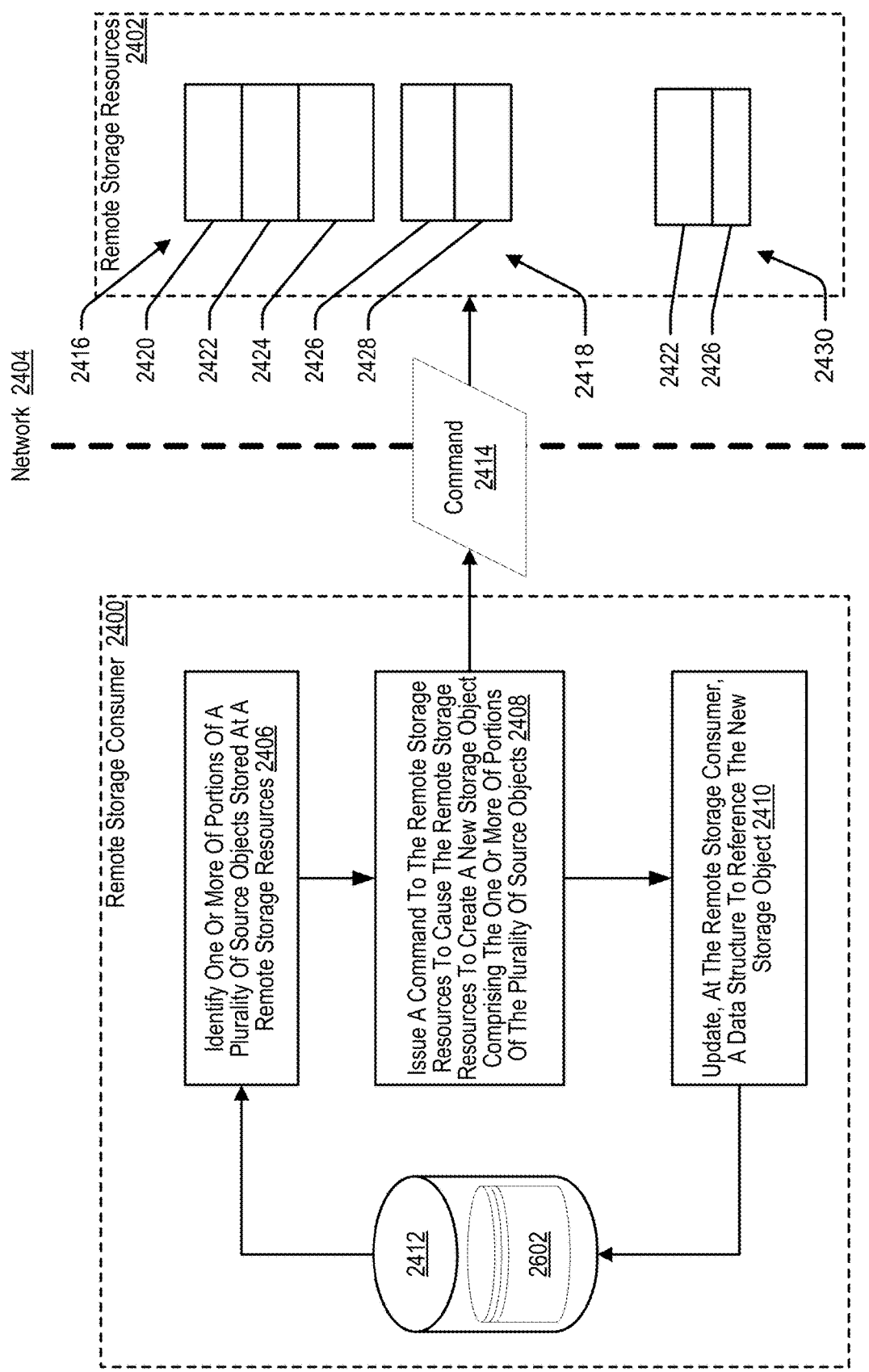
FIG. 26 is a flowchart of another example method for cost-effective storage management according to embodiments of the present disclosure.

For further explanation, FIG. 26 sets forth a flow chart illustrating another example method of cost-effective storage management according to embodiments of the present disclosure. The method of FIG. 26 is similar to the method of FIG. 23 in that the method of FIG. 26 also includes identifying 2406, by a remote storage consumer 2400, one or more of portions 2422, 2426 of one or more source objects 2416, 2418 stored at a remote storage resources 2402, issuing 2408, by the remote storage consumer 2400, a command 2414 to the remote storage resources 2402 to cause the remote storage resources 2402 to create a new object 2430 comprising the one or more of portions 2422, 2426 of the one or more source objects 2416, 2418, and updating 2410, at the remote storage consumer 2400, a mapping data structure 2412 to reference the new object 2430.

The method of FIG. 26 differs from the method of FIG. 23 in that, in the method of FIG. 26, the mapping data structure is a distributed shared memory database 2602. A distributed shared memory database 2602 is a database for tracking data in a distributed shared memory storage system. A distributed shared memory storage system is a storage system in which the storage architecture provides for multiple storage types as a single shared address space. The multiple storage types may be tiered storage, block storage, object storage, or other storage types. The storage system may function transparently to a user and make decisions on where to store the data. For example, the distributed share memory database may map the data to physical locations where the data is stored. In the example of FIG. 26, the remote storage consumer 2400 implements a distributed shared memory storage system.

Although the preceding description of the methods of FIGS. 23 through 26 describe the remote storage consumer 2400 as performing the steps of the method, readers will appreciate that in some examples the steps may be offloaded by the remote storage consumer 2400 to a separate service, such as a cloud service, for execution. For example, the remote storage consumer 2400 may offload operations to a cloud service provider to reduce the load on the remote storage consumer. In such instances, although some compute functions may be performed at the cloud service provider, so long as the remote storage consumer is managing the operation of the cloud service provider the steps are considered as having been performed by the remote storage consumer.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:
    identifying, by a processing device of a consumer of a cloud object store service external to the consumer, one or more source objects currently stored at the cloud object store service, the one or more source objects having a first set of portions that are to be maintained by the cloud object store service and a second set of portions that are to be deleted by the cloud object store service;
    providing, by the consumer, identifiers of the first set of portions and a first command to the cloud object store service configured to cause the cloud object store service to create a new object comprising the first set of portions of the one or more source objects that are currently stored at the cloud object store service, wherein the new object is created by the cloud object store service while bypassing sending the first set of portions of the one or more source objects to the consumer; and
    providing a second command to the cloud object store service to cause the cloud object store service to delete the one or more source objects.

2. The method of claim 1, wherein the first command to the cloud object store service is issued as part of a garbage collection operation.

3. The method of claim 1, wherein the one or more source objects currently stored at the cloud object store service is in a mapping data structure maintained by the consumer that is a distributed shared memory database.

4. The method of claim 1, wherein the first command comprises one or more subcommands connected by a pipeline.

5. An apparatus comprising:
    a memory; and
    a processing device, operatively coupled to the memory, configured to:
        identify, by a consumer of a cloud object store service external to the consumer, one or more source objects currently stored at the cloud object store service, the one or more source objects having a first set of portions that are to be maintained by the cloud object store service and a second set of portions that are to be deleted by the cloud object store service;
        provide identifiers of the first set of portions and a first command to the cloud object store service configured to cause the cloud object store service to create a new object comprising the first set of portions of the one or more source objects that are already stored at the cloud object store service, wherein the new object is created by the cloud object store service while bypassing sending the first set of portions of the one or more source objects to the consumer; and provide a second command to the cloud object store service to cause the cloud object store service to delete the one or more source objects.

6. The apparatus of claim 5, wherein the first command to the cloud object store service is issued as part of a garbage collection operation.

7. The apparatus of claim 5, wherein the one or more source objects currently stored at the cloud object store service is in a mapping data structure maintained by the consumer that is a distributed shared memory database.

8. The apparatus of claim 5, wherein the first command comprises one or more subcommands connected by a pipeline.

9. A non-transitory computer readable storage medium storing instructions which, when executed, cause a processing device to:
identify, by a consumer of a cloud object store service external to the consumer, one or more source objects currently stored at the cloud object store service, the one or more source objects having a first set of portions that are to be maintained by the cloud object store service and a second set of portions that are to be deleted by the cloud object store service;
provide identifiers of the first set of portions and a first command to the cloud object store service configured to cause the cloud object store service to create a new object comprising the first set of portions of the one or more source objects that are currently stored at the cloud object store service, wherein the new object is created by the cloud object store service while bypassing sending the first set of portions of the one or more source objects to the consumer; and
provide a second command to the cloud object store service to cause the cloud object store service to delete the one or more source objects; and
update a mapping data structure to reference the new object and remove the one or more source objects.

10. The non-transitory computer readable storage medium of claim 9, wherein the first command to the cloud object store service is issued as part of a garbage collection operation.

11. The non-transitory computer readable storage medium of claim 9, wherein the one or more source objects currently stored at the cloud object store service is in a mapping data structure maintained by the consumer that is a distributed shared memory database.

12. The non-transitory computer readable storage medium of claim 9, wherein the first command comprises one or more subcommands connected by a pipeline.

13. The method of claim 1, wherein the first command and the second command are provided using an application programming interface that is provided by the cloud object store service.

14. The apparatus of claim 5, wherein the first command and the second command are provided using an application programming interface that is provided by the cloud object store service.

15. The non-transitory computer readable storage medium of claim 9, wherein the first command and the second command are provided using an application programming interface that is provided by the cloud object store service.

16. The method of claim 1, wherein bypassing sending the first set of portions of the one or more source objects to the consumer is implemented by a multipart put copy operation.

17. The apparatus of claim 5, wherein bypassing sending the first set of portions of the one or more source objects to the consumer is implemented by a multipart put copy operation.

18. The non-transitory computer readable storage medium of claim 9, wherein bypassing sending the first set of portions of the one or more source objects to the consumer is implemented by a multipart put copy operation.

* * * * *